(12) United States Patent  
Liongosari et al.

(10) Patent No.: US 6,900,807 B1  
(45) Date of Patent: May 31, 2005

(54) SYSTEM FOR GENERATING CHARTS IN A KNOWLEDGE MANAGEMENT TOOL

(75) Inventors: Edy S. Liongosari, Wheeling, IL (US); Kelly L. Dempski, Evanston, IL (US)

(73) Assignee: Accenture LLP, Palo Alto, CA (US)

( * ) Notice: Subject to any disclaimer, the term of this patent is extended or adjusted under 35 U.S.C. 154(b) by 0 days.

(21) Appl. No.: 09/521,471

(22) Filed: Mar. 8, 2000

(51) Int. Cl.[7] .............................................. G06T 11/20
(52) U.S. Cl. ................................... 345/440; 707/104.1
(58) Field of Search ............................ 345/440, 440.2, 345/441, 968, 835, 854; 707/3, 10, 6, 2, 4, 5, 104.1, 513; 709/200, 202, 204, 205, 329, 313; 705/1, 7

(56) References Cited

U.S. PATENT DOCUMENTS

| | | | | |
|---|---|---|---|---|
| 5,297,249 A | * | 3/1994 | Bernstein et al. | 345/854 |
| 5,515,488 A | * | 5/1996 | Hoppe | 345/440 |
| 5,608,900 A | | 3/1997 | Dockter et al. | 395/613 |
| 5,761,663 A | * | 6/1998 | Lagarde et al. | 707/10 |
| 5,794,257 A | | 8/1998 | Liu et al. | 707/501 |
| 5,802,518 A | * | 9/1998 | Karaev et al. | 707/9 |
| 5,819,271 A | * | 10/1998 | Mahoney et al. | 707/9 |
| 5,831,631 A | * | 11/1998 | Light et al. | 345/440 |
| 5,864,871 A | | 1/1999 | Kitain et al. | |
| 5,905,991 A | * | 5/1999 | Reynolds | 707/501.1 |
| 5,973,693 A | * | 10/1999 | Light | 345/835 |
| 5,982,369 A | * | 11/1999 | Sciammerlla et al. | 345/835 |
| 5,982,383 A | * | 11/1999 | Kumar et al. | 345/440 |
| 6,003,034 A | | 12/1999 | Tuli | |
| 6,012,055 A | * | 1/2000 | Campbell et al. | 707/5 |
| 6,018,735 A | | 1/2000 | Hunter | 707/5 |
| 6,029,141 A | | 2/2000 | Bezos et al. | |
| 6,078,326 A | | 6/2000 | Kilmer et al. | |
| 6,161,113 A | | 12/2000 | Mora et al. | |
| 6,212,549 B1 | * | 4/2001 | Page et al. | 709/205 |
| 6,233,578 B1 | * | 5/2001 | Machihara et al. | 707/10 |
| 6,275,229 B1 | * | 8/2001 | Weiner et al. | 345/440 |
| 6,298,327 B1 | * | 10/2001 | Hunter et al. | 705/1 |
| 6,314,555 B1 | | 11/2001 | Ndumu et al. | |
| 6,467,052 B1 | * | 10/2002 | Kaler et al. | 714/39 |
| 6,529,911 B1 | | 3/2003 | Mielenhausen | |
| 6,727,927 B1 | * | 4/2004 | Dempski et al. | 345/853 |

FOREIGN PATENT DOCUMENTS

JP            11053392           2/1999

OTHER PUBLICATIONS

Angelica, Amara D., "Business Data Finds a Home on Custom Portals," *TechWeek*, Feb. 22, 1999, pp. 1–4.

Davies, N.J., et al., "Knowledge sharing agents over the World Wide Web," *BT Technology Journal*, vol. 16, No. 3, Jul. 1, 1998, pp. 104–109.

Search Report, dated Nov. 4, 2002, for corresponding international application PCT/US01/06770.

* cited by examiner

*Primary Examiner*—Jeffery Brier
*Assistant Examiner*—Thu Thao Havan
(74) *Attorney, Agent, or Firm*—Brinks Hofer Gilson & Lione

(57) ABSTRACT

A system, method and article of manufacture are provided for generating a chart. A request for information is received from a user. A search for data relating to the request for information is performed in at least two geographically separated information repositories of an enterprise. The results of the search are presented to the user. The user is allowed to select a search result from the results of the search. A search result that is selected by the user is recognized. A chart that illustrates information related to the search result selected by the user is generated and displayed.

20 Claims, 32 Drawing Sheets

Figure 6

SYSTEM FOR GENERATING CHARTS IN A KNOWLEDGE MANAGEMENT TOOL

FIELD OF THE INVENTION

The present invention relates to chart generation and more particularly to generating charts of search results.

BACKGROUND OF THE INVENTION

People who use computer systems and networks often need to look up information about the system they are using. Traditionally, information was stored in books and manuals, which were often kept physically near to the computer. If a user needed to look up information, he turned to a single source—the paper manuals stored conveniently nearby.

Currently, however, the amount of technical information available about a given computer system can be very large and can be stored at a wide variety of sources.

Information is often provided to customers in "online" form, dispensing entirely with paper copies. This online information includes online databases, CD ROM databases, proprietary help systems, and online manuals. Large amounts of technical information are also available from third party online sources and from sources such as the World Wide Web.

Amid an apparent wealth of online information, people still have problems finding the information they need. Online information retrieval may have problems including those related to inappropriate user interface designs and to poor or inappropriate organization and structure of the information. Storage of information online in a variety of forms leads to certain information retrieval problems, several of which are described below.

The existence of a variety of information sources leads to the lack of a unified information space. An "information space" is the set of all sources of information that is available to a user at a given time or setting. When information is stored in many formats and at many sources, a user is forced to spend too much "overhead" on discovering and remembering where different information is located (e.g., online technical books, manual pages ("manpages"), release notes, help information, etc.). The user also spends a large amount of time remembering how to find information in each delivery mechanism. Thus, it is difficult for the user to remember where potentially relevant information might be, and the user is forced to jump between multiple different online tools to find it.

The existence of a variety of information sources leads to information strategies that lack cohesion. Users currently must learn to use and remember a variety of metaphors, user interfaces, and searching techniques for each delivery mechanism and class of information. No one type of interface suits all users. Furthermore, a user may need different types of searching techniques and interfaces, depending on the circumstances and the nature of the specific information needed.

The existence of a variety of information sources leads to lack of links between sources of information. Conventional delivery mechanisms often support only loosely structured navigation, such as keyword search or hyperlinks. Such mechanisms provide the user with only a local organization of information instead of providing a global picture of the information space.

The existence of a variety of information sources leads to frustration if the information uses a wide variety of terms or uses terms not familiar to the user. In addition, users employ concepts and terms differently than technical writers and authors. Conventional delivery mechanisms often rely on a keyword search as a primary means of finding information. If the user's vocabulary does not sufficiently overlap with indices employed by a delivery mechanism, a keyword search will result in a high percentage of disappointing and frustrating "term misses." The only recovery method for a failed keyword search is simply to guess at better query.

The existence of a variety of information sources leads to titles and descriptions of the information that are not intuitive to a user. Users often conceptually group and describe problems differently than do information organizers and writers. If, for example, a user does not know the title of a book or the name of a database, he may not be able to find the information stored therein.

As computer systems become more complex and as sources of online information proliferate, it becomes more and more difficult for users to locate the information they need. Even worse, users may not always be aware of all the existing sources of information. Moreover, certain users may not use certain sources of information, even though they are aware of them, if they are not familiar with the interface or find it too difficult to use.

SUMMARY OF THE INVENTION

A system, method and article of manufacture are provided for generating a chart. A request for information is received from a user. Such a request may be in the form of a search query or through selection of a link. A search for data relating to the request for information is performed in at least two geographically separated information repositories of an enterprise. A network such as an intranet or the Internet may be used to access the repositories. A wireless network could also be used. The results of the search are presented to the user such as by sending the results to a user station where they can be displayed. The user is allowed to select a search result from the results of the search. A search result that is selected by the user is recognized. A chart that illustrates information related to the search result selected by the user is generated and displayed.

In one aspect of the present invention, the chart is of a type selected from the group consisting of: a Gantt chart showing a timeline, a line chart that shows a number of documents on a particular topic posted to the information repositories during a preselected period of time, and a pie chart that illustrates the volume of entries on a topic found in the information repositories. In another aspect of the present invention, the chart illustrates a person's activity by at least one of topics and keywords associated with items the person has posted to at least one of the information repositories of the enterprise. The posting may include notes, documents, or any other type of information saved in the information repository. Alternatively, the chart may illustrate a timeline of postings about a client of the enterprise.

As an option, a second chart that differs from the chart may be generated and displayed. The chart may be a line chart that illustrates a number of documents submitted to the information repositories on a given topic, while the second chart may be a pie chart that categorizes postings on the given topic according to the information repository from which they came, for example.

BRIEF DESCRIPTION OF THE DRAWINGS

The invention will be better understood when consideration is given to the following detailed description thereof. Such description makes reference to the annexed drawings wherein:

FIG. 6 illustrates selection of a search result according to one embodiment of the present invention;

DETAILED DESCRIPTION OF THE PREFERRED EMBODIMENTS

The knowledge management tool according to the present invention is a new tool for enterprise-wide knowledge management. The knowledge management tool extracts data from various knowledge repositories to create a single knowledge source, allowing users to browse through several databases and sources as if the actual data resided in one vast, all-encompassing database. The intelligent extraction process also creates links between items according the relationships they have to other database entries. (For example, if a search is made for a particular person, the search engine returns information not only on the person, but also on the clients, topics, documents, and projects about which that person has made entries into knowledge exchange (KX) databases.) This allows the user to browse across relationships (instead of repeatedly entering searches) that could not be found by ordinary search engines.

The knowledge management tool consists of a simple graphical user interface (GUI) for accessing the extracted data. The interface is similar to a Web browser: The user can view "pages" of information extracted from the knowledge exchange and click hyperlinks to see information about related items. The result is an application that allows a user to search and browse the knowledge exchange, creating a fast, efficient way to find and use enterprise-wide knowledge.

Figure 1:
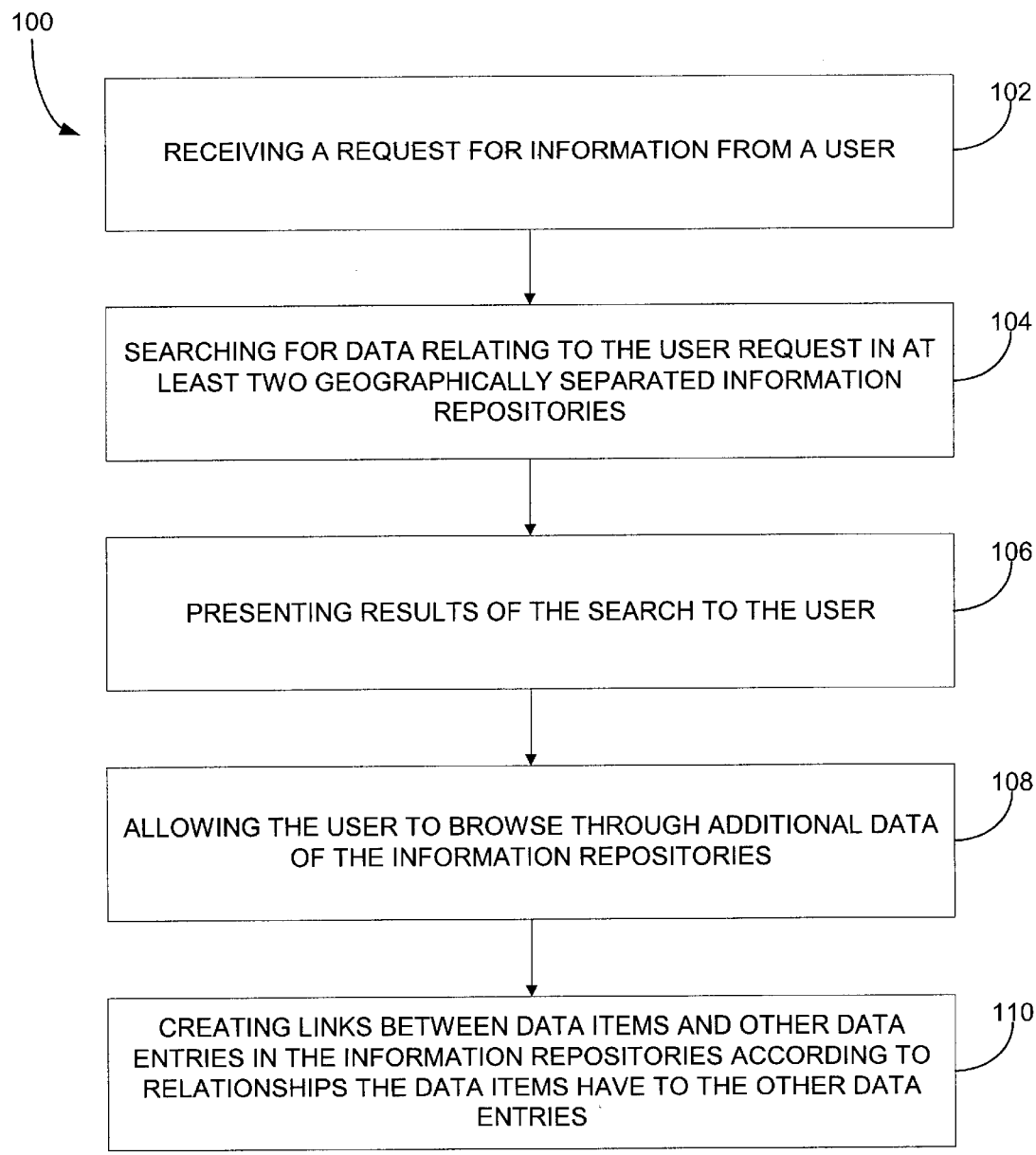
FIG. 1 illustrates a process for managing data across an enterprise, which allows users to browse through several databases and sources as if the actual data resided in one vast, all-encompassing database.

FIG. 1 illustrates a process 100 for managing data across an enterprise (i.e., a business, company, etc.), which allows users to browse through several databases and sources as if the actual data resided in one vast, all-encompassing database. In operation 102, a request for information is received from a user. Such a request may be in the form of a search query or through selection of a link, for example. Data relating to the user request is searched for in operation 104 in at least two geographically separated information repositories, such as databases. A network such as an intranet or the Internet may be used to access the repositories. A wireless network could also be used. Preferably, the information repositories form part of a secure network. The results of the search are presented to the user in operation 106 such as by sending the results to a user station where they can be displayed. The user is allowed to browse through additional data of the information repositories in operation 108. In operation 110, links between data items and other data entries in the information repositories are created according to relationships the data items have to the other data entries. A smart engine may be used to create such links. For example, when searching for a particular person, the search engine returns information not only on the person, but also on the clients, topics, documents, and projects about which that person has made entries into the information repositories. This allows the user to browse across relationships (instead of repeatedly entering searches) that could not be found by ordinary search engines.

In one aspect of the present invention a chart showing statistics about data in the information repositories is generated. One of the most interesting tools provided by the invention is the ability to view statistics on people, clients, and topics. The invention can generate Gantt charts (charts that show timelines related to, in this case, people and clients), line charts that show the number of documents on a particular topic posted per year, or pie charts that illustrate the volume of entries on that topic found in various libraries.

As an option, where the request for information is about a person, data relating to at least one of clients, topics, documents, and projects about which that person has made entries into the information repositories is output to the user. As another option, the user is allowed or required to select a category as part of the request for information for limiting the results of the search. The categories may include person, document, topic, project, and/or client. It should be kept in mind that equivalent words could be used interchangeably with these topics. For example, a topic category of "employee" or "name" may be equivalent to the topic category "person."

Preferably, the results of the search include abstracts of the data found during the search. Optionally, a dossier that includes people, prior documents, and past projects pertaining to the requested information is prepared based on the request for information.

A preferred embodiment of a system in accordance with the present invention is preferably practiced in the context of a personal computer such as an IBM compatible personal computer, Apple Macintosh computer or UNIX based workstation. A representative hardware environment is depicted in FIG. 2, which illustrates a typical hardware configuration of a workstation in accordance with a preferred embodiment having a central processing unit 210, such as a microprocessor, and a number of other units interconnected via a system bus 212.

Figure 2:
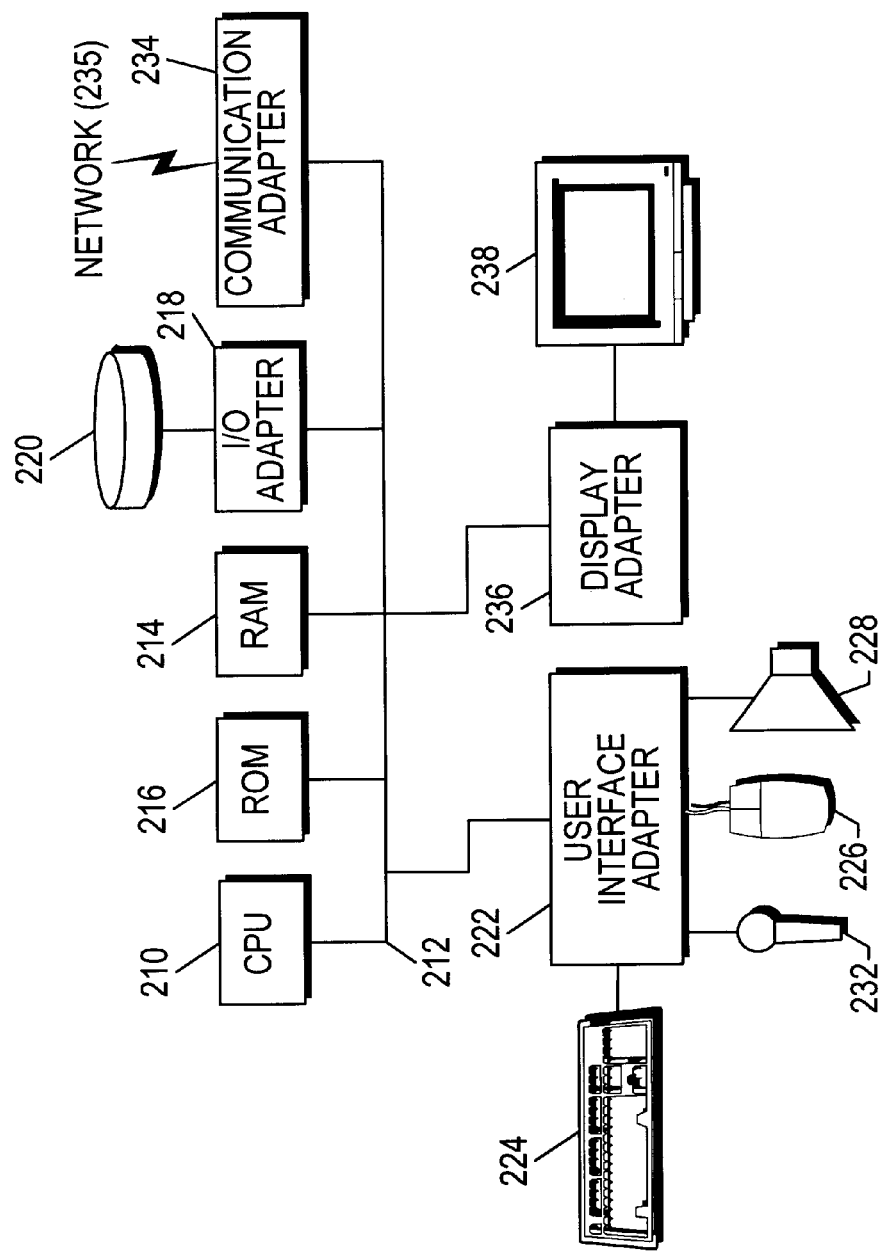
FIG. 2 is a schematic diagram of a hardware implementation of one embodiment of the present invention.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network (e.g., a data processing network) and a display adapter 236 for connecting the bus 212 to a display device 238. The workstation typically has resident thereon an operating system such as the Microsoft Windows NT or Windows/95 Operating System (OS), the IBM OS/2 operating system, the MAC OS, or UNIX operating system. Those skilled in the art will appreciate that the present invention may also be implemented on platforms and operating systems other than those mentioned.

A preferred embodiment is written using JAVA, C, and the C++ language and utilizes object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code.

Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity. In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place.

Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user (as is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:

Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.

Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.

Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain. For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the Newco. HTTP or other protocols could be readily substituted for HTML without undue experimentation. Information on these products is available in T. Berners-Lee, D. Connoly, "RFC 1866: Hypertext Markup Language —2.0" (November 1995); and R. Fielding, H, Frystyk, T. Bemers-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:

Poor performance;

Restricted user interface capabilities;

Can only produce static Web pages;

Lack of interoperability with existing applications and data; and

Inability to scale.

Sun Microsystem's Java language solves many of the client-side problems by:

Improving performance on the client side;

Enabling the creation of dynamic, real-time Web applications; and

Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet." Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets." Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution."

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta." ActiveX Technologies also includes ActiveX Server Framework, allowing developers to create server applications. One of ordinary skill in the art readily recognizes that ActiveX could be substituted for JAVA without undue experimentation to practice the invention.

Knowledge Management Tool Source Databases

In an illustrative embodiment of the present invention, the information found in the knowledge management tool is extracted from the following databases:

Libraries:
Business Process Management (BPM) Library
Change Management Library
Communications Library
Enterprise Business Solutions (EBS) Library
Financial Services Library
Government Library
Process Competency Library
Products & Resources InfoSource
Strategy Knowledge Base
Technology Library.
Discussions:
Change Management Forum
Financial Services Discussion
Products Industries Forum
Technology Discussion
Telecom Discussion.
Other:
Client Experience
Network Directory
Personnel Directory
Name & Address Book.

Note: Any data errors are most likely errors in the source data. Please contact the administrator for the source database if you find errors in the extracted information.

The extraction process for the knowledge management tool tries to clean the data as much as possible to make the use of the application easy and informative. However, due to the variety of data and data sources, the extraction process cannot clean all data. Data that cannot be cleaned or safely removed is retained. Any changes to the data in the source databases will be reflected on the next extraction and knowledge management tool update.

Figure 3:
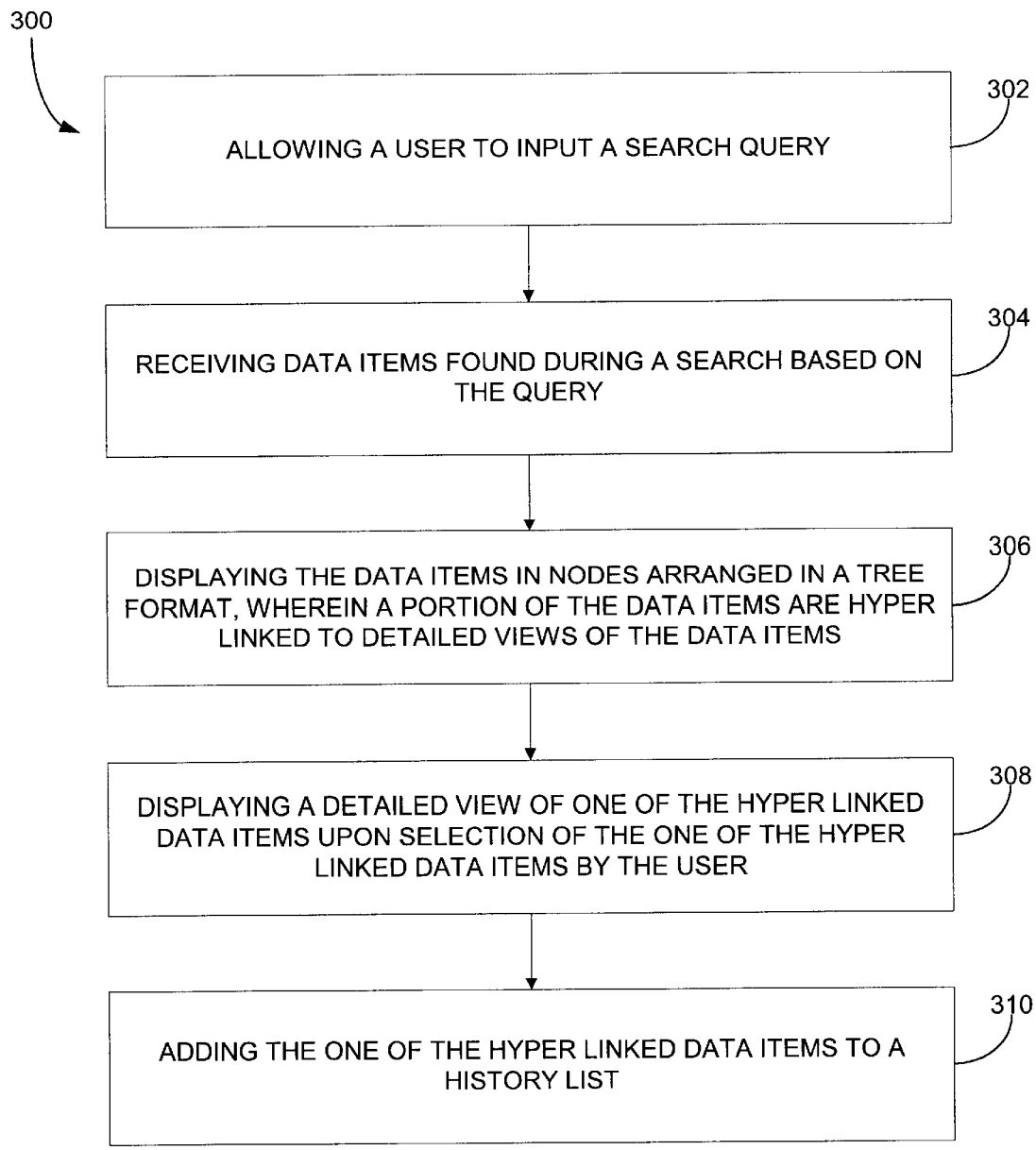
FIG. 3 depicts a process for providing a user interface for a data management application that extracts data from several data sources across an enterprise according to one embodiment of the present invention.

FIG. 3 depicts a process 300 for providing a user interface for a data management application that extracts data from several data sources across an enterprise, optionally in a secure environment. In operation 302, a user is allowed to input a search query. Data items found during a search based on the query are received in operation 304 and displayed in nodes arranged in a tree format in operation 306. A portion of the data items are hyper linked to detailed views of the data items. Such a detailed view may be created by opening the item or displaying an abstract of the item. A detailed view of one of the hyper linked data items is displayed in operation 308 upon selection of the one of the hyper linked data items by the user. In operation 310, the selected hyper linked data items are added to a history list. This feature can include not only a displayable listing of the data items but also use of a "back" button.

In an aspect of the present invention, selection of a type of search is allowed. Types of searches include searches by person, document, topic, project, and/or client. The data items that are displayed are limited to those matching the selected type of search. As an option, each item found during the search is categorized and marked with an icon that represents the category. Further, the data items may be sorted by one or more categories including person, client, and/or topic.

Preferably, a portion or all of the nodes expand to display additional data and/or subnodes upon selection. Also preferably, a user is allowed to save data items in a bookmark list for later retrieval by opening the bookmark list and selecting a data item saved in the bookmark list.

Performing Searches

Figure 4:
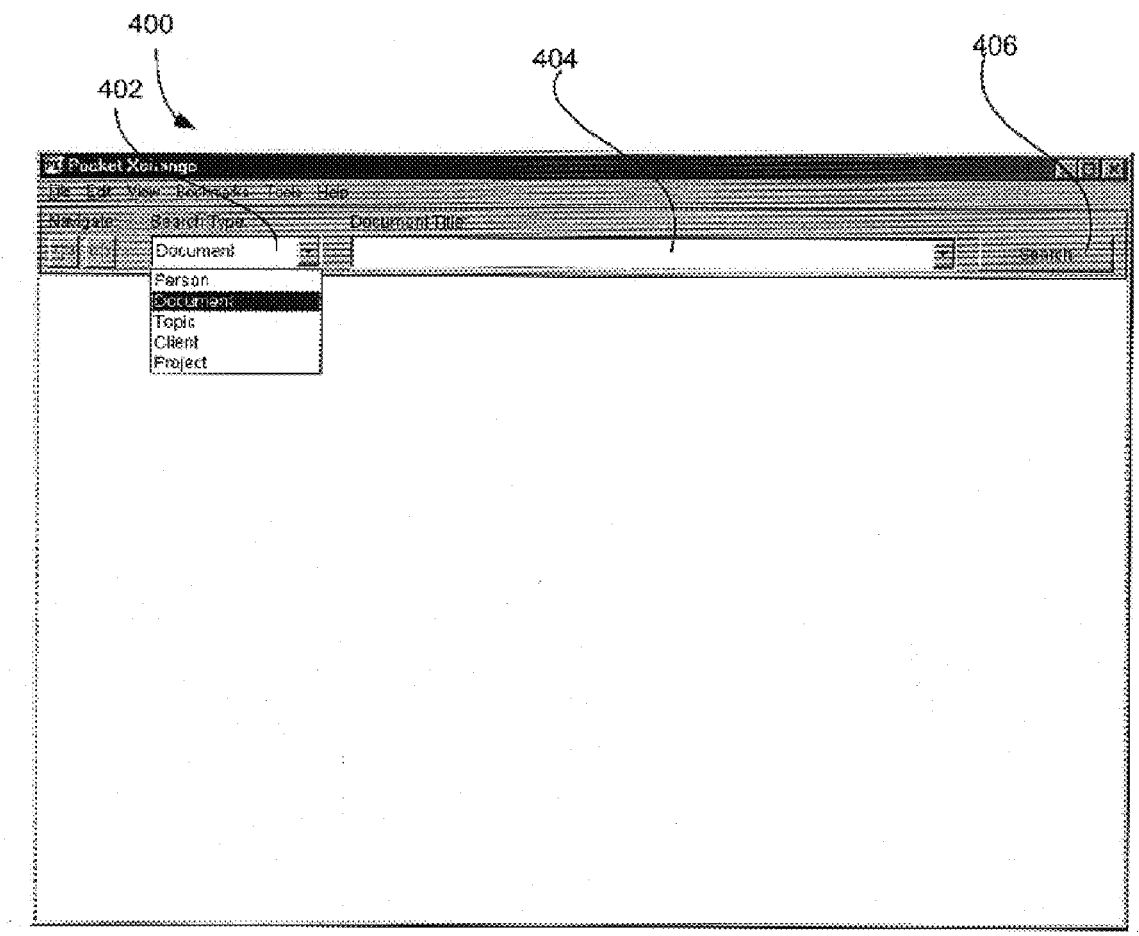
FIG. 4 illustrates a user interface that may be used with the process shown in FIG. 3.

FIG. 4 illustrates a user interface 400 that may be used with the process shown in FIG. 3. When using the knowledge management tool, the user usually begins by selecting the search type from the leftmost dropdown box 402. There one can choose from the following search types:

Person—You can search for current and former employees. "Person" search results are marked by a single stick figure icon.

Document—You can search for various documents and document types located on the KX. "Document" search results are marked with a document icon.

Topic—You can search for author-specified topics of KX documents and discussion items. "Topic" search results are marked with a key icon.

Project—You can search for projects listed in the AC Client Experience database. "Project" search results are marked with a factory icon.

Client—You can search for clients listed in the AC Client Experience database as well as clients linked to KX documents. "Client" search results are marked with two interlocked stick figures.

Figure 5:
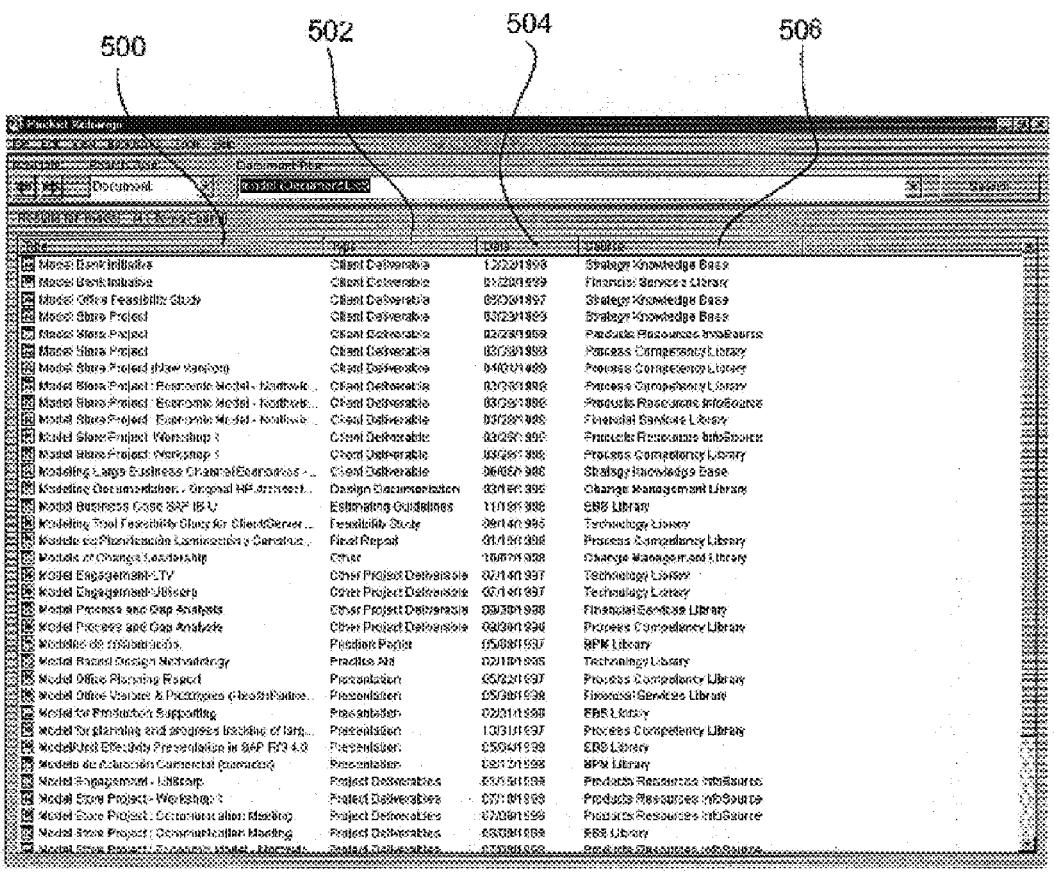
FIG. 5 illustrates search results for a document search according to one embodiment of the present invention.

After choosing the search type, type the search text in the search text box 404 and press the search button 406 (or simply hit the enter key). The main window will display a list of items that contain the search text. FIG. 5 illustrates search results for a document search. As shown, the display includes categories of information for each result, including title 500, type of document 502, a date 504, and the information repository 506 where the document is being stored.

Figure 6:
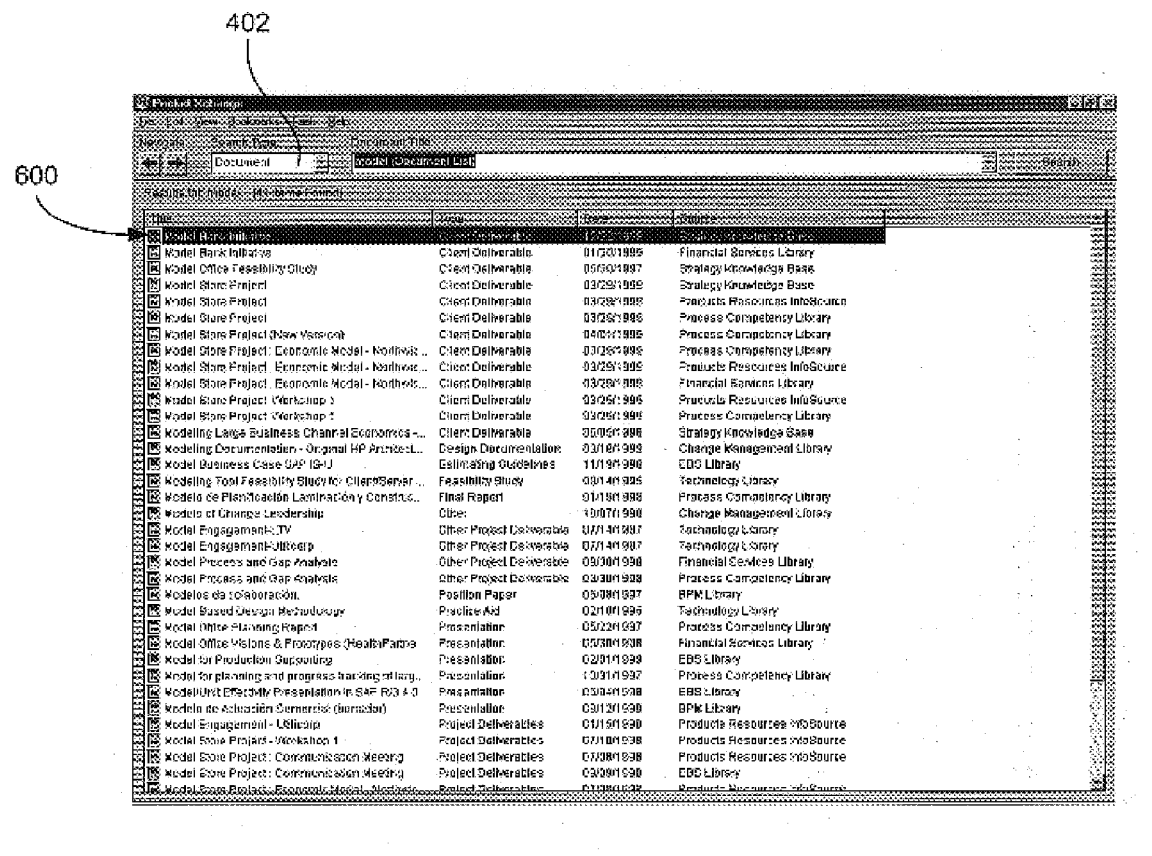
Figure 7:
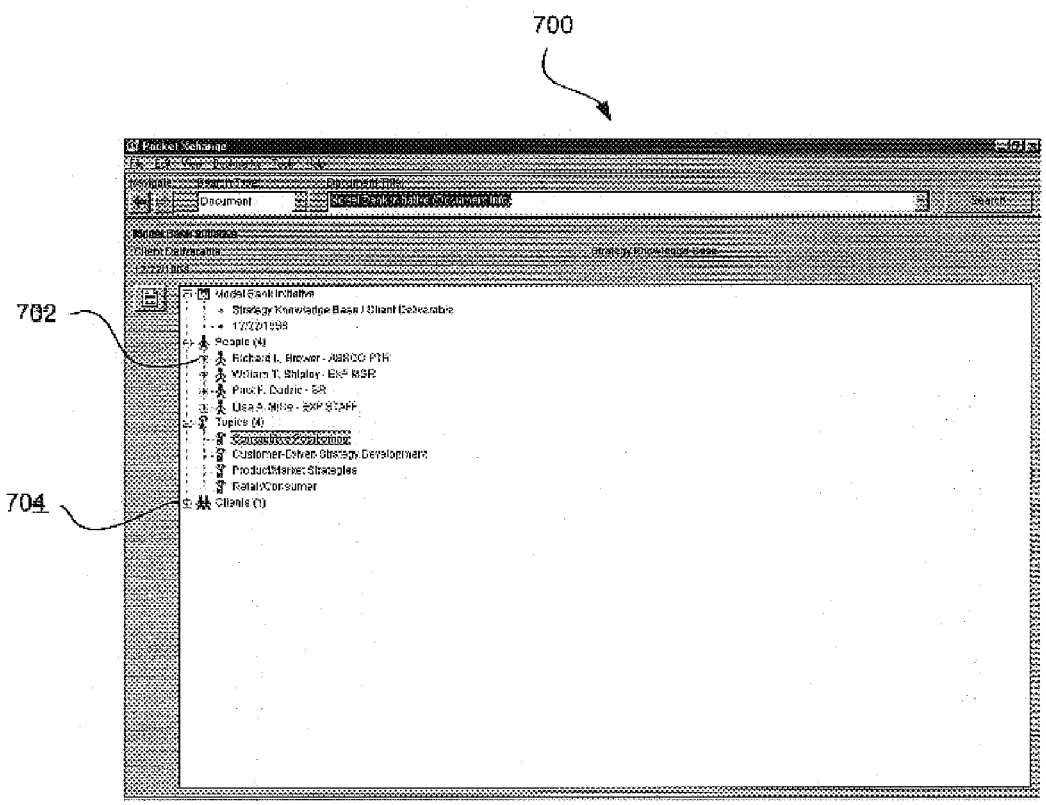
FIG. 7 illustrates a detailed view of the search result of FIG. 6 including several nodes.

A user can choose and double-click on one of the items from the list to see detailed information about that item. FIG. 6 illustrates selection of the search result 600 entitled "Model Bank Initiative." FIG. 7 illustrates a detailed view 700 of the "Model Bank Initiative," including several nodes 702, 704.

From the detailed view, one can:

Get more information on that item in the form of document abstracts or database charts.

Order the item from the KX via Mailback (only for documents).

Follow links to other items.

Perform a new search by repeating the steps above.

Navigating Search Results

Figure 8:
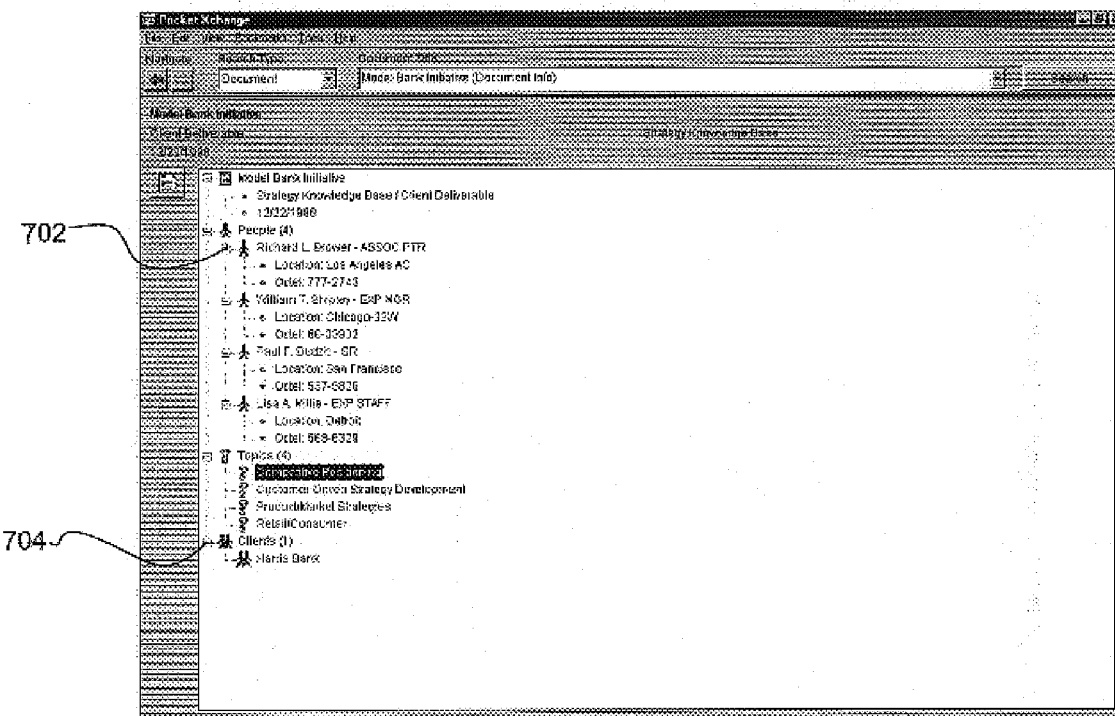
FIG. 8 illustrates the tree nodes of FIG. 7 in an expanded state.
Figure 9:
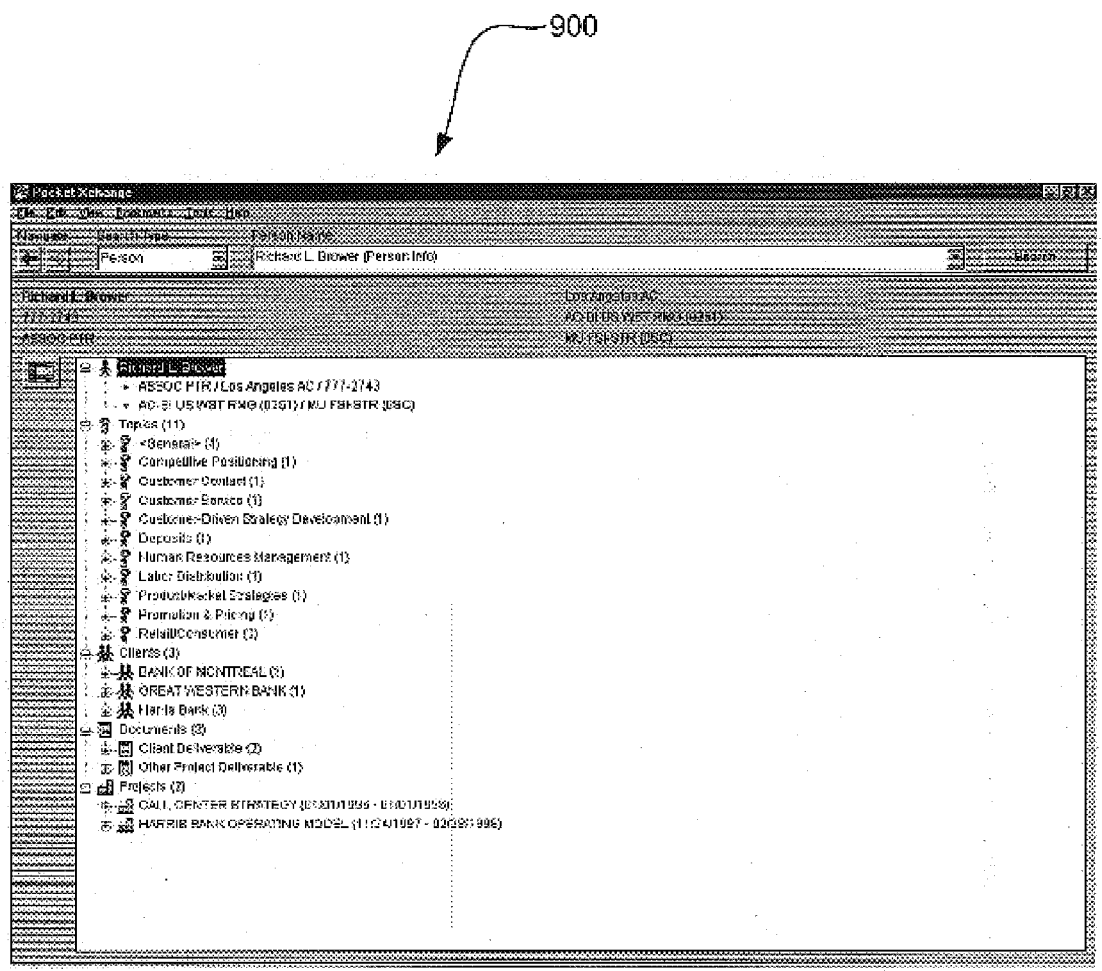
FIG. 9 depicts a detailed view of an employee selected by clicking on the employee's name in the display shown in FIG. 7.

After the knowledge management tool returns the results of your search, a tree of related items and some details about those items is displayed. The tree nodes can be expanded or collapsed by clicking on the adjacent plus or minus sign. See FIG. 8, which illustrates the tree nodes 702 and 704 of FIG. 7 in an expanded state. Items that are linked to more data can be shown in blue or underlined, for example, and can be clicked/double-clicked to jump to a detailed view of that item. FIG. 9 depicts a detailed view 900 of "Richard L. Brower" 702 selected by clicking on the name "Richard L. Brower" in the display shown in FIG. 7.

The tree view can be used to browse the information found in the knowledge management tool by following the chain of linked items. Each time a link is followed, that item is added to the search history, making it easy to return there.

Further, interesting information that is likely to be viewed frequently can be added to the bookmarks or saved by copying and pasting into other applications.

Standard vs. Categorized Views

If a search was performed on a person, topic or client, the results may be viewed two different ways. The first view, Standard View, simply sorts the items under the appropriate tree headings based on the entity type. The second view, Categorized View, also sorts the artifacts and projects based on the particular person, client, or topic to which they are related. For example, a search for Kishore S. Swaminathan under the Standard View setting would list the documents, topics, projects, and clients which he has been a part of.

Figure 10:
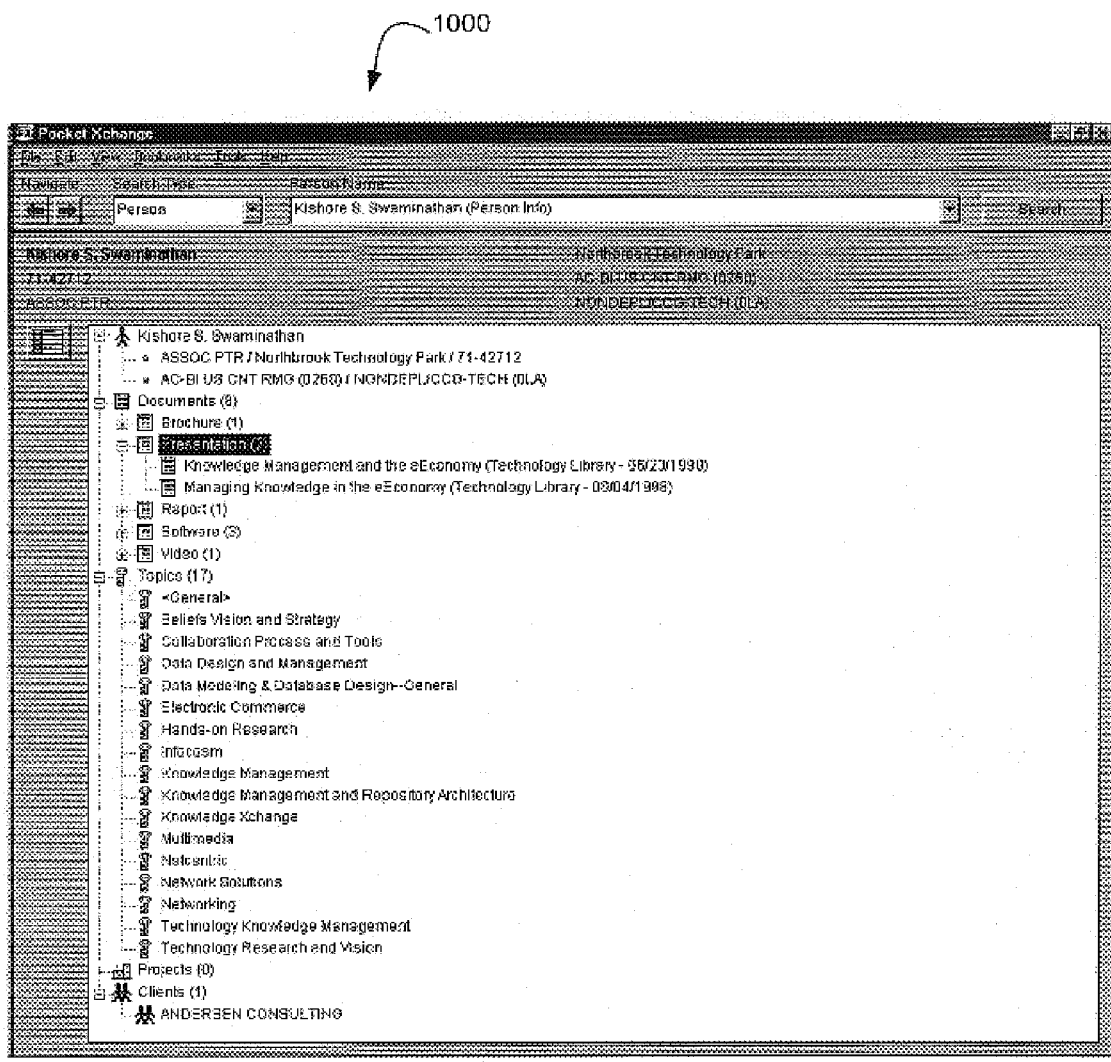
FIG. 10 depicts a search result for an employee in the Standard View in accordance with one embodiment of the present invention.
Figure 11:
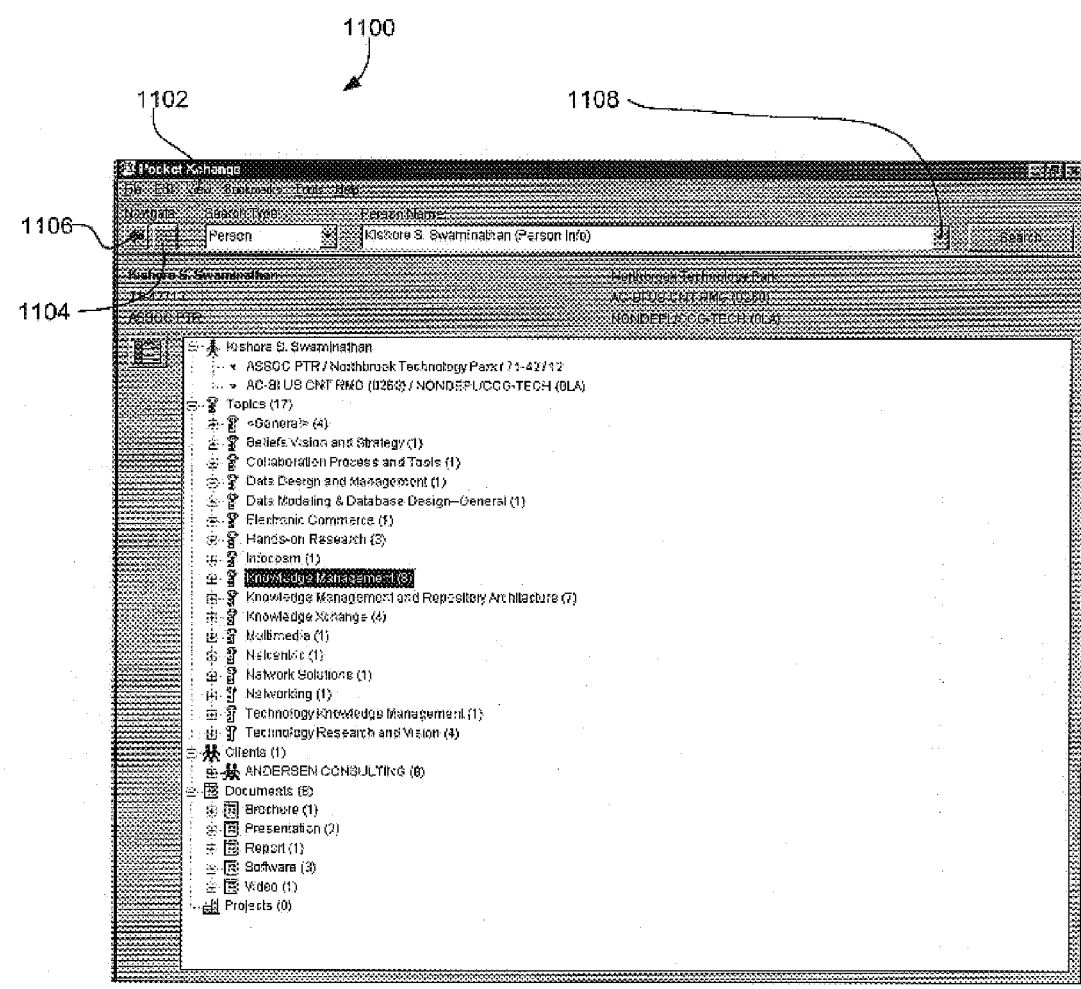
FIG. 11 illustrates the search result for an employee in the Categorized View according to one embodiment of the present invention.

FIG. 10 depicts the search result 1000 for Kishore S. Swaminathan in the Standard View. If the view state was switched to Categorized View, expanding the topic "Knowledge Management" would show all documents and projects that Kishore has produced related to that topic. FIG. 11 illustrates the search result 1100 for Kishore S. Swaminathan in the Categorized View.

To change the view type, simply check the desired view type under the View Menu bar item 1102. See FIG. 11. This setting may not take effect until the next time you run knowledge management tool.

Navigating the Search History

A user can easily jump between items he or she has found by navigating through the search history. There are two ways to navigate:

Use the forward and back buttons 1104,1106 on the upper left of the display to navigate sequentially through your most recent searches.

Use the history dropdown (by pressing the arrow 1108 next to the search text) to jump to a specific item among the most recent searches.

Related Topics

When viewing information about a topic, the knowledge management tool can help a user to find other topics that may be of interest to a search. Related topics are topics that commonly are associated with the same documents as the current topic.

Figure 12:
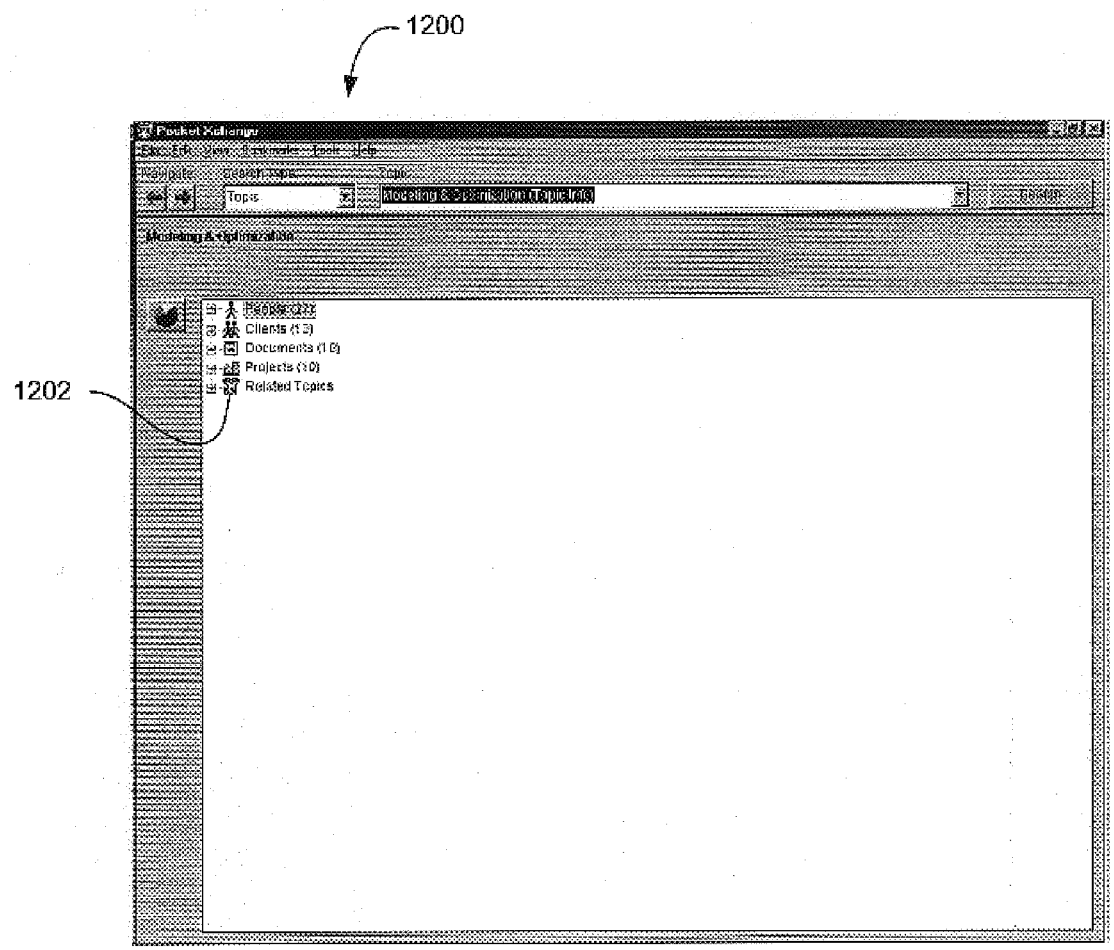
FIG. 12 illustrates a Topic View that illustrates additional topics that may be of interest to a search according to one embodiment of the present invention.

FIG. 12 illustrates a Topic View 1200 that illustrates additional topics that may be of interest to a search. To view the related topics for a topic, expand the Related Topics node 1202 in the Topic View.

Obtaining Documents from the KX

The knowledge management tool can include a direct connection to an information-displaying program, such as Lotus Notes, for obtaining documents found while browsing. There are two illustrative options for viewing their content: reading abstracts taken from optional add-on databases or ordering the document for mailback via physical mail, email, and/or facsimile.

Document and Project Abstracts

When installing the knowledge management tool, users are given the option of also downloading and installing various Abstract Add-on databases. These databases contain abstracts of documents and projects taken from each respective knowledge exchange library. (For more on installing abstract add-on databases, see Installing Abstract Add-On Databases.) In some configurations of the present invention, to view abstracts of documents and projects from particular libraries, a user must have the abstract add-on database for that library installed on his or her PC. In other configurations, the abstracts may be stored in one or more of the knowledge repositories.

Installing Abstract Add-on Databases from a Knowledge Repository

To download the Abstract Add-on databases that enable viewing of document and project abstracts, go to the Technology Library and locate the knowledge management tool Abstract Add-on page. Following the directions on the page for Abstract Add-on databases, select the Abstract Add-ons you wish to receive. You will receive the installation for the Abstract Add-on database(s) as a mail-back in an email Inbox. Follow the included instructions.

Illustrative Abstract Add-on databases* with document and project abstracts that can be offered are:

Business Process Management (BPM) Library

Change Management, Process Competency, Technology, and

Strategy Libraries

Communications Library

Enterprise Business Solutions (EBS) Library

Financial Services Library
Government Library
Products & Resources InfoSource.

*Abstracts of discussion databases do not have to me made available. Instead, keywords associated with postings can be taken from discussion databases and linked to the person responsible for the posting.

To view abstracts of documents and projects found while browsing the knowledge management tool (KMT): Double-click on the document you wish to view and click the "View the abstract for this document" button, or select View|Abstract from the Menu bar.

Order via Mailback

This feature allows a user to order attachments from the knowledge exchange for documents with attachments. If not connected, the order will be placed in the local outgoing mailbox. When viewing a document select Tools|Order via Mailback from the Menu bar.

Searching in Abstracts/Project Descriptions

Figure 13:
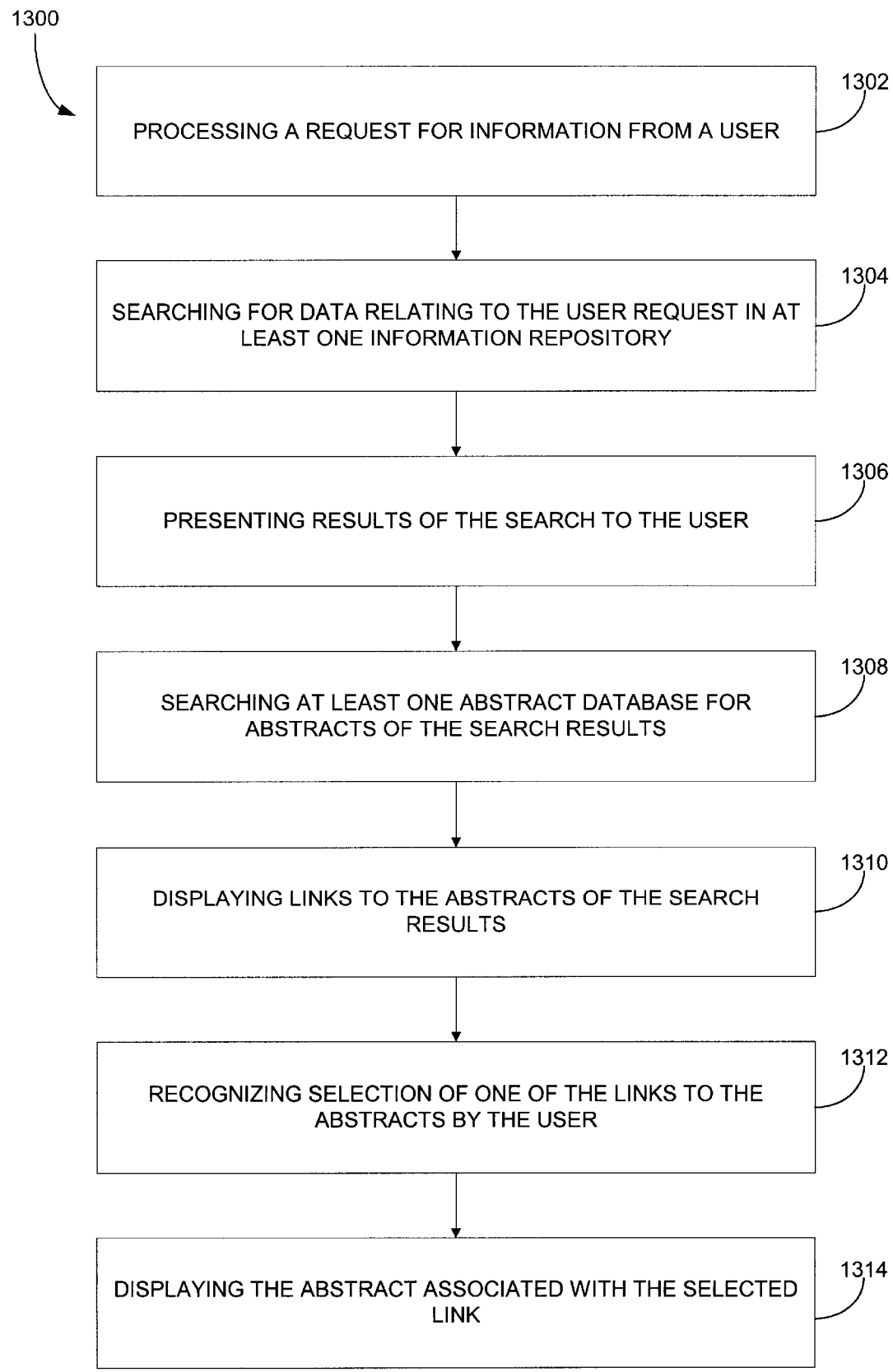
FIG. 13 illustrates a process for providing an abstract for data in accordance with an embodiment of the present invention.

FIG. 13 illustrates a process 1300 for providing an abstract for data. In operation 1302, a request for information from a user is received and processed. Data relating to the user request is searched for in at least one information repository in operation 1304. The results of the search are presented to the user in operation 1306 such as by sending the results to a user station where they can be displayed. In operation 1308, at least one abstract database is searched for abstracts of the search results. It should be noted that it is possible that not all search results will have abstracts.

Links to the abstracts of the search results in the abstract database are created or recognized and displayed in operation 1310. Selection of one of the links to the abstracts by the user is recognized in operation 1312 and the abstract associated with the selected link is displayed in operation 1314.

Preferably, the abstract database is installed on a user station on which the search results are output. Ideally, the user is prompted to install the abstract database if the abstract database is not installed on the user station. Also ideally, the user may select one of a plurality of abstract databases for installation on the user station.

In one aspect of the present invention, a check for an updated version of the abstract database is performed before searching the abstract database for the abstracts of the search results. This is to allow the user to install an update or an updated abstract database. As an alternative, the abstract databases may also be stored in the information repositories. As an option, the abstract can be sent to the user utilizing a mailback function, such as via facsimile, electronic mail, etc.

The knowledge management tool has the ability to search for document abstracts and project descriptions that contain a given text string. To use this feature, select Tools|Search in Abstracts. Once the window appears, type in the text for which you'd like to search and select the desired source(s). Once selections have been made, press the button to begin searching. The search process could be slow on slower machines, but the process can be interrupted if you find it is taking too long. The results will appear in the knowledge management tool list window.

Automated Searching and Monitoring

In one embodiment of the present invention, an automated monitoring engine monitors internal activities and events on the network based on user-specified information. The monitoring engine has the ability to monitor the activities such as the activities of a particular employee, a client, or even particular projects or groups of projects. Whenever a new publication, note, or report related to the object of interest is published or posted to the data repository, the user will be informed about it. The user can also be given the opportunity to view the information. For example, a page with links to the document and a description or title of the document can be displayed.

In another embodiment of the present invention, an automated monitoring engine searches internal and/or external sources based on user-specified information. The monitoring engine has the ability to monitor the external sources such web sites and news about the company. Whenever a new publication, note, report, article, or web page related to the object of interest is published or posted to the data repository, the user will be informed about it. The user can also be given the opportunity to view the information. For example, a page with links to the document, etc. and a description or title of the document can be displayed.

In yet another embodiment of the present invention, an automated searching engine monitors external sources based on user-specified information, preferably on the Internet. The searching engine has the ability to monitor the external sources such web sites and news about the company. Whenever a new publication, note, report, article, or web page related to the object of interest is published or posted to the data repository, the user will be informed about it. The user can also be given the opportunity to view the information. For example, a page with links to the document and a description or title of the document, etc. can be displayed.

Generating Charts

One of the most interesting tools provided in the knowledge management tool is the ability to view statistics on people, clients, and topics. The knowledge management tool can generate Gantt charts (charts that show timelines related to, in this case, people and clients), line charts that show the number of KX documents on a particular topic posted per year, or pie charts that illustrate the volume of entries on that topic found in various KX libraries.

Figure 14:
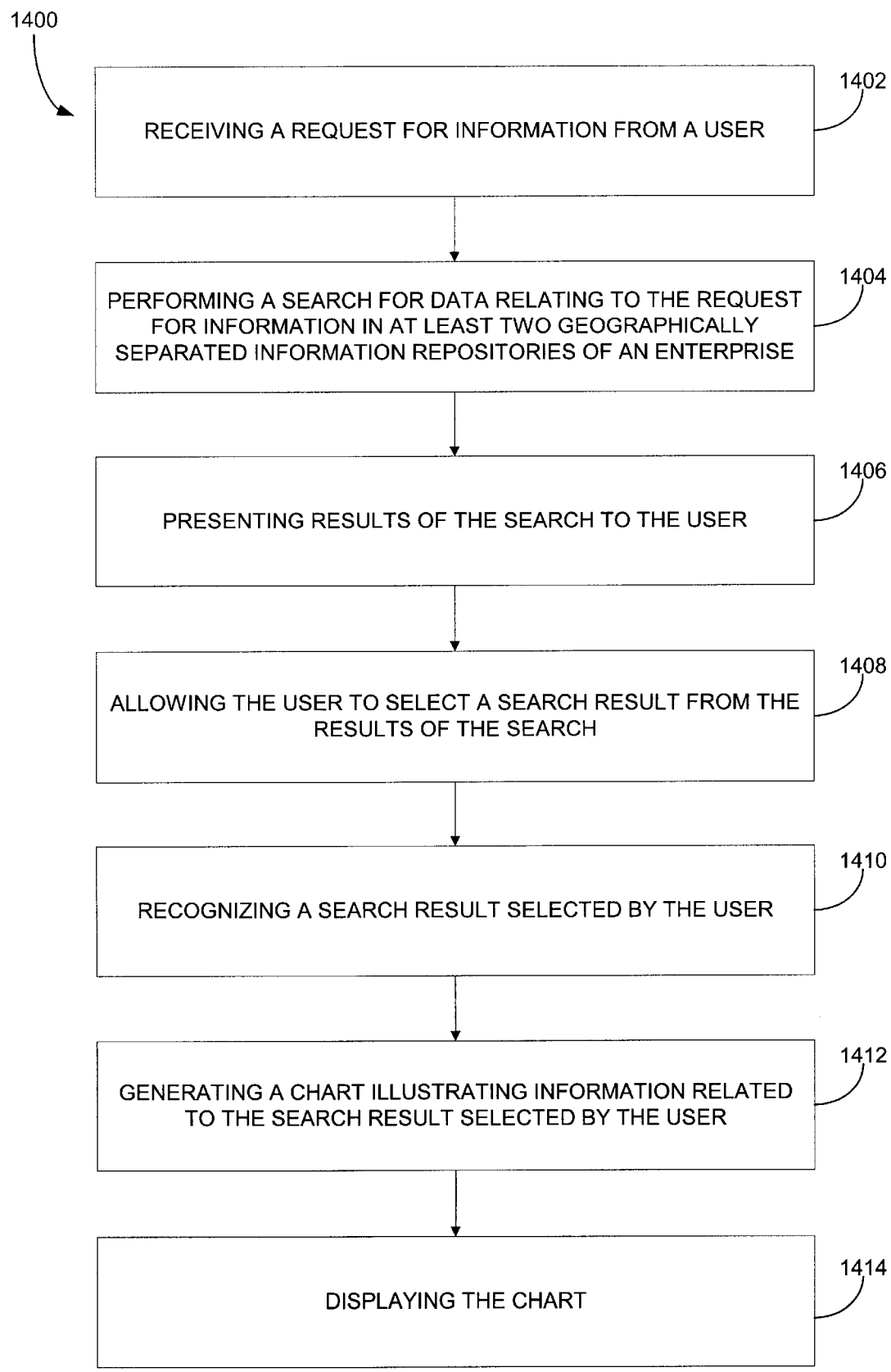
FIG. 14 illustrates process for generating a chart in accordance with one embodiment of the present invention.

FIG. 14 illustrates process 1400 for generating a chart in accordance with one embodiment of the present invention. In operation 1402, a request for information is received from a user. Such a request may be in the form of a search query or through selection of a link. A search for data relating to the request for information is performed in operation 1404 in at least two geographically separated information repositories of an enterprise. A network such as an intranet or the Internet may be used to access the repositories. A wireless network could also be used. The results of the search are presented to the user in operation 1406, such as by sending the results to a user station where they can be displayed. In operation 1408, the user is allowed to select a search result from the results of the search. A search result that is selected by the user is recognized in operation 1410. A chart that illustrates information related to the search result selected by the user is generated and displayed. See operations 1412 and 1414.

In one aspect of the present invention, the chart is of a type selected from the group consisting of: a Gantt chart showing a timeline, a line chart that shows a number of documents on a particular topic posted to the information repositories during a preselected period of time, and a pie chart that illustrates the volume of entries on a topic found in the information repositories. In another aspect of the present invention, the chart illustrates a person's activity by at least one of topics and keywords associated with items the person has posted to at least one of the information repositories of the enterprise. The posting may include notes, documents, or any other type of information saved in the information repository. Alternatively, the chart may illustrate a timeline of postings about a client of the enterprise.

Figure 17:
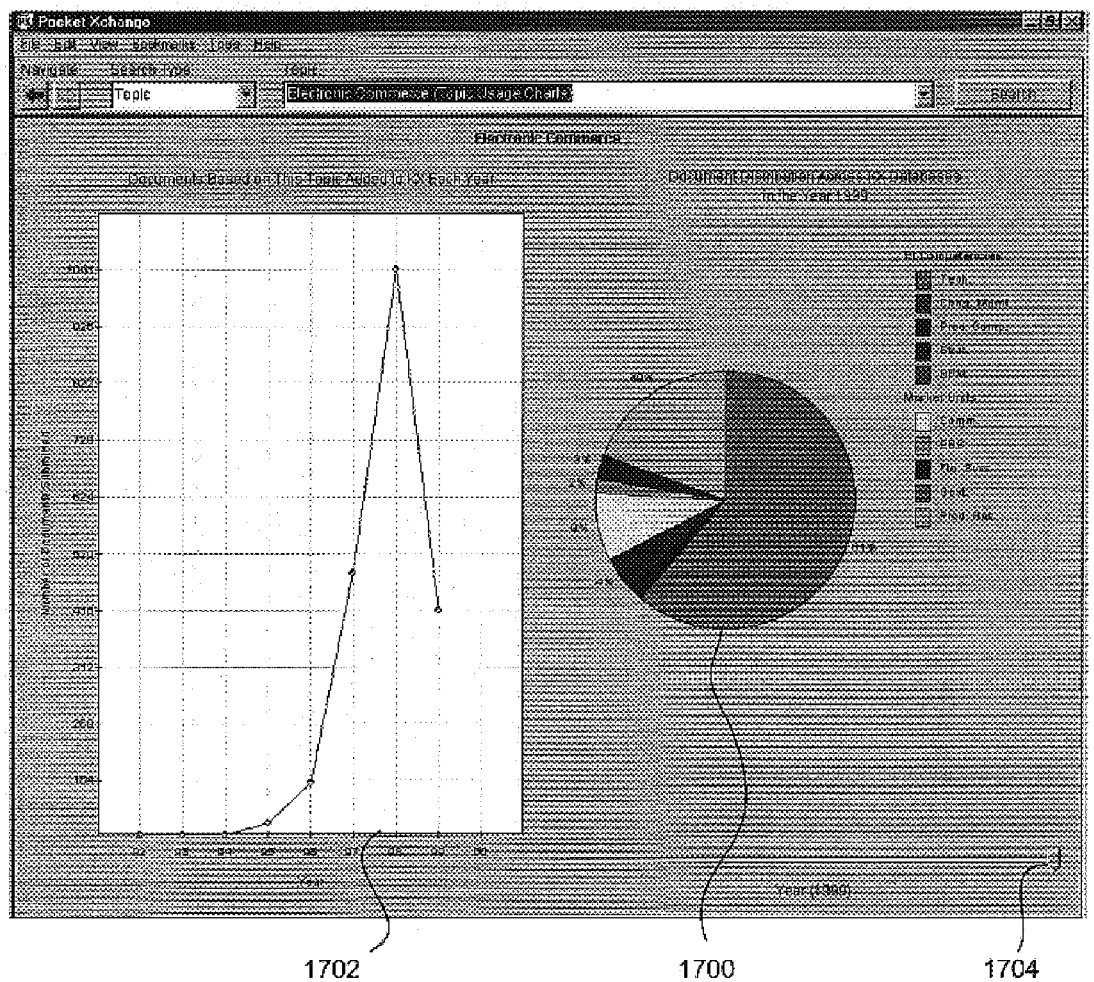
FIG. 17 illustrates a line chart and pie chart for the topic results shown in FIG. 12 according to an embodiment of the present invention.

As an option, a second chart that differs from the chart may be generated and displayed. The chart may be a line chart that illustrates a number of documents submitted to the information repositories on a given topic, while the second chart may be a pie chart that categorizes postings on the given topic according to the information repository from which they came, for example. FIG. 17 illustrates such line chart 1702 and pie chart 1704 for the topic results shown in FIG. 12 and is discussed below under "Topic charts."

All these charts can be easily copied and pasted into other documents and other applications such as Microsoft Word or PowerPoint. See Copying and pasting text and charts for more information.

Person Charts

After searching and selecting a person (i.e. the person's name is displayed on the left side above the main window), click the "Chart" button to the left of the main window, or select View|Chart Data from the Menu bar.

The knowledge management tool will display a KX Profile for the selected individual. The chart illustrates the person's KX activity by the topics or keywords associated with items the person has posted to various KX libraries.

Figure 15:
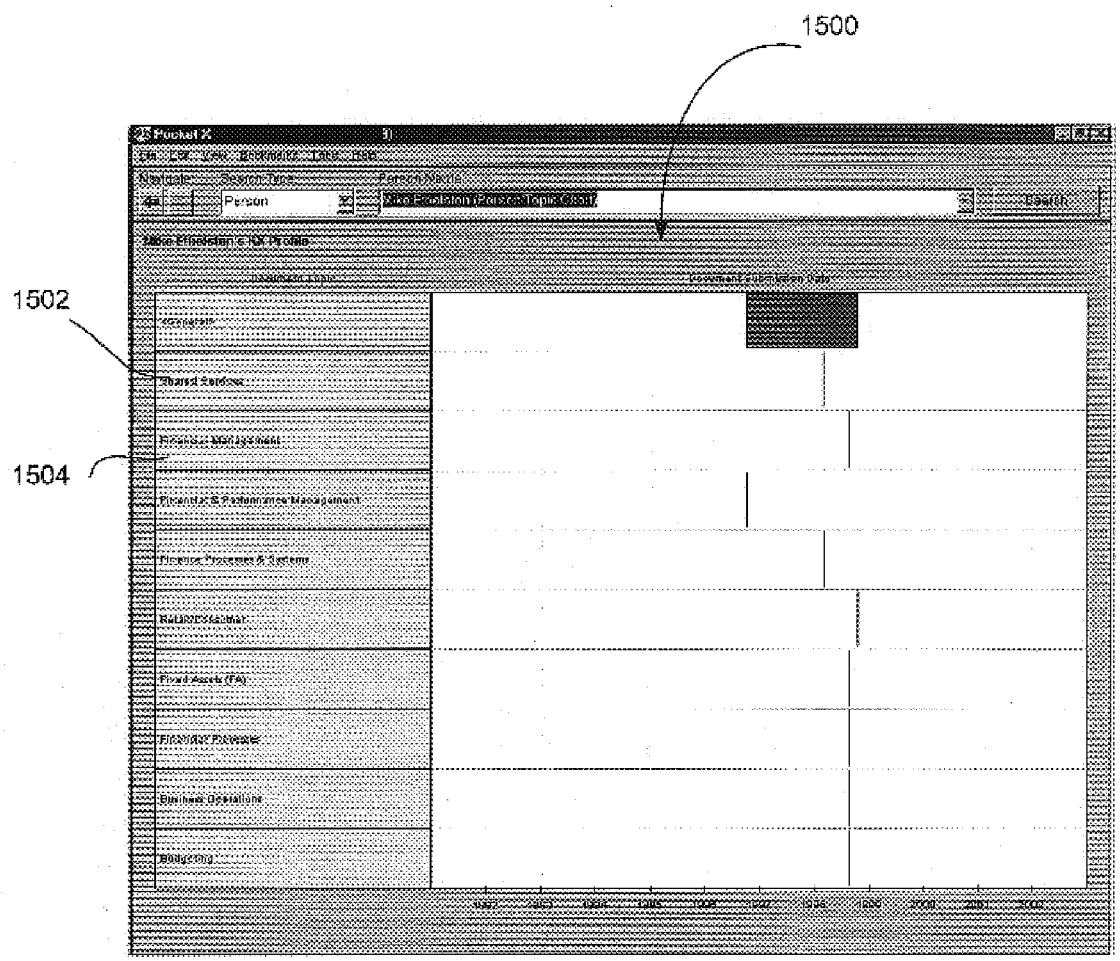
FIG. 15 illustrates a Gantt chart for an employee according to an embodiment of the present invention.

FIG. 15 illustrates a Gantt chart 1500 for Mike Ethelston. The chart shows the user that in 1998 Ethelston posted articles to the KX on Shared Services 1502 and Financial Management 1504.

Client Charts

After searching for and selecting a client (i.e. the client's name is displayed on the left side above the main window), click the "Chart" button to the left of the main window, or select View|Chart Data from the Menu bar.

The knowledge management tool will display a KX Profile for the selected client. The chart illustrates the KX postings relative to that client in various KX libraries.

Figure 16:
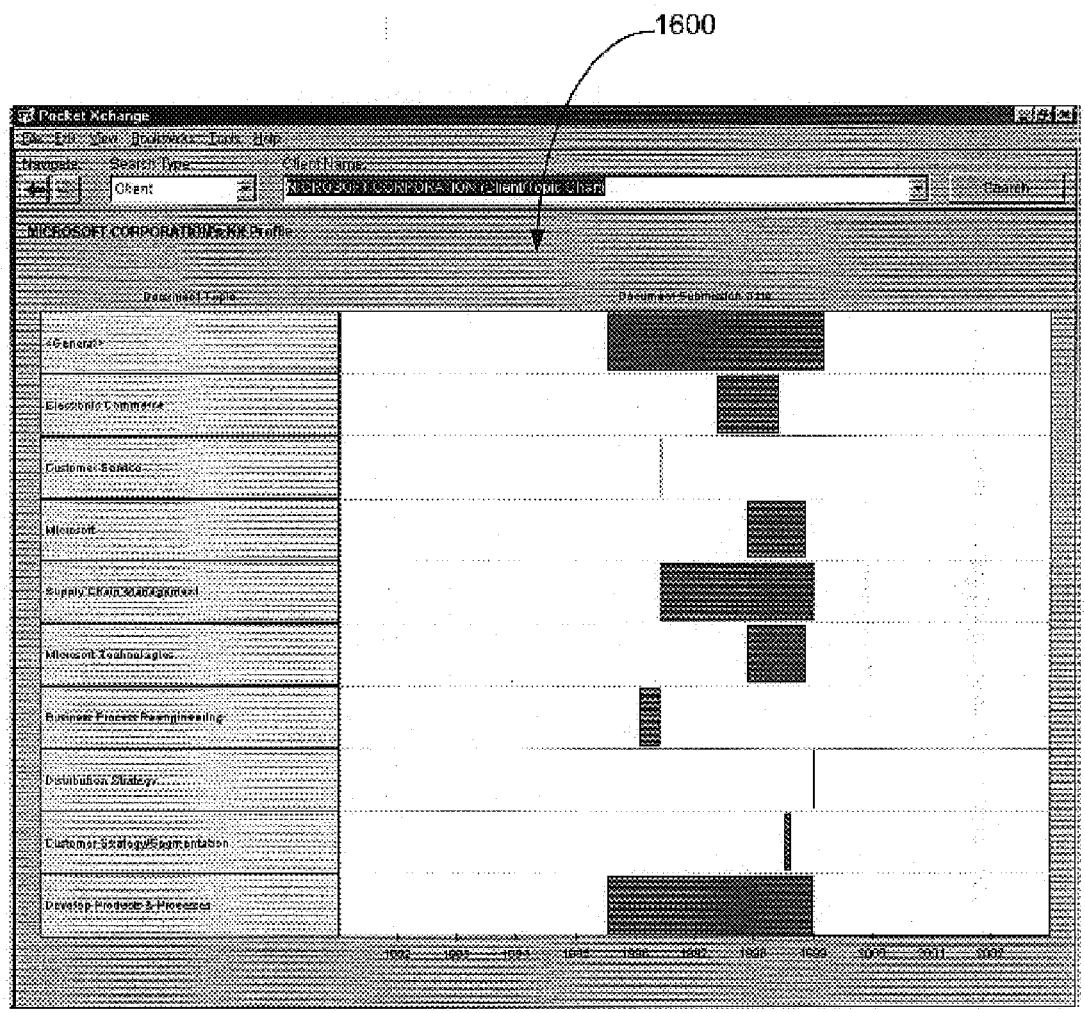
FIG. 16 shows a timeline chart for a company/client that illustrates information on a specific topic was posted about the company/client in accordance with an embodiment of the present invention.

For example, the chart 1600 for Microsoft, illustrated in FIG. 16, shows that people began posting client documents about Microsoft on the KX in 1996 as well as the point in time when information on a specific topic was posted about Microsoft.

Topic Charts

After searching for and selecting a topic (i.e. the topic is displayed on the left side above the main window), click the "Chart" button to the right of the main window, or select View|Chart Data from the Menu bar.

The knowledge management tool will display two different charts on any given topic. The line chart on the left illustrates the number of documents submitted to the KX on the given topic each year. The pie chart on the right categorizes the postings on the given topic according to the KX library from which they came.

FIG. 17 depicts topic charts for Electronic Commerce. The pie chart 1700 shows that in 1999, 61 percent of KX documents about Electronic Commerce were posted in the Technology Library. Similarly, the line chart 1702 shows that between 1996 and 1997, the number of Electronic Commerce documents on the KX jumped from about 100 to about 500. The scroll bar 1704 beneath the pie chart can be scrolled to the right or left to see a similar breakdown for each year.

Adding and Viewing Bookmarks

Like Netscape Navigator or Microsoft Internet Explorer, the knowledge management tool has the ability to store bookmarks of your favorite or most frequently visited items.

To bookmark a knowledge management tool location, select the item you want to add to your bookmark file. Click on Bookmarks|Add Bookmark from the Menu bar. That location will be stored by name and search topic (i.e. People, Topic, Document, Client, or Project) in your bookmark file.

To view your bookmarks at any time, select Bookmarks|View Bookmarks from the Menu bar.

Copying and Pasting Text and Charts

Pasting Information

You can copy and paste the information you find into another word processor. To do so, select the item to be copied and press Control+C, or select Edit|Copy from the Menu bar. You should now be able to paste the information into another application for future reference.

If you choose an item that contains sub-items (indicated by a "+" or "−" on the left of the item), the sub-items will also be copied.

Copying Person and Client Graphs

Similar to text entries, you can copy the graphs and paste them into other applications.

While viewing the graph page, press Control+C, or select Edit|Copy from the Menu bar. You should now be able to paste the graph into another application for future reference.

Topic Graphs

You copy topic graphs similarly to person and client graphs, except that you are given a choice of which of the two topic graphs you want to copy. Click on the line graph icon to copy the line graph or click on the pie graph icon to copy the pie graph of the year you are currently viewing.

Sorting Listings by Column Headings

Listings in the knowledge management tool can be sorted in much the same way as columns in a database or Windows Explorer. To sort listing in a column, click on the column heading at the top of the column.

For example, in the Person view, you can sort the Name column (or Octel, Location, Level, GMU, or LMU) by clicking on the box containing the word "Name."

Figure 18:
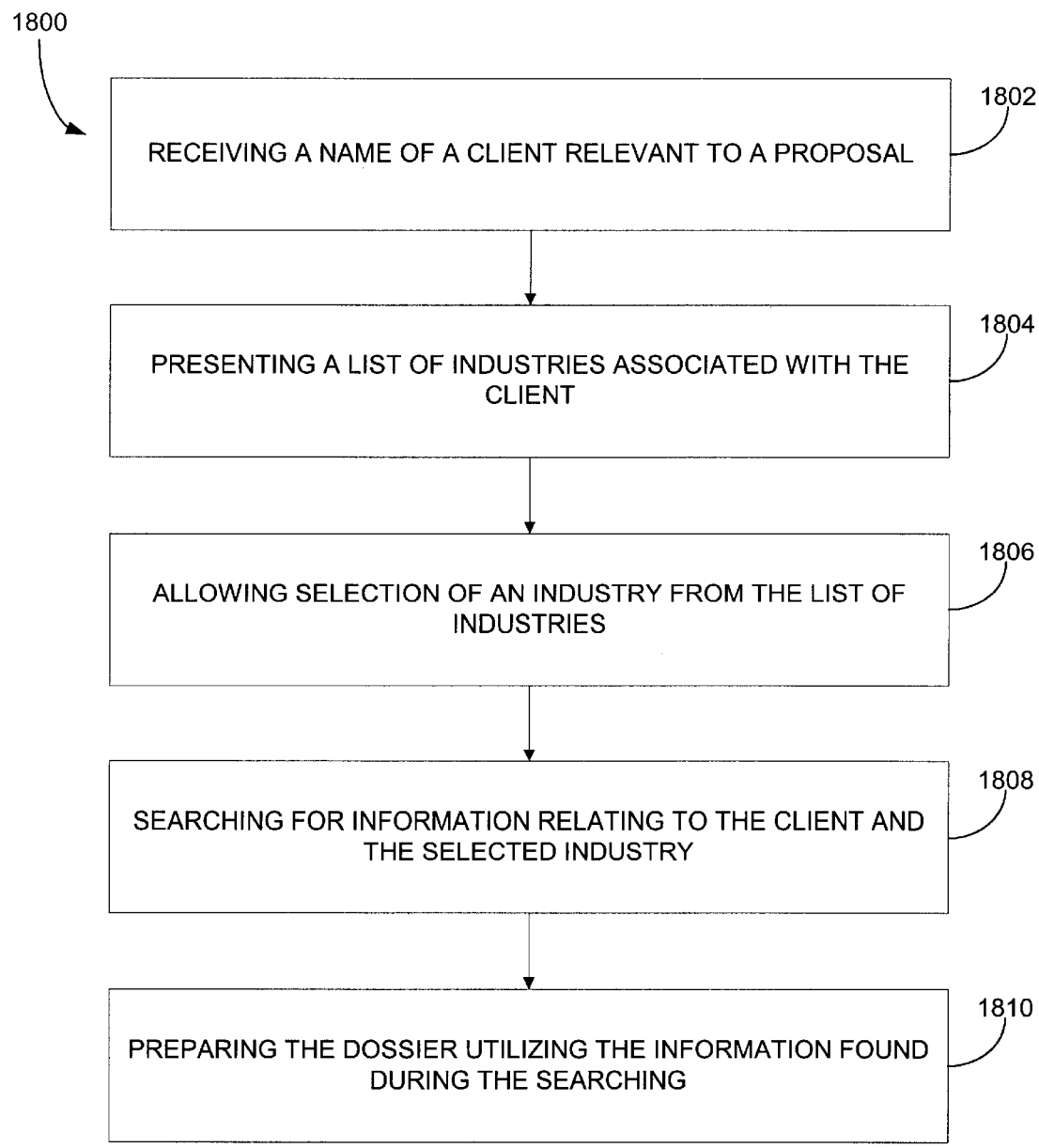
FIG. 18 is a flowchart of a process for developing a dossier in accordance with an embodiment of the present invention.

Proposal Wizard FIG. 18 is a flowchart of a process 1800 for developing a dossier in accordance with an embodiment of the present invention. In operation 1802, a name of one or more clients which may be relevant to the proposal is received. The name may be input or selected by the user, for example. A list of industries associated with the client(s) is presented to the user in operation 1804. A search may be conducted in information repositories of the enterprise to find the industries with which the client is associated. The user is allowed to select an industry from the list of industries in operation 1806. A search for information relating to the client and the selected industry is performed in operation 1808, such as by using the data management tool. The dossier is prepared in operation 1810 utilizing the information found during the searching.

In one aspect of the present invention, an alternate list of industries having industries different from the industries on the list of industries associated with the client is presented. The user is allowed to select one of the alternate industries. As an option, topics associated with the client are displayed and the user is allowed to select one or more of the topics for insertion of information relating to the selected topic(s) in the dossier.

The dossier may be arranged in sections according to people, documents, and projects. Preferably, the people section is arranged according to the number of documents and projects an individual has produced related to the client, industry, or topic. Also preferably, the documents and projects sections are arranged chronologically, such as with the most recent information displayed first.

The process of FIG. 18 may be implemented in a computer system in the form of a Proposal Wizard. The Proposal Wizard is designed to aid in the task of writing a proposal for a particular client in a particular industry based on various topics used throughout the firm. After supplying the wizard with the appropriate information, a complete dossier will be developed which includes experienced people, prior documents, and past projects pertaining to the desired information. The wizard is a 5-step process as explained below.

Figure 19:
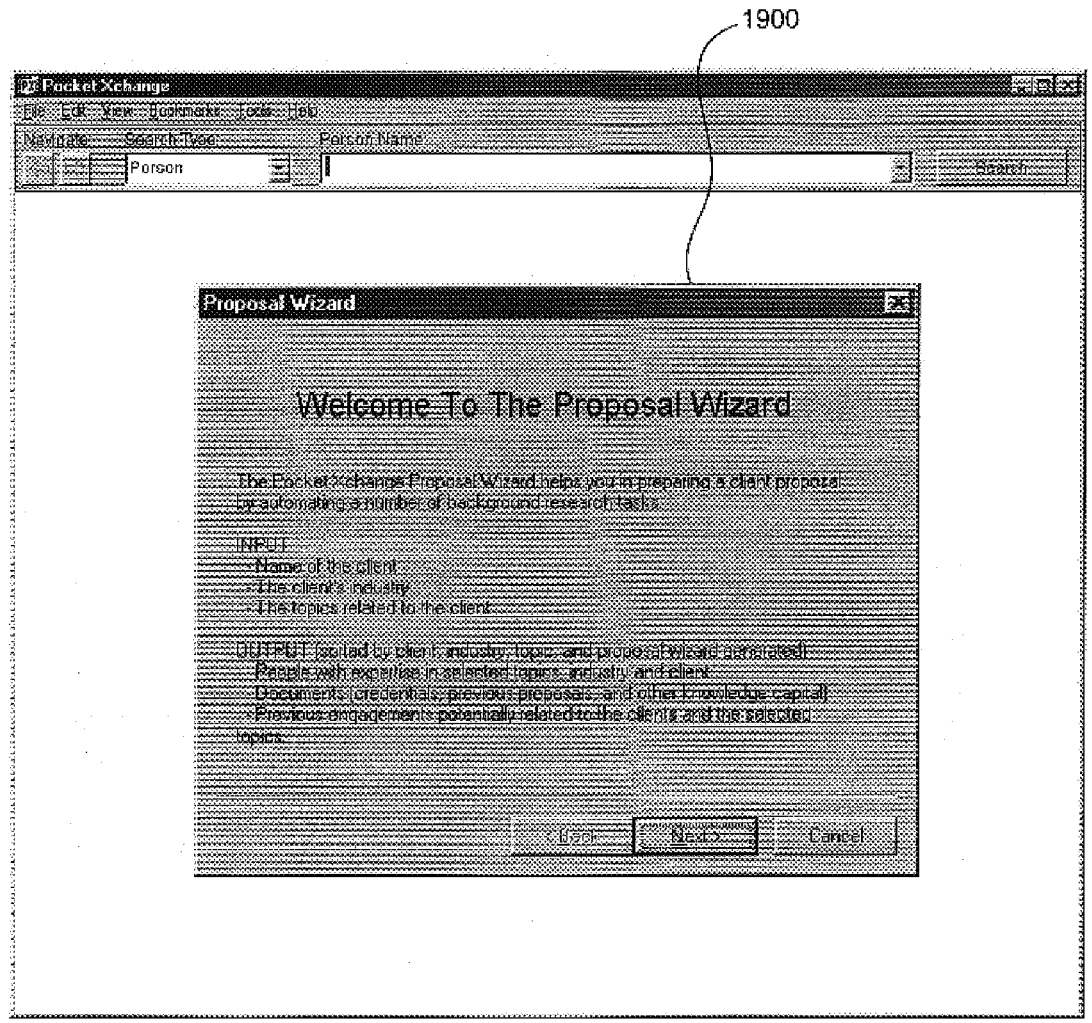
FIG. 19 depicts an introduction window that appears upon initiation of the process of FIG. 18 in accordance with one embodiment of the present invention.
Figure 20:
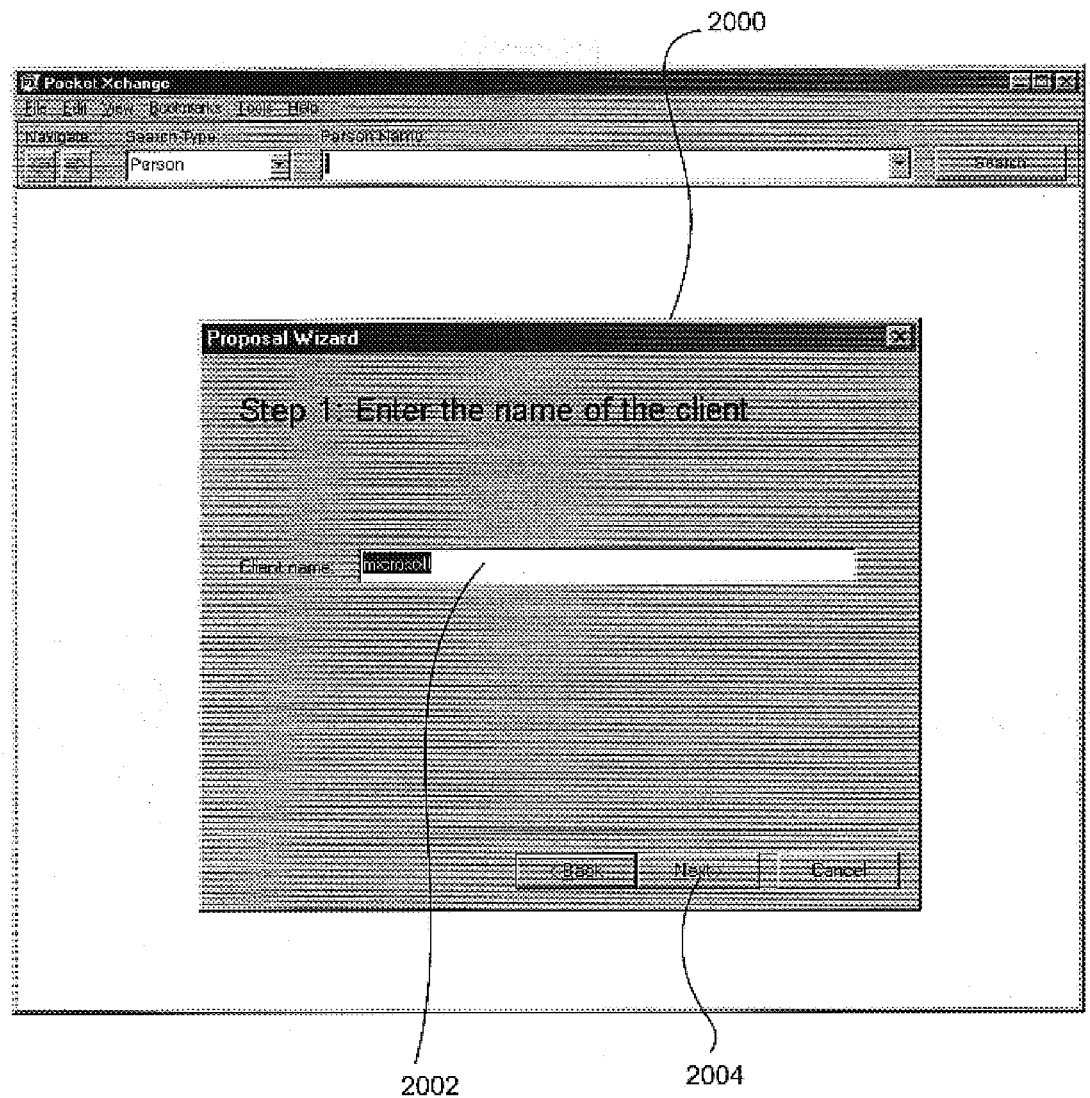
FIG. 20 illustrates a text box for entry of the name of the client about whom a dossier is to be prepared according to one embodiment of the present invention.
Figure 21:
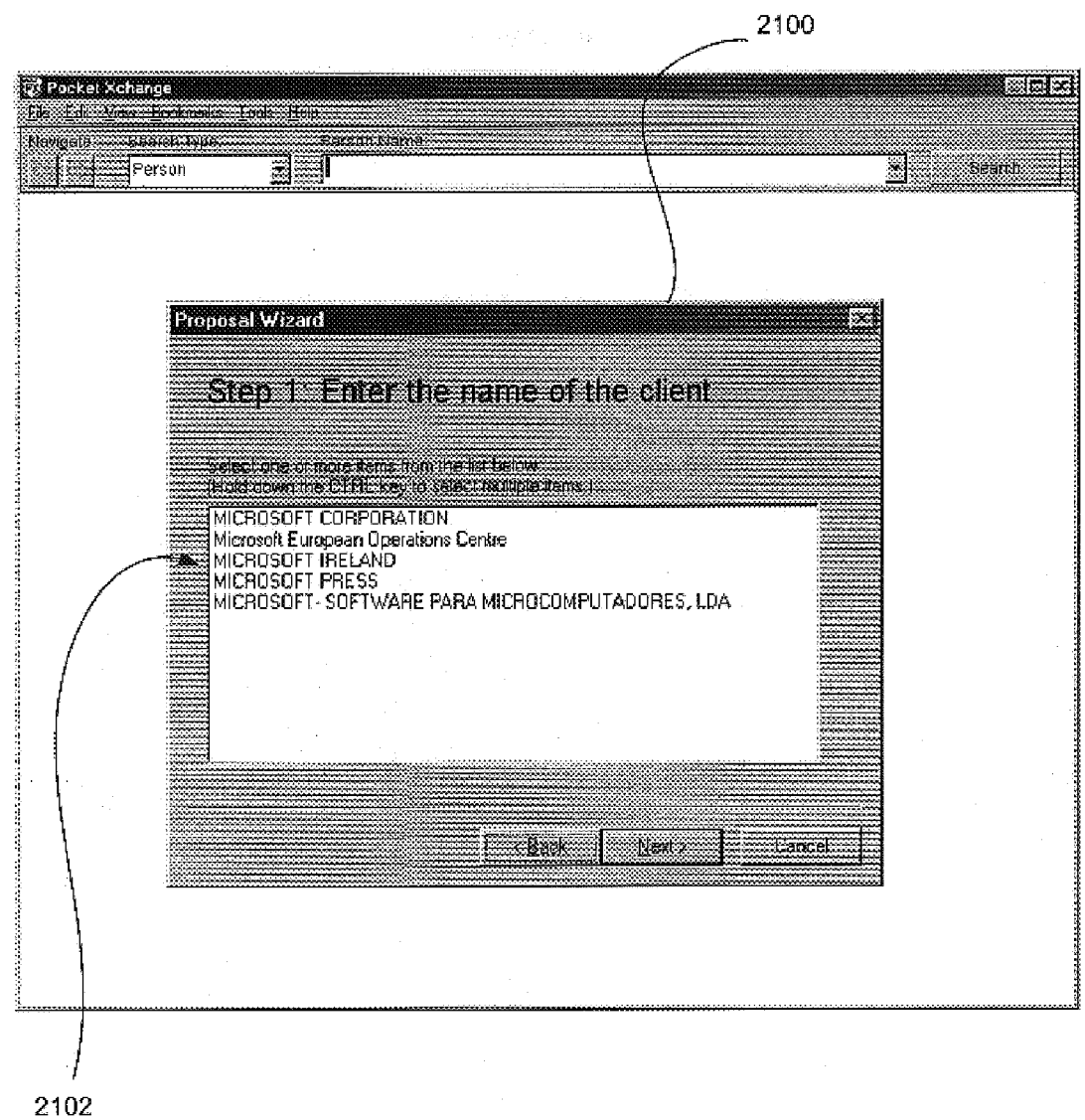
FIG. 21 shows a client result window with a list of clients matching the name entered in the text box of FIG. 20.

Step 1—After an introduction window 1900 (FIG. 19), a text box window 2000 is shown. See FIG. 20. Enter the name of the client in the text box 2002 and press the Next button 2004. As shown in FIG. 21, a list of clients 2102 matching the name entered in the text box is displayed in a client result window 2100. Select one or more clients which may be relevant to the proposal. Increasing the number of clients may increase the time necessary to prepare the proposal dossier.

Figure 22:
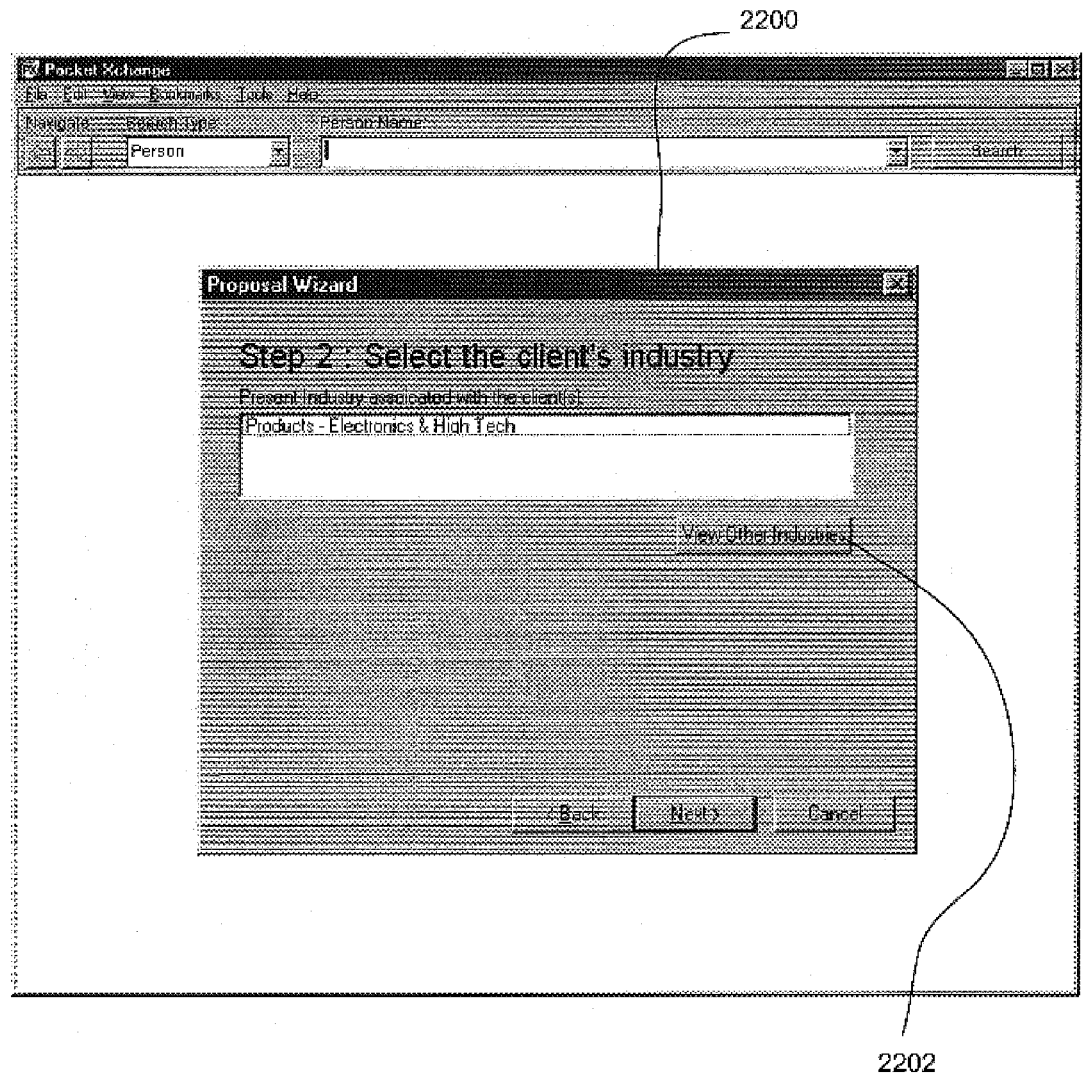
FIG. 22 illustrates a window that displays a list of industries associated with the client(s) selected from the list displayed in the window of FIG. 21.
Figure 23:
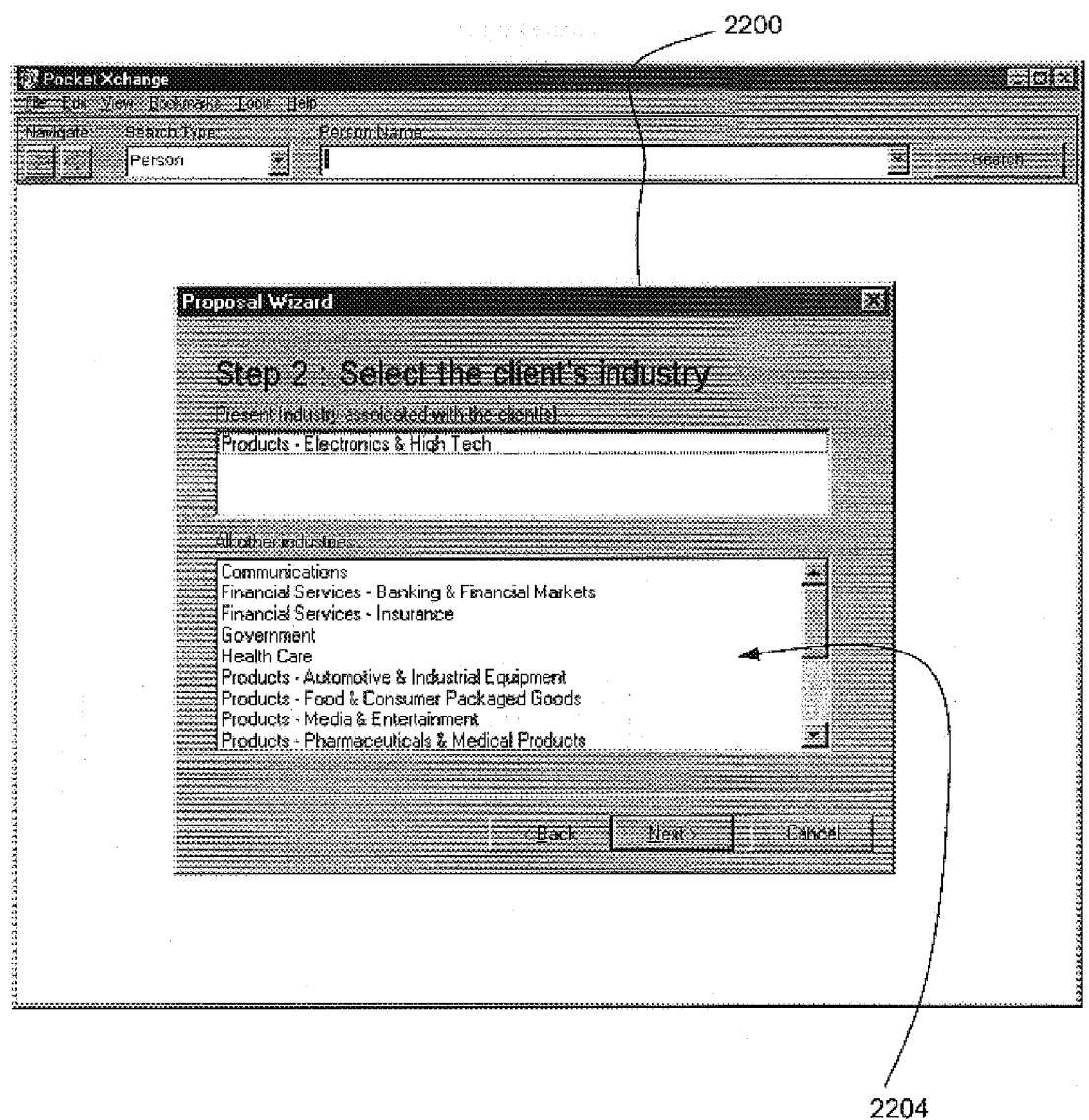
FIG. 23 illustrates a list of other industries that appear in the window of FIG. 22 when the View Other Industries button of the window of FIG. 22 is selected.

Step 2—A list of industries associated with the selected client(s) is presented in window 2200, as shown in FIG. 22. Select the appropriate industry for the proposal. If the proper industry is not shown, press the View Other Industries button 2202 to select from an alternate list of industries. FIG. 23 illustrates a list of other industries 2204 that appear in window 2200 when the View Other Industries button 2202 is pressed.

Figure 24:
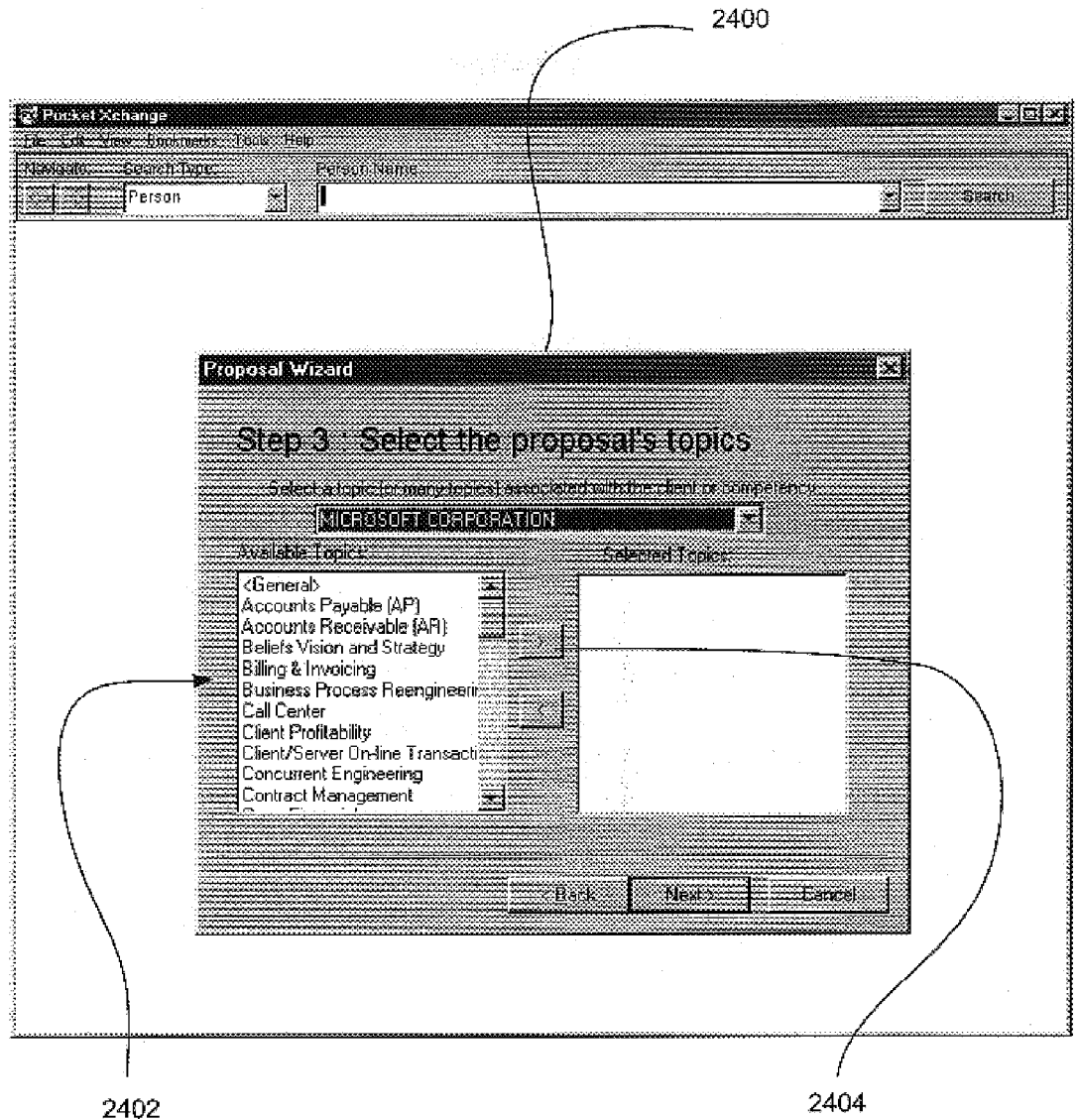
FIG. 24 depicts a window that displays user-selectable topics for the proposal dossier from a list of available topics.

Step 3—Referring to FIG. 24, choose any appropriate topics for the proposal dossier from the list of available topics 2402 in window 2400. Select topics from the lists associated with the BI Competencies or each of the selected clients and click the right-arrow button 2404 to add them to the proposal dossier. A dossier may be prepared without any topics selected; therefore, it is not necessary to choose a topic to proceed. Increasing the number of topics may increase the time necessary to prepare the proposal dossier.

Figure 25:
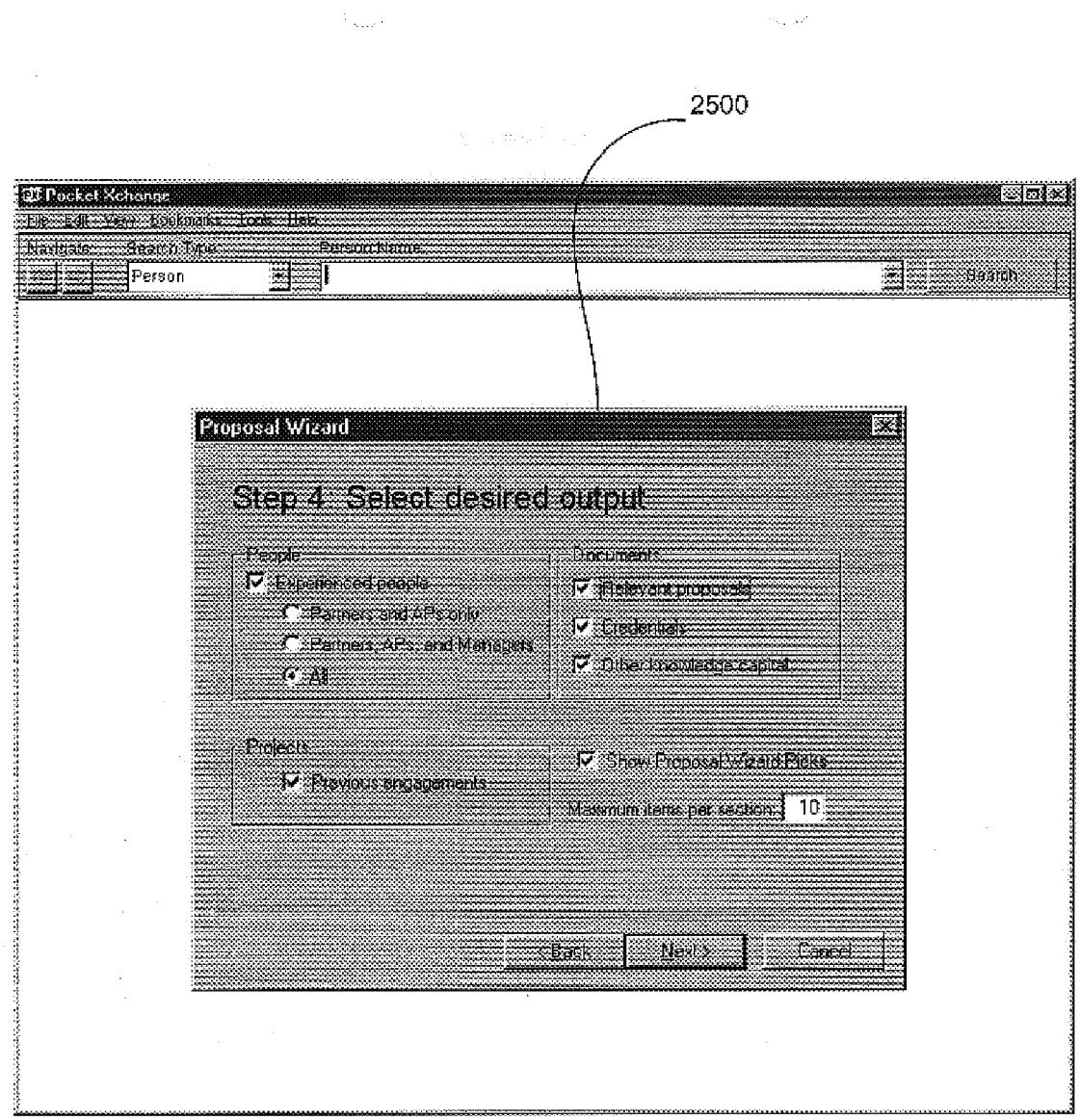
FIG. 25 illustrates a window that allows selection of items that will be displayed in the dossier.

Step 4—Window 2500 allows selection of items which will be displayed in the proposal dossier. See FIG. 25. Select the items which you wish to have displayed in the proposal dossier.

Figure 26:
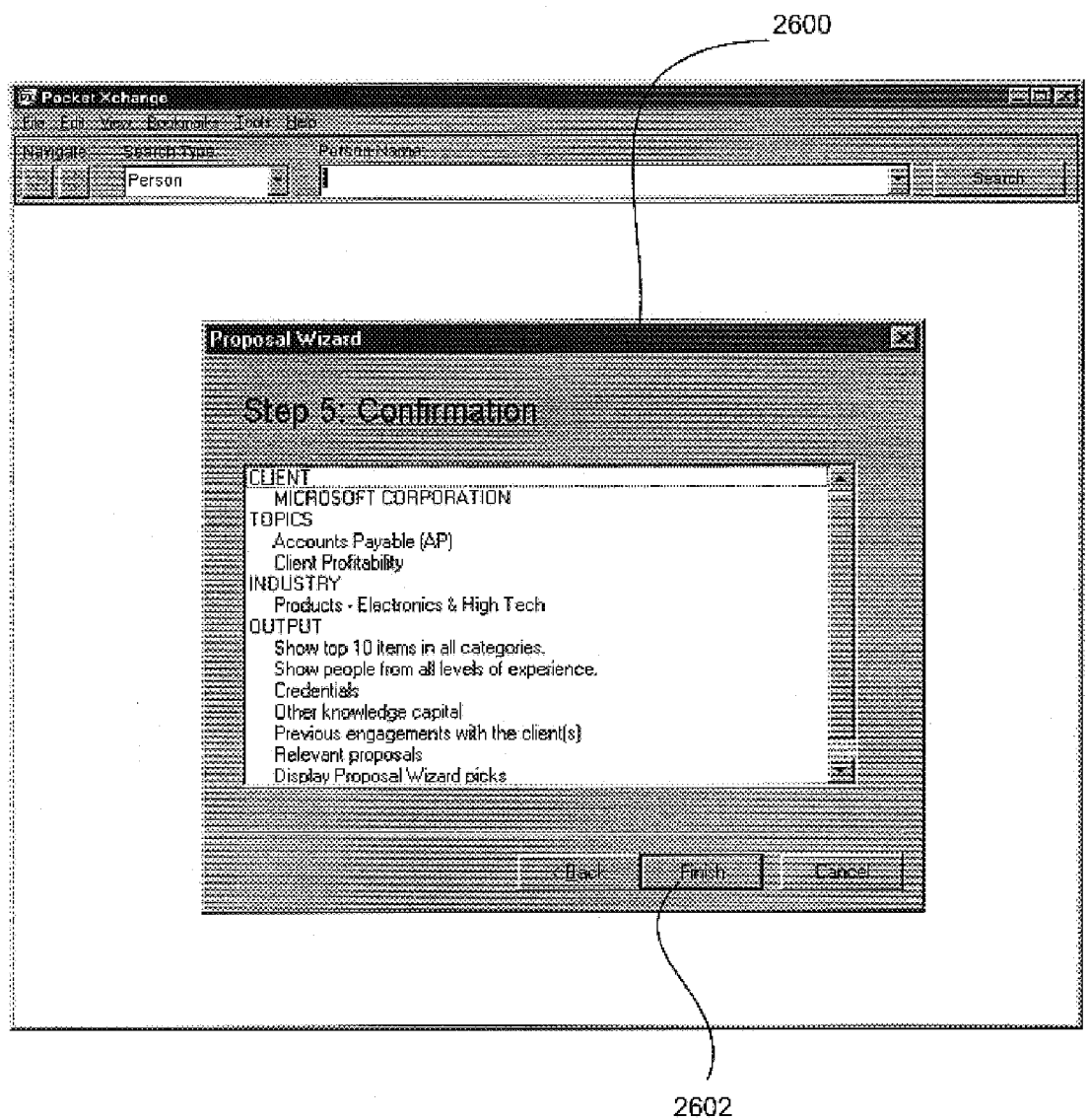
FIG. 26 is a verification window that allows a user to verify that all information is correct.

Step 5—Verify that all information is correct in window 2600 (FIG. 26) and click the Finish button 2602 to prepare the dossier.

Figure 27:
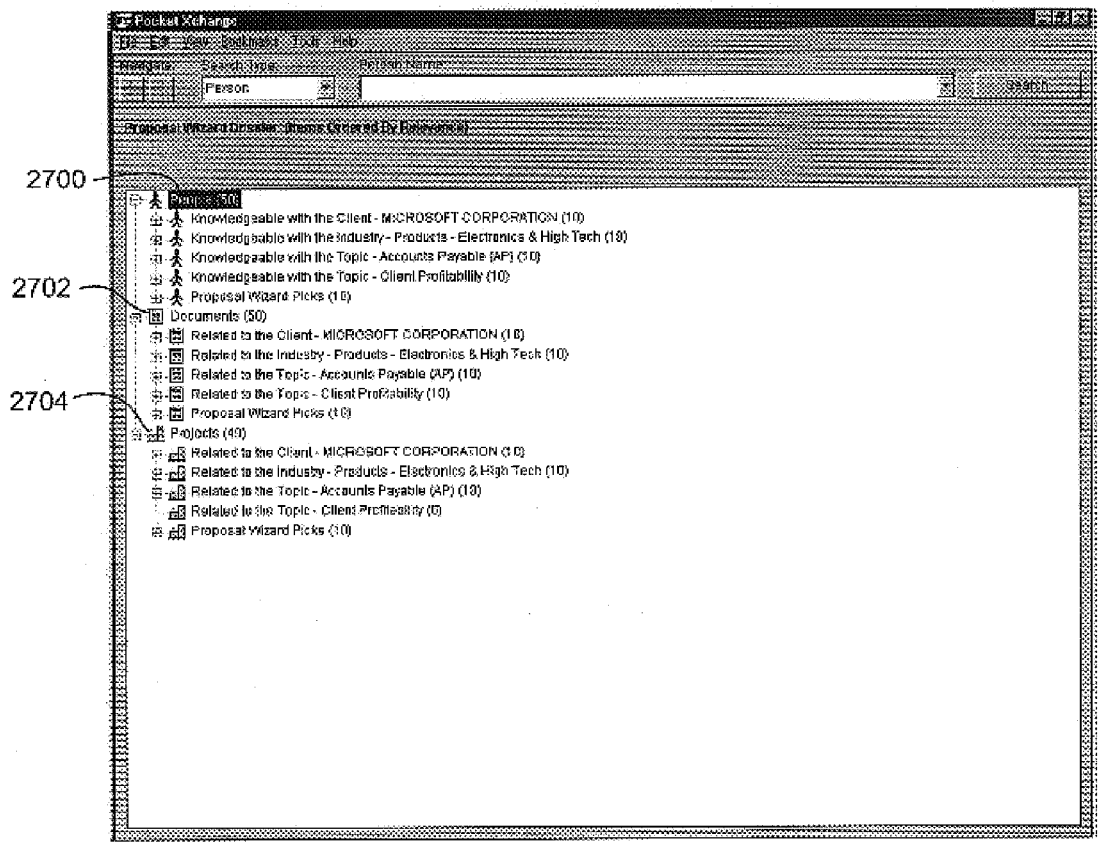
FIG. 27 illustrates the resultant dossier created by the process of FIG. 18.

FIG. 27 illustrates the resultant dossier. As shown, expandable nodes and subnodes relating to people 2700, documents 2702, and projects 2704 are displayed.

Each section of the dossier is arranged for easy access to the best information. The People sections are arranged according to the number of documents and projects an individual has produced related to that client, industry, or topic. The Documents and Projects sections are arranged chronologically, with the most recent information displayed first.

The Proposal Wizard Picks section of the dossier is an attempt to predict the most relevant people, documents, and projects for the proposal based on a weighting scheme. The weighting scheme takes into account a person's (or document's or project's) relevance with respect to the chosen clients, industry, and topics. This is by no means a complete list, but merely a starting point.

The following table is used to clarify terms used in the detailed description of the invention.

AAA Authentication, Authorization, Addressing
ADSL Asymmetric Digital Subscriber Line
AIN Advanced Intelligent Networks
AMA Automatic Message Accounting
ATM Asynchronous Transfer Mode
BIM Business Integration Methodology
BSS Business Support System
CDR Call Detail Record
DTMF Dual-Tone Multi-Frequency
GSM Global System for Mobile Communications
IN Intelligent Network
IP Internet Protocol
JPEG Joint Picture Expert Group
LMDS Local Multi-Point Distribution Service
MPEG Moving Picture Expert Group
NGN Next Generation Network
OSS Operational Support Systems
PCM Pulse Code Modulation
PSTN Public Switched Telephone Network
QoS Quality of Service
RAS Remote Access Server
SCE Service Creation Environment
SCP Service Control Point
SMDS Switched Multi Megabit Data Service
SSP Service Switching Point
SONET Synchronous Optical Network
STP Service Transfer Point
TCP Transmission Control Protocol
xDSL Generic name for Digital Subscriber Line
(D)WDM (Dense) Wave Division Multiplexing.

Data networks today rely heavily on shared medium, packet-based LAN technologies for both access and backbone connections. The use of packet switching systems, such as bridges and routers, to connect these LANs into global internets is now widespread. An internet router must be capable of processing packets based on many different protocols, including IP, IPX, DECNET, AppleTALK, OSI, SNA and others. The complexities of building networks capable of switching packets around the world using these different protocols is challenging to both vendors and users.

Standards-based LAN systems work reasonably well at transfer rates up to about 100 Mbps. At transfer rates above 100 Mbps, providing the processing power required by a packet switch interconnecting a group of networks becomes economically unrealistic for the performance levels desired. This inability to economically "scale up" performance is beginning to cause restrictions in some user's planned network expansions. Also, today's data networks do not provide network managers with enough control over bandwidth allocation and user access.

Tomorrow's networks are expected to support "multimedia" applications with their much greater bandwidth and real-time delivery requirements. The next generation networks should also have the ability to dynamically reconfigure the network so that it can guarantee a predetermined amount of bandwidth for the requested quality of service (QOS). This includes providing access, performance, fault tolerance and security between any specified set of end systems as directed by the network's manager. The concept is to provide network managers with complete "command and control" over the entire network's infrastructure—not just tell them when a failure has occurred.

A new set of technologies known as asynchronous transfer mode (ATM) may provide the best long-term solution for implementing the requirements of both private and public internets. ATM promises to provide a more economical and scalable set of technologies for implementing the ultra-high-performance information networks that will be required to provide the quality of service users will demand. Thus, over the next 20 years, the network infrastructure may change from packet-based standards to one based on ATM cell switching. While changes in the accompanying network will be dramatic, it would be desirable for users making the transition to be able to retain their most recent equipment investment.

Another expected change in tomorrow's networks is a change in data flow. Data flow in today's network typically follows the client-server computing model. This is where many clients are all transferring data into and out of one or more network servers. Clients do not normally talk to each other; they share data by using the server. While this type of data exchange will continue, much more of the information flow in tomorrow's networks will be peer-to-peer. Since the ultimate goal is a truly distributed computing environment where all systems act as both the client and server, more of the data flow will follow a peer-to-peer model. The network will be required to provide more direct access to all peers wishing to use high-performance backbone internets connecting, for example, the desktop computers.

The bulk of information transported in the future will be of digital origin. This digital information will require a great deal more bandwidth than today's separate voice, fax, and SNA networks which operate with acceptable performance using voice grade telephone lines. Voice will shrink as a percentage of total traffic, while other forms of information including image and video will greatly increase. Even when compressing is available, the bandwidth requirements for both inside and outside building networks will need to be greatly expanded.

Text files and images can be sent over existing packet-based networks because the delivery of this information is not time critical. The new traffic (voice and video) is delivery time sensitive—variable or excessive latency will degrade the quality of service and can render this information worthless.

The usefulness of packet switching networks for the transmission of digital information, particularly burst type information, has long been recognized. Such networks are generally point-to-point in nature in that a packet from a single source is directed to a single destination by an address attached to the packet. The network responds to the packet address by connecting the packet to the appropriate destination.

Packet switching networks are also used which combine burst type data with the more continuous types of information such as voice, high quality audio, and motion video. Commercialization of voice, video and audio transmission makes it desirable to be able to connect packets to multiple destinations, called packet broadcasting. For example, a broadcast video service such as pay-per-view television involves a single source of video packets, each of which is directed to multiple video receivers. Similarly, conferencing capabilities for voice communication also require single source to multiple destination transmission.

One prior packet broadcast arrangement comprises a network consisting of a packet duplication arrangement followed by a packet routing arrangement. As a broadcast packet enters this network, packet copies are made in the packet duplicating arrangement until as many copies exist as there are destinations for the packet. A translation table look up is then performed at the duplication arrangement outputs for each of the packet copies to provide a different, single destination address for each copy. All of the packet copies with their new packet addresses are then applied to the packet routing arrangement, which connects them to the appropriate network output ports.

In packet switching networks, packets in the form of units of data are transmitted from a source—such as a user terminal, computer, application program within a computer, or other data handling or data communication device—to a destination, which may be simply another data handling or data communication device of the same character. The devices themselves typically are referred to as users, in the context of the network. Blocks or frames of data are transmitted over a link along a path between nodes of the network. Each block consists of a packet together with control information in the form of a header and a trailer which are added to the packet as it exits the respective node. The header typically contains, in addition to the destination address field, a number of subfields such as operation code, source address, sequence number, and length code. The trailer is typically a technique for generating redundancy checks, such as a cyclic redundancy code for detecting errors. At the other end of the link, the receiving node strips off the control information, performs the required synchronization and error detection, and reinserts the control information onto the departing packet.

Packet switching arose, in part, to fulfill the need for low cost data communications in networks developed to allow access to host computers. Special purpose computers designated as communication processors have been developed to offload the communication handling tasks which were formerly required of the host. The communication processor is adapted to interface with the host and to route packets along the network; consequently, such a processor is often simply called a packet switch. Data concentrators have also been developed to interface with hosts and to route packets along the network. In essence, data concentrators serve to switch a number of lightly used links onto a smaller number of more heavily used links. They are often used in conjunction with, and ahead of, the packet switch.

In virtual circuit (VC) or connection-oriented transmission, packet-switched data transmission is accomplished via predetermined end-to-end paths through the network, in which user packets associated with a great number of users share link and switch facilities as the packets travel over the network. The packets may require storage at nodes between transmission links of the network until they may be forwarded along the respective outgoing link for the overall path. In connectionless transmission, another mode of packet-switched data transmission, no initial connection is required for a data path through the network. In this mode, individual datagrams carrying a destination address are routed through the network from source to destination via intermediate nodes, and do not necessarily arrive in the order in which they were transmitted.

The widely-used Telenet public packet switching network routes data using a two-level hierarchy. The hierarchy comprises a long distance-spanning backbone network with a multiplicity of nodes or hubs, each of which utilizes a cluster of backbone switches; and smaller geographic area networks with backbone trunks, access lines and clustered lower level switches connected to each hub. Packet-switched data is transmitted through the network via VCs, using CCITT (International Telegraph and Telephone Consultative Committee of the International Telecommunications Union) X.75 protocol, which is a compatible enhancement of X.25 protocol.

For a communication session to proceed between the parties to a connection, it is essential that data be presented in a form that can be recognized and manipulated. The sequence of required tasks at each end, such as the format of the data delivered to a party, the rate of delivery of the data, and resequencing of packets received out of order, is generally handled in an organized manner using layered communication architectures. Such architectures address the two portions of the communications problem, one being that the delivery of data by an end user to the communication network should be such that the data arriving at the destination is correct and timely, and the other being that the delivered data must be recognizable and in proper form for use. These two portions are handled by protocols, or standard conventions for communication intelligently, the first by network protocols and the second by higher level protocols. Each of these protocols has a series of layers. Examples of layered architectures include the Systems Network Architecture (SNA) developed by IBM, and the subsequently developed Open Systems Interconnection (OSI) reference model. The latter has seven layers, three of which are network services oriented including physical, data link, and network layers, and the other four providing services to the end user by means of transport, session, presentation, and application layers, from lowest to highest layer.

X.25 is an interface organized as a three-layered architecture for connecting data terminals, computers, and other user systems or devices, generally refereed to as data terminal equipment (DTE), to a packet-switched network through data circuit terminating equipment (DCE) utilized to control the DTE's access to the network.

The three layers of the X.25 interface architecture are the physical level, the frame level and the packet level. Although data communication between DCEs of the network is routinely handled by the network operator typically using techniques other than X.25, communication between the individual user system and the respective DCE with which it interfaces to the network is governed by the X.25 or similar protocol. In essence, X.25 establishes procedures for congestion control among users, as well as call setup (or connect) and call clearing (or disconnect) for individual users, handling of errors, and various other packet transmission services within the DTE-DCE interface.

X.25 is employed for virtual circuit (VC) connections, including the call setup, data transfer, and call clearing phases. Call setup between DTEs connected to the network is established by one DTE issuing an X.25 call-request packet to the related DCE, the packet containing the channel number for the logical connections, the calling and called DTE addresses, parameters specifying the call characteristics, and the data. The destination DCE issues an incoming call packet, which is of the same general format as the call-request packet, to the destination DTE, the latter replying with a call-accepted packet. In response, the calling DCE issues a call-connected packet to its related DTE. At that point the call is established and the data transfer phase may begin by delivery of data packets. When the call is compared, i.e., the session is to end, a call-clearing procedure is initiated.

Prospective routing paths in the network are initially determined by a network control center, which then transmits these predetermined paths to the backbone switches as routing tables consisting of primary and secondary choices of available links from each hub. The secondary choices are viable only in the event of primary link failures, and the specific secondary link selection is a local decision at the respective hub based principally on current or recent traffic congestion patterns. The unavailability of an outgoing link from a hub at the time of the call setup effects a clearing back of the VC for the sought call to the preceding hub. An alternative link is then selected by that hub, or, if none is available there, the VC circuit is again cleared back to the next preceding hub, and so forth, until an available path is uncovered from the routing tables. Messages concerning link and/or hub failures are communicated immediately to the network control center, and that information is dispatched to the rest of the network by the center.

In typical present-day concentrators and packet switches, the data processing devices reside in a plurality of cards or boards containing printed circuits or integrated circuits for performing the various functions of the respective device in combination with the system software. Typically, the cards are inserted into designated slots in cages within a console, with backplane access to a data bus for communication with one another or to other devices in the network. The VME bus is presently the most popular 16/32-bit backplane bus. References from time to time herein to cards or boards will be understood to mean the various devices embodied in such cards or boards.

Many public data networks (PDNs) offer little or no security for communications between users and hosts or other data processing devices within the network, in keeping with the "public purpose" of the network and the desire for accessibility by a large number of actual and prospective users. Where restrictions on access are necessary or desirable, it is customary to assign each authorized user an identification (ID) number or a password, or both, which must be used to gain access to the host. More elaborate security measures are necessary where access may be had to highly confidential data.

Some data communication networks involve a variety of different customers each of whom makes available a host and one or more databases to its users, and may place a level of security on its database which differs from the level placed by other customers on their respective hosts and databases. In those instances, it is customary to make the host responsible for security and access to itself and its associated database. Thus, a user might have access to certain destinations in the network without restriction, but no access to other destinations.

Market Drivers

According to Yankee Group Research, network management costs continue to increase, with network managers spending an average of 45 percent of their budget on ongoing network management, 20 percent on equipment, and 35 percent on network transport services. It is a constant battle to reduce these costs yet somehow improve overall service to their customers. Reducing overall network management costs can be very difficult in today's business environment. Networks continue to become more complex, with more and more demands being placed on the network managers and planners. For example, the exponential growth of remote access has made their jobs more difficult, as the requirement to establish and manage connections for remote offices and telecommuters is often required without additional personnel or budget resources. Unfortunately, network managers and planners spend so much time in "firefighting" mode, trying to support their complex networks, that very little time is actually spent planning for network growth and enhancements. Combined with this is the fact that it is becoming difficult to keep highly skilled employees given the demand for certain skills in the marketplace, and the premiums that will be paid for those skills. So, what is a network manager to do? More and more, they are looking outside for help.

The market for customer network management services is generally referred to as Managed Networked Services (MNS). Yankee Group estimates this market will estimated to grow from $3 B to 9 B within the next three years. MNS became the focus of service providers in 1995 as they saw revenues for frame relay network services double for two years in a row. What began as a way to boost the popularity of frame relay services by offering to lease and manage routers has blossomed into a diverse set of services that are now closer to those associated with outsourcing.

Yankee Group research shows that 37 percent of Fortune 1000 managers are already outsourcing or plan to outsource their ongoing network operations management. In addition, it is the communications provider that is thought of as the most likely provider for one-stop shopping services.

The present invention's overall approach to implementing the NM/MNS market offering is two fold. The current opportunity that presents itself is MNS. While this market opportunity for clients is large, they need assistance in understanding data network management—for years they have been solely focused on voice. Additionally, they need to move into this market quickly in order to maintain and grow revenue. To this end, the present invention includes a set of assets consisting primarily of job aids and software that can greatly reduce our clients lead time for service implementation.

Secondly, the present invention assists service providers by providing them the tools to better manage their carrier data networks—the packet switched networks of the future. The present invention significantly enhances and scales MNS assets to address carrier network management in a data networking world. This solution template enables the convergence of circuit and packet switching network control centers and workforces.

The present invention's market offering suggests companies take a graduated approach to delivering MNS. One end of the continuum consists of MNS for current network services, including leased lines, frame relay, and X.25. On the far end is outsourced MNS characterized by long-term contracts, involving hundreds of millions of dollars. The NM/MNS market offering is proposing our clients go beyond the management of the router and the WAN, and into the world of the local area network (LAN), even as far as the desktop and business applications. Service providers have been intimidated by these propositions in the past, since management of the LAN and its equipment and applications has clearly not been their forte.

It is hard to describe a typical MNS engagement because this is such a new. There are three "entry points" in which the present invention can become involved in helping our companies to move into the MNS market:

Business Strategy—Companies may look to the present invention for assistance in creating a business strategy for entering the MNS market. Typically, this type of engagement will defines a company's target market for MNS (small, mid-market, large) and defines the service offerings that are best suited for the company to offer. These engagements will be followed by analysis, design and implementation projects.

Requirements Analysis—Companies may already have developed a concrete business strategy that defines which services they will offer within markets. In this case, the present invention's work will begin by helping define the company's network environment requirements. This work will be followed by design and implementation projects.

Design and Implementation—Companies may be ready to move to the design and implementation phases of creating an MNS capability. Generally, the present invention will confirm that their network meets the requirements to provide the service, then assist the client in the designing and implementing an appropriate solution suite.

In an effort to clearly communicate exactly how we define NM/MNS we have created an online catalog of services. The present invention's solution is a continuous cycle that begins with the four major processes associated with NM/MNS. These processes drive the technology and the people components of the solution. Within each of these processes are a number of core functions and sub-functions. The MNS Online Catalog contains all of this information, including the supporting process, technology and organizational solutions for each function.

Our solution is called the Managed Networked Services Integrated Solution (MNSIS) and has been developed using an approach which integrates Process, Technology, and People considerations.

Process

At the highest level, there are four major processes that must be performed to manage any network:

Service Planning
Managing Change
Operations Management
Service Management.

Each process should be performed in order to provide a complete NM/MNS solution. As mentioned above, each process has a number of associated functions and sub-functions that provide the complete picture of the process. The major functions associated with each process are as follows.

Technology

The main goal of the technology solution is to provide access to network information to make informed decisions. The present invention includes three layers of management: element management, information services management and presentation management. Every action starts with an incident. Processing is tailored to handling the incident with technology that responds to the unique characteristics of each incident.

Element Manager

The element manager communicates with the network elements to receive alarms and alerts through trapping and polling techniques. The element manager is the layer where the primary data reduction functions reside. At this layer, events received at the element manager will be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an Object Request Broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF. The second environment is potentially bandwidth poor where dial-up or wireless access may be used along with more traditional LAN access. This is also where browser technology is employed.

People

The people vision for the NM/MNS include an organization model for customer service support, the corresponding roles and responsibilities for this organization model and a conceptual design for workforce transformation to packet switching.

Customer Service Support

Customer service support provides a single point of contact that is customer focused. This single point of contact provides technical expertise in resolving customer incidents, troubles and requests. Generally a three tiered support structure is optimal for satisfying customer service needs. Each tier, or level, possesses an increasing level of skill, with tasks and responsibilities distributed accordingly. Such a structure is as follows:

Tier 1—typically has a broad set of technical skills and is the first level of support to the customer. Typically this group is responsible for resolving 60–70 percent of the opened problems.

Tier 2—are technical experts and field support personnel who may specialize in specific areas. Typically this group is responsible for resolving 30–40 percent of the opened problems.

Tier 3—are considered solution experts and often consist of hardware vendors, software vendors or custom application development/maintenance teams (in-depth skills needed to investigate and resolve difficult problems within their area of expertise). They are the last resort for solving the most difficult problems. Typically this group is responsible for resolving 5 percent or fewer of the opened problems.

The above model is generally referred to as the Skilled Model because personnel at all three tiers are highly skilled. This model generally creates a high percentage of calls resolved on the first call. Other approaches include:

Functional Model

In this model, users are requested to contact different areas (via VRU) depending on the nature of the incident. Calls are routed to the customer support representative best able to handle the call. This model can easily be coupled with the Skilled Model, and has been at previous client engagements.

Bypass Model

In this model, Tier 1 only logs calls; they do not resolve calls. One advantage of this model is that skilled resources don't have to waste time logging calls.

Software and Assets

Managed Networked Services Integrated Solution—The integrated network management solution template consists of a suite of best of breed third party software products that automate problem diagnosis, notification, custom-developed reporting, and IP services monitoring. This solution template is a great first step in realizing our technology solution vision.

Web-Based SLA Reporting Tool—is a browser based tool that provides the personalized SLA reports to customers in both a template and ad-hoc format.

Data Mining Demonstration—Provides the capability to analyze network management data looking for patterns and correlations across multiple dimensions.

Build models of the behavior of the data in order to predict future growth or problems and facilitate managing the network in a proactive, yet cost-effective manner.

Customer to Event Mapping Module—Add-on module to the Managed Networked Services Integrated Solution which maps network element events, to service offerings, to customers. This tool allows the Customer Service Representative to proactively address network outages with customers.

Process Definitions and Functions

Service Planning

Service Planning includes both the strategic and tactical planning required to manage distributed environments effectively. Although most planning typically occurs during rollout of the system, certain planning activities must otherwise take place. Service Planning ensures that change can be successfully controlled and implemented.

Service Management Planning

Operations Management Planning

Managing Change Planning

Strategic Planning.

Managing Change

Includes processes and procedures for handling necessary changes to systems or the organization in a distributed environment.

Change Control

Testing

Implementing

Software Distribution.

Operations Management

Systems Management consists of the day-to-day operational functions required to maintain the system (e.g. fault detection/correction, security management and performance management).

Production Control

Monitoring and Control

Fault Management

Security Management.

Service Management

Service Management controls the overall service to the users of the system. It isolates users from how the system is managed, and ensures that users receive the quality support services they need to carry out their daily business activities.

SLA/OLA Management

Help Desk

Quality Management

Billing and Accounting.

The present invention includes a system, method, and article of manufacture for providing a hybrid circuit switched/packet switched network. This hybrid network is used as a transitioning network to transition from old "Core"

network architectures to "New Core" networks. In the present description, the details of the NGN transitioning network will first be set forth after which details relating to specific billing aspects of the present invention will be described.

PSTN, wireless, and cable networks have continued to grow at their organic rates determined by the growth of the vertical services they were providing. In the beginning, the data networks used a small portion of the backbone SONET bandwidth, while PSTN was still the dominant bandwidth user. Due to the exponential growth in IP traffic, the IP based data networks are soon slated to utilize more bandwidth than the PSTN. Also huge technical advances in packet technologies have made it possible to carry traditional voice over IP networks. This has started a move towards the "Next Generation Network (NGN)" where there will be more sharing of common network infrastructure to provide services, and these services will start to become more interoperable. The main thrust of technologies in the "NGN" will be to provide interoperability between the new packet based infrastructure and existing legacy infrastructures. Due to the large investments made in the legacy infrastructure, they will continue to exist for some time, but most new innovations will occur on the packet based infrastructure. Slowly, the parallel networks that were created to serve distinct services will merge to use a common packet based backbone and only differ in how access is provided (wire-line, wireless, cable, satellite). The "NGN" is a transition network which will exist during the transformation from the current "Core" to the "New Core".

As packet technologies continue to develop rapidly, it will be possible to support what was once a distinct set of services (voice, video, wireless) on separate parallel networks, on one integrated packet based network. There will still be separate access technologies (wireless, satellite, cable, wire-line) to access these services, but the access networks will all use a common "New Core" network and its capabilities.

The services will be interoperable across various access technologies, and users will freely use services that cross many access technologies, e.g. wireless to cable phone services, web browsing from wireless devices etc.

The present invention maps a course for the network evolution from circuit to packet switched technology using a migratory approach in which the network becomes a hybrid circuit and packet topology over a 3 to 7 year period.

Next, the network architecture for the wire-line network as it transforms from "Core" to "NGN" to "New Core" will be described. Followed by architecture for cable, wireless and satellite based access networks.

The Wire-line Network Architecture

"Core" Network Architecture

The current wire-line "Core" network consists of parallel PSTN, SMDS, ATM, Frame-Relay, B/PRI and IP networks. The PSTN network has been evolving over the last century and is a mix of old and new circuit switched technologies. The PSTN network mainly provides point-to-point interactive two-way voice communication services. The service set has evolved to include many intelligent network (IN) service features. During the late 1980s, Advanced Intelligent Networks (AIN) emerged as the architecture to support new voice based services on the PSTN infrastructure.

IN Requirements and Architecture in the Current "Core"

The major IN requirements include session establishment, advanced call processing, call routing and call treatment (network messages and call termination). Examples of applications and features are the CLASS family of services (Call waiting, Call forwarding, Conference calling, Call rejection), enhanced call routing, Number Portability, Calling Card Services, and Audio delivered Information Services (e.g. travel, stocks and weather).

These IN capabilities are enabled by devices such as SCP, STP, SSP and EIP in the AIN environment. These devices participate in the execution and completion of an IN service. In order to develop, test and launch new IN service applications on the above mentioned components, service providers deploy Service Creation Environment (SCE) platforms, which provide an environment to quickly create new IN services. These SCE platforms are closely tied to the runtime environment and therefore with very few exceptions become a major undertaking and a complex coordination effort to launch a new or modified IN service in the "Core" network environment.

Data Networks in the "Core"

While the PSTN was growing in feature functionality as well as traffic demand, new data networks have been created to support the inter-networking of computing devices. These data networks provide interconnection to geographically dispersed computing devices at varying levels of transmission bandwidth (e.g. 56/64K, T-1/E-1, T-3/E-3, OC-3/STM-1). The data networks consist of many technologies e.g. SMDS, ATM, frame-relay and IP. In some cases, these data networks themselves are parallel networks, in other cases, they share a common technology in the backbone (e.g. ATM can be the backbone for frame relay and IP data networks). These data networks share the same SONET based backbone with the PSTN network. The services on the PSTN and the data networks are very distinct and non-interoperable (example: voice versus web access).

With the rapid explosion of the Internet, and innovation in packet based technologies, the IP based data network has become the dominant network in terms of user traffic, and its growth is slated to continue exponentially. This phenomenon has created a dilemma for traffic planners and engineers of the Core network. They have seen traffic grow on the access portions of their networks (PSTN) but have realized very little financial benefits from this usage because third party service providers have been the termination point of these internet data users. The incumbents have began to devise intelligent network solutions for this data traffic (example RAS with SS7 gateway) in order to solve two major challenges: 1) off loading data traffic from the voice infrastructure to alleviate the congestion issues that face traditional voice customers and 2) collecting revenues from the third party data services providers (ISP's) for access and routing callers to their Points Of Presence.

Due to the high growth in IP and other data services, many new service providers have emerged that are building only IP based data networks, and provide only IP based data services. Their business strategy is to continue to ride the technological innovation of IP and packet based technologies and build complete suites of services on a packet based infrastructure. Because they are investing in only one form of network (as opposed to many parallel networks), their unit cost of services is low, they are not encumbered by legacy networks and systems, and they can provide cheaper and better services to customers; hence they pose a significant threat to incumbent telecom service providers.

Internet

The Internet is a method of interconnecting physical networks and a set of conventions for using networks that allow the computers they reach to interact. Physically, the Internet is a huge, global network spanning over 92 countries and comprising 59,000 academic, commercial, government, and military networks, according to the Government Accounting Office (GAO), with these numbers expected to double each year. Furthermore, there are about 10 million host computers, 50 million users, and 76,000 World-Wide Web servers connected to the Internet. The backbone of the Internet consists of a series of high-speed communication links between major supercomputer sites and educational and research institutions within the U.S. and throughout the world.

Protocols govern the behavior along the Internet backbone and thus set down the key rules for data communication. Transmission Control Protocol/Internet Protocol (TCP/IP) has an open nature and is available to everyone, meaning that it attempts to create a network protocol system that is independent of computer or network operating system and architectural differences. As such, TCP/IP protocols are publicly available in standards documents, particularly in Requests for Comments (RFCs). A requirement for Internet connection is TCP/IP, which consists of a large set of data communications protocols, two of which are the Transmission Control Protocol and the Internet Protocol.

The International Telecommunication Union-Telecommunication Standardization Sector ("ITU-T") has established numerous standards governing protocols and line encoding for telecommunication devices. Because many of these standards are referenced throughout this document, summaries of the relevant standards are listed below for reference.

ITU G.711 Recommendation for Pulse Code Modulation of 3 kHz Audio Channels.

ITU G.722 Recommendation for 7 kHz Audio Coding within a 64 kbit/s channel.

ITU G.723 Recommendation for dual rate speech coder for multimedia communication transmitting at 5.3 and 6.3 kbits.

ITU G.728 Recommendation for coding of speech at 16 kbit/s using low-delay code excited linear prediction (LD-CELP).

ITU H.221 Frame Structure for a 64 to 1920 kbit/s Channel in Audiovisual Teleservices.

ITU H.223 Multiplexing Protocols for Low Bitrate Multimedia Terminals.

ITU H.225 ITU Recommendation for Media Stream Packetization and Synchronization on non-guaranteed quality of service LANs.

ITU H.230 Frame-synchronous Control and Indication Signals for Audiovisual Systems.

ITU H.231 Multipoint Control Unit for Audiovisual Systems Using Digital Channels up to 2 Mbit/s.

ITU H.242 System for Establishing Communication Between Audiovisual Terminals Using Digital Channels up to 2 Mbits.

ITU H.243 System for Establishing Communication Between Three or More Audiovisual Terminals Using Digital Channels up to 2 Mbit/s.

ITU H.245 Recommendation for a control protocol for multimedia communication.

ITU H.261 Recommendation for Video Coder-Decoder for audiovisual services supporting video resolutions of 352× 288 pixels and 176×144 pixels.

ITU H.263 Recommendation for Video Coder-Decoder for audiovisual services supporting video resolutions of 128× 96 pixels, 176×144 pixels, 352×288 pixels, 704×576 pixels and 1408×1 152 pixels.

ITU H.320 Recommendation for Narrow Band ISDN visual telephone systems.

ITU H.321 Visual Telephone Terminals over ATM.

ITU H.322 Visual Telephone Terminals over Guaranteed Quality of Service LANs.

ITU H.323 ITU Recommendation for Visual Telephone Systems and Equipment for Local Area Networks which provide a non-guaranteed quality of service.

ITU H.324 Recommendation for Terminals and Systems for low bitrate (28.8 Kbps) multimedia communication on dial-up telephone lines.

ITU T.120 Transmission Protocols for Multimedia Data.

In addition, several other relevant standards exist including:

ISDN Integrated Services Digital Network, the digital communication standard for transmission of voice, video and data on a single communications link.

RTP Real-Time Transport Protocol, an Internet Standard Protocol for transmission of real-time data like voice and video over unicast and multicast networks.

IP Internet Protocol, an Internet Standard Protocol for transmission and delivery of data packets on a packet switched network of interconnected computer systems.

PPP Point-to-Point Protocol.

MPEG Motion Pictures Expert Group, a standards body under the International Standards Organization(ISO), Recommendations for compression of digital Video and Audio including the bit stream but not the compression algorithms.

SLIP Serial Line Internet Protocol.

RSVP Resource Reservation Setup Protocol.

UDP User Datagram Protocol.

The popularity of the TCP/IP protocols on the Internet grew rapidly because they met an important need for worldwide data communication and had several important characteristics that allowed them to meet this need. These characteristics, still in use today, include:

1) A common addressing scheme that allows any device running TCP/IP to uniquely address any other device on the Internet.

2) Open protocol standards, freely available and developed independently of any hardware or operating system. Thus, TCP/IP is capable of being used with different hardware and software, even if Internet communication is not required.

Independence from any specific physical network hardware, allows TCP/IP to integrate many different kinds of networks. TCP/IP can be used over an Ethernet, a token ring, a dial-up line, or virtually any other kinds of physical transmission media.

An understanding of how information travels in communication systems is required to appreciate the recent steps taken by key players in today's Internet backbone business. The traditional type of communication network is circuit switched. The U.S. telephone system uses such circuit switching techniques. When a person or a computer makes a telephone call, the switching equipment within the telephone system seeks out a physical path from the originating telephone to the receiver's telephone. A circuit-switched network attempts to form a dedicated connection, or circuit, between these two points by first establishing a circuit from the originating phone through the local switching office, then across trunk lines, to a remote switching office, and finally to the destination telephone. This dedicated connection exists until the call terminates.

The establishment of a completed path is a prerequisite to the transmission of data for circuit switched networks. After the circuit is in place, the microphone captures analog signals, and the signals are transmitted to the Local Exchange Carrier (LEC) Central Office (CO) in analog form over an analog loop. The analog signal is not converted to digital form until it reaches the LEC Co, and even then only if the equipment is modern enough to support digital information. In an ISDN embodiment, however, the analog signals are converted to digital at the device and transmitted to the LEC as digital information.

Upon connection, the circuit guarantees that the samples can be delivered and reproduced by maintaining a data path of 64 Kbps (thousand bits per second). This rate is not the rate required to send digitized voice per se. Rather, 64 Kbps is the rate required to send voice digitized with the Pulse Code Modulated (PCM) technique.

Many other methods for digitizing voice exist, including ADPCM (32 Kbps), GSM (13 Kbps), TrueSpeech 8.5 (8.5 Kbps), G.723 (6.4 Kbps or 5.3 Kbps) and Voxware RT29HQ (2.9 Kbps). Furthermore, the 64 Kbps path is maintained from LEC Central Office (CO) Switch to LEC CO, but not from end to end. The analog local loop transmits an analog signal, not 64 Kbps digitized audio. One of these analog local loops typically exists as the "last mile" of each of the telephone network circuits to attach the local telephone of the calling party.

This guarantee of capacity is the strength of circuit-switched networks. However, circuit switching has two significant drawbacks. First, the setup time can be considerable, because the call signal request may find the lines busy with other calls; in this event, there is no way to gain connection until some other connection terminates. Second, utilization can be low while costs are high. In other words, the calling party is charged for the duration of the call and for all of the time even if no data transmission takes place (i.e. no one speaks). Utilization can be low because the time between transmission of signals is unable to be used by any other calls, due to the dedication of the line. Any such unused bandwidth during the connection is wasted.

Additionally, the entire circuit switching infrastructure is built around 64 Kbps circuits. The infrastructure assumes the use of PCM encoding techniques for voice.

However, very high quality codecs are available that can encode voice using less than one-tenth of the bandwidth of PCM. However, the circuit switched network blindly allocates 64 Kbps of bandwidth for a call, end-to-end, even if only one-tenth of the bandwidth is utilized. Furthermore, each circuit generally only connects two parties. Without the assistance of conference bridging equipment, an entire circuit to a phone is occupied in connecting one party to another party. Circuit switching has no multicast or multipoint communication capabilities, except when used in combination with conference bridging equipment.

Other reasons for long call setup time include the different signaling networks involved in call setup and the sheer distance causing propagation delay. Analog signaling from an end station to a CO on a low bandwidth link can also delay call setup. Also, the call setup data travels great distances on signaling networks that are not always transmitting data at the speed of light. When the calls are international, the variations in signaling networks grows, the equipment handling call setup is usually not as fast as modem setup and the distances are even greater, so call setup slows down even more. Further, in general, connection-oriented virtual or physical circuit setup, such as circuit switching, requires more time at connection setup time than comparable connectionless techniques due to the end-to-end handshaking required between the conversing parties.

Message switching is another switching strategy that has been considered. With this form of switching, no physical path is established in advance between the sender and receiver; instead, whenever the sender has a block of data to be sent, it is stored at the first switching office and retransmitted to the next switching point after error inspection. Message switching places no limit on block size, thus requiring that switching stations must have disks to buffer long blocks of data; also, a single block may tie up a line for many minutes, rendering message switching useless for interactive traffic.

Packet switched networks, which predominate the computer network industry, divide data into small pieces called packets that are multiplexed onto high capacity intermachine connections. A packet is a block of data with a strict upper limit on block size that carries with it sufficient identification necessary for delivery to its destination. Such packets usually contain several hundred bytes of data and occupy a given transmission line for only a few tens of milliseconds. Delivery of a larger file via packet switching requires that it be broken into many small packets and sent one at a time from one machine to the other. The network hardware delivers these packets to the specified destination, where the software reassembles them into a single file.

Packet switching is used by virtually all computer interconnections because of its efficiency in data transmissions. Packet switched networks use bandwidth on a circuit as needed, allowing other transmissions to pass through the lines in the interim. Furthermore, throughput is increased by the fact that a router or switching office can quickly forward to the next stop any given packet, or portion of a large file, that it receives, long before the other packets of the file have arrived. In message switching, the intermediate router would have to wait until the entire block was delivered before forwarding. Today, message switching is no longer used in computer networks because of the superiority of packet switching.

To better understand the Internet, a comparison to the telephone system is helpful. The public switched telephone network was designed with the goal of transmitting human voice, in a more or less recognizable form. Their suitability has been improved for computer-to-computer communications but remains far from optimal. A cable running between two computers can transfer data at speeds in the hundreds of megabits, and even gigabits per second. A poor error rate at these speeds would be only one error per day. In contrast, a dial-up line, using standard telephone lines, has a maximum data rate in the thousands of bits per second, and a much higher error rate. In fact, the combined bit rate times error rate performance of a local cable could be 11 orders of magnitude better than a voice-grade telephone line. New technology, however, has been improving the performance of these lines.

The Internet is composed of a great number of individual networks, together forming a global connection of thousands of computer systems. After understanding that machines are connected to the individual networks, we can investigate how the networks are connected together to form an internetwork, or an internet. At this point, internet gateways and internet routers come into play.

In terms of architecture, two given networks are connected by a computer that attaches to both of them. Internet gateways and routers provide those links necessary to send packets between networks and thus make connections possible. Without these links, data communication through the Internet would not be possible, as the information either would not reach its destination or would be incomprehensible upon arrival. A gateway may be thought of as an entrance to a communications network that performs code and protocol conversion between two otherwise incompatible networks. For instance, gateways transfer electronic mail and data files between networks over the internet.

IP Routers are also computers that connect networks and is a newer term preferred by vendors. These routers must make decisions as to how to send the data packets it receives to its destination through the use of continually updated routing tables. By analyzing the destination network address of the packets, routers make these decisions. Importantly, a router does not generally need to decide which host or end user will receive a packet; instead, a router seeks only the destination network and thus keeps track of information sufficient to get to the appropriate network, not necessarily the appropriate end user. Therefore, routers do not need to be huge supercomputing systems and are often just machines with small main memories and little disk storage. The distinction between gateways and routers is slight, and current usage blurs the line to the extent that the two terms are often used interchangeably. In current terminology, a gateway moves data between different protocols and a router moves data between different networks. So a system that moves mail between TCP/IP and OSI is a gateway, but a traditional IP gateway (that connects different networks) is a router.

Now, it is useful to take a simplified look at routing in traditional telephone systems. The telephone system is organized as a highly redundant, multilevel hierarchy. Each telephone has two copper wires coming out of it that go directly to the telephone company's nearest end office, also called a local central office. The distance is typically less than 10 km; in the U.S. alone, there are approximately 20,000 end offices. The concatenation of the area code and the first three digits of the telephone number uniquely specify an end office and help dictate the rate and billing structure.

The two-wire connections between each subscriber's telephone and the end office are called local loops. If a subscriber attached to a given end office calls another subscriber attached to the same end office, the switching mechanism within the office sets up a direct electrical connection between the two local loops. This connection remains intact for the duration of the call, due to the circuit switching techniques discussed earlier.

If the subscriber attached to a given end office calls a user attached to a different end office, more work has to be done in the routing of the call. First, each end office has a number of outgoing lines to one or more nearby switching centers, called toll offices. These lines are called toll connecting trunks. If both the caller's and the receiver's end offices happen to have a toll connecting trunk to the same toll office, the connection may be established within the toll office. If the caller and the recipient of the call do not share a toll office, then the path will have to be established somewhere higher up in the hierarchy. There are sectional and regional offices that form a network by which the toll offices are connected. The toll, sectional, and regional exchanges communicate with each other via high bandwidth inter-toll trunks. The number of different kinds of switching centers and their specific topology varies from country to country, depending on its telephone density.

Using Network Level Communication for Smooth User Connection

In addition to the data transfer functionality of the Internet, TCP/IP also seeks to convince users that the Internet is a solitary, virtual network. TCP/IP accomplishes this by providing a universal interconnection among machines, independent of the specific networks to which hosts and end users attach. Besides router interconnection of physical networks, software is required on each host to allow application programs to use the Internet as if it were a single, real physical network.

The basis of Internet service is an underlying, connectionless packet delivery system run by routers, with the basic unit of transfer being the packet. In internets running TCP/IP, such as the Internet backbone, these packets are called datagrams. This section will briefly discuss how these datagrams are routed through the Internet.

In packet switching systems, routing is the process of choosing a path over which to send packets. As mentioned before, routers are the computers that make such choices. For the routing of information from one host within a network to another host on the same network, the datagrams that are sent do not actually reach the Internet backbone. This is an example of internal routing, which is completely self-contained within the network. The machines outside of the network do not participate in these internal routing decisions.

At this stage, a distinction should be made between direct delivery and indirect delivery. Direct delivery is the transmission of a datagram from one machine across a single physical network to another machine on the same physical network. Such deliveries do not involve routers. Instead, the sender encapsulates the datagram in a physical frame, addresses it, and then sends the frame directly to the destination machine.

Indirect delivery is necessary when more than one physical network is involved, in particular when a machine on one network wishes to communicate with a machine on another network. This type of communication is what we think of when we speak of routing information across the Internet backbone. In indirect delivery, routers are required. To send a datagram, the sender must identify a router to which the datagram can be sent, and the router then forwards the datagram towards the destination network. Recall that routers generally do not keep track of the individual host addresses (of which there are millions), but rather just keeps track of physical networks (of which there are thousands). Essentially, routers in the Internet form a cooperative, interconnected structure, and datagrams pass from router to router across the backbone until they reach a router that can deliver the datagram directly.

The changing face of the internet world causes a steady inflow of new systems and technology. The following three developments, each likely to become more prevalent in the near future, serve as an introduction to the technological arena.

Asynchronous Transfer Mode (ATM) is a networking technology using a high-speed, connection-oriented system for both local area and wide area networks.

ATM networks require modern hardware including:
1) High speed switches that can operate at gigabit (trillion bit) per second speeds to handle the traffic from many computers.
2) Optical fibers (versus copper wires) that provide high data transfer rates, with host-to-ATM switch connections running at 100 or 155 Mbps (million bits per second).
3) Fixed size cells, each of which includes 53 bytes.

ATM incorporates features of both packet switching and circuit switching, as it is designed to carry voice, video, and television signals in addition to data. Pure packet switching technology is not conducive to carrying voice transmissions because such transfers demand more stable bandwidth.

Frame relay systems use packet switching techniques, but are more efficient than traditional systems. This efficiency is partly due to the fact that they perform less error checking than traditional X.25 packet-switching services. In fact, many intermediate nodes do little or no error checking at all and only deal with routing, leaving the error checking to the higher layers of the system. With the greater reliability of today's transmissions, much of the error checking previously performed has become unnecessary. Thus, frame relay offers increased performance compared to traditional systems.

An Integrated Services Digital Network is an "international telecommunications standard for transmitting voice, video, and data over digital lines," most commonly running at 64 kilobits per second. The traditional phone network runs voice at only 4 kilobits per second. To adopt ISDN, an end user or company must upgrade to ISDN terminal equipment, central office hardware, and central office software. The ostensible goals of ISDN include the following:
1) To provide an internationally accepted standard for voice, data and signaling;
2) To make all transmission circuits end-to-end digital;
3) To adopt a standard out-of-band signaling system; and
4) To bring significantly more bandwidth to the desktop.

An ISP is composed of several disparate systems. As ISP integration proceeds, formerly independent systems now become part of one larger whole with concomitant increases in the level of analysis, testing, scheduling, and training in all disciplines of the ISP.

Fault Management

The NGN operations architecture specifies the points of insertion and collections for network wide events that feed the Fault Management systems. Since the components of the packet portion of the hybrid NGN infrastructure are in most cases manageable by SNMP or some other standard management protocol the major challenges are the following:
1. Correlation of the events from the packet infrastructure with the Core circuit-based network events to provide the operators with a seamless service oriented view of the overall health of the network;
2. Event gathering and interpretation from the Core circuit network elements; and
   3. Mediation and standardization of the network messages to aid processing by the network management framework of the NGN.

The network management components of the NGN provide comprehensive solutions to address these challenges. Correlation is provided by the use of rules based inference engines. Event gathering and interpretation is typically performed by custom development of software interfaces which communicate directly with the network elements, process raw events and sort them by context prior to storing them.

For example, alarms versus command responses. The mediation and standardization challenge is addressed by using a comprehensive library of all possible message types and network events categorize the numerous messages that the NGN generates.

Figure 28:
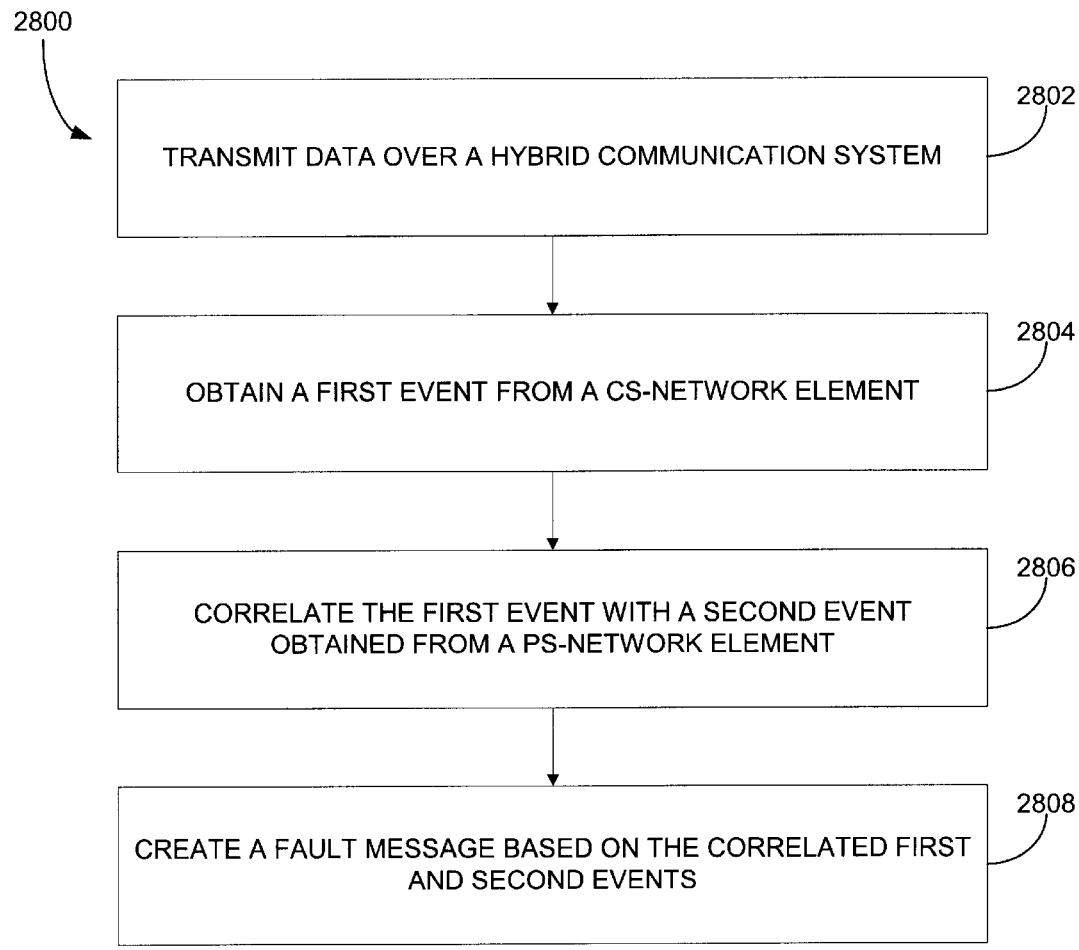
FIG. 28 is a flowchart showing a Fault Management Process in accordance with a preferred embodiment of the present invention.

FIG. 28 is a flowchart showing a Fault Management Process 2800 in accordance with a preferred embodiment of the present invention. The Fault Management Process 2800 begins with a transmitting step 2802. In step 2802, data is transmitted over the hybrid network, including video and mixed audio information. The data transmission generally makes full use of the hybrid networks mixed circuit-switched an packet-switched components. As discussed above, the hybrid network includes approximately all the advantages of a packet based network while still making use of the older circuit-switched components already in place.

The system is able to do this by correlating events raised by both the circuit-switched and packet-switch network elements, as discussed later in relation to event and correlating steps 2804 and 2806.

In a circuit-switched event gathering step 2804, an event is obtained from a circuit-switched based network element. As discussed above, event gathering and interpretation is typically performed by custom developed software interfaces which communicate directly with the network elements, process raw network events, and sort the events by context prior to storing them. After obtaining the events, the events are correlated in a correlation step 2806.

In a correlation step 2806, the event gathered in step 2804 is correlated with a second event obtained from a packet-switched network element. As with circuit-switched network elements, packet-switched event gathering and interpretation is typically performed by custom developed software interfaces which communicate directly with the network elements, process raw network events, and sort the events by context prior to storing them. As discussed above, the correlation is preferably provided by a rules based inference engine. After the events are correlated, a fault message is created in a fault message step 2808.

In a fault message step 2808, a fault message is created based on the correlated first and second events obtained in steps 2804 and 2806. Preferably the fault message is created utilizing a comprehensive library of all possible message types and network events which categorizes the numerous messages that the hybrid network generates.

Figure 29:
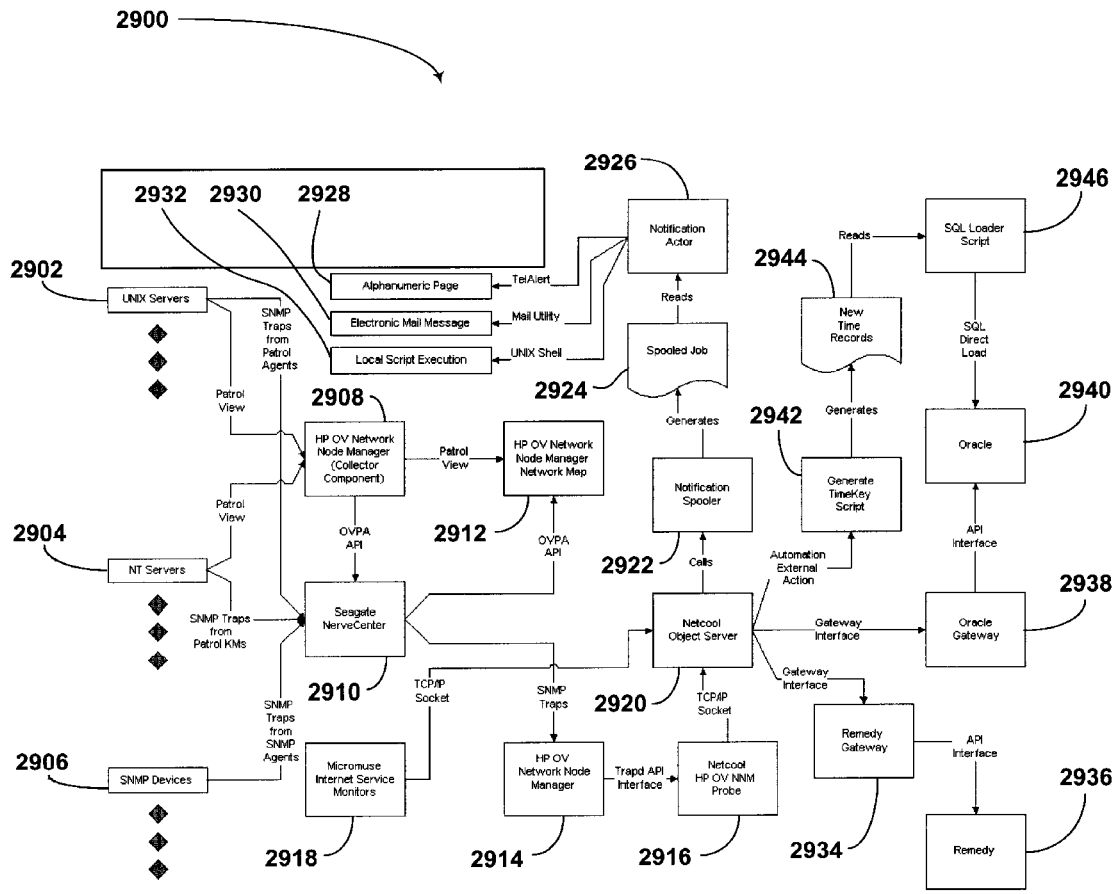
FIG. 29 is a block diagram showing a Fault Management component in accordance with a preferred embodiment of the present invention.

FIG. 29 is a block diagram showing a Fault Management component 2900 in accordance with a preferred embodiment of the present invention. The Fault Management component 2900 records failures and exceptions in network devices (e.g. network routers or UNIX servers) and performs the following operations:
1) performs root-cause correlation of the failures and exceptions;
2) immediately takes corrective and/or informative actions such as sending a page, logging a help desk ticket, sending an electronic mail message, or calling a resolution script;
3) stores the information into a Database Component for later analysis by the Reporting Component; and
4) allows real time viewing of faults in a network map and network event views.

The Fault Management component 2900 includes the following elements:
UNIX Servers 2902—Any UNIX Server with BMC Patrol clients loaded.
NT Servers 2904—Any NT Server with BMC Patrol clients loaded.
SNMP Devices 2906—Any SNMP manageable device.
HP OV Network Node Manager (Collector Component) 2908—HP OpenView Network Node Manager is one product which performs several functions. In this context it is it is responsible for receiving performance information from BMC Patrol clients via BMC Patrol View.
Seagate NerveCenter 2910—In a fault management context, Seagate NerveCenter performs root-cause correlation of faults and events across the network.
HP OV Network Node Manager Network Map 2912—HP OpenView Network Node Manager is one product which performs several functions. In this context it is responsible for maintaining and displaying the node level network map of the network the MNSIS architecture monitors.
HP OV Network Node Manager 2914—HP OpenView Network Node Manager is one product which performs several functions. In this context it is it is responsible for receiving and displaying all events, regardless of their source.

Netcool HP OV NNM Probe 2916—An Omnibus Netcool probe which is installed on the same system as HP OV Network Node Manager and forwards events to the Omnibus Netcool Object Server.

Micromuse Internet Service Monitors 2918—An Omnibus Netcool suite of active probes (monitors) which monitor internet services such as FTP, POP3, SMTP, NNTP, DNS, HTTP, and RADIUS. These monitors collect availability and performance data and forward the information as alerts to the Omnibus Netcool Object Server.

Netcool Object Server 2920—The Omnibus Netcool Object Server is a real-time memory resident database which stores all current events (alerts). The events are viewable by operations personnel using a number of event lists and views, all of which are highly customizable by each operator.

Notification Spooler 2922—A custom provided subcomponent which spools job-files that specify which events have occurred for possible notifications.

Spooled Job 2924—Each spooled job represents a specific event that was received by the Netcool Object Server and may need to result in one or more notification actions. Each job is stored as a file in a special notification spool directory.

Notification Actor 2926—A custom provided subcomponent which determines the alert time, source node, and alert type from the loaded spooled job and initiates notification actions based as specified in the configuration file. Notification actions include alphanumeric pages, trouble tickets, email, and resolution scripts. Multiple notification actions can be specified in the configuration files such that different actions are taken for different alert times, source nodes, and/or alert types. Default actions are also supported.

Alphanumeric Page 2928—An alphanumeric page sent using Telamon TelAlert via modem dialing the relevant paging provider. The alphanumeric page message provides contextual notification of actions to be performed. Context can include any information but frequently contains information such as the device name, problem description, and priority.

Electronic Mail Message 2930—An internet mail message send using the UNIX mail utility. The mail message is frequently used to provide non-urgent notification of situations or actions automatically performed by the MNSIS architecture along with detailed context.

Local Script Execution 2932—Initiates any local script on the machine, which may initiate scripts or applications on other machines.

Remedy Gateway 2934—The Omnibus Netcool Remedy Gateway automatically reads alerts in the Netcool Object Server and opens tickets within Remedy as customized by the user. The Remedy trouble ticket ID is returned to the Omnibus and can be viewed as further reference.

Remedy 2936—Remedy Action Request System, a trouble ticketing system.

Oracle Gateway 2938—The Omnibus Netcool Oracle Gateway automatically reads alerts in the Netcool Object Server and logs records within Oracle as customized by the user.

Oracle 2940—Oracle is a relational database management system.

Generate Time Key Script 2942—Script which generates New Time Records from alerts in the Netcool Object Server.

New Time Records 2944-Time records corresponding to new alerts in Netcool Object Server which need to be added to the Oracle time tables.

SQL Loader Script 2946—A custom script which automatically loads records into Oracle via SQL Loader Direct Load.

Element Management

As discussed above, the element manager works with the Information Services Manager and the Presentation Manager to assist in the management of the hybrid network system. The three components are briefly described below to provide context for the detailed discussion of the element manager that follows.

Element Manager

The element manager communicates with the network elements to receive alarms and alerts through trapping and polling techniques. The element manager is the layer where the primary data reduction functions reside. At this layer, events received at the element manager will be filtered, aggregated and correlated to further isolate problems within the network. Information that is deemed critical to monitor and manage the network is translated into a standard object format and forwarded to the Information Services Manager. An element manager can be, but is not necessarily, software which adheres to open standards such as the Simple Network Management Protocol (SNMP) and the Object Management Group's (OMG) Common Object Request Broker Architecture (CORBA).

Information Services Manager

The information services manager provides the data management and data communications between element managers and presentation managers. All information forwarded from the element managers is utilized by the information services manager to provide information to the network operators. The information services manager adheres to CORBA standards to provide ubiquitous information access via an object request broker (ORB). The ORB allows the information services manager to share management information stored in distributed databases.

The information services manager stores critical management information into operational (real-time) and analytical (historical) distributed databases. These databases provide common data storage so that new products can be easily inserted into the management environment. For example, if an event is received at an element manager that is deemed critical to display to a network user, the information services manager will store a copy of the alarm in the operational database and then forward the alarm to the appropriate network operator.

Media and textual databases are also provided by the information services manager. The databases includes online manuals for administrative purposes, as well as for the maintenance specialists to access element specific information. The databases also provide procedures, policies and computer based training to network users.

The information services manager provides requested information (real-time and historical) to the network users via the presentation manager.

Presentation Manager

The presentation manager performs the function its name implies: the presentation of the information to an end user. Because different locations and job functions require access to different types of information, there are at least two types of display methods. The first is for graphic intensive presentations and the second is for nomadic use, such as field technicians. The first environment requires a graphic intensive display, such as those provided by X-Windows/MOTIF.

The second environment is potentially bandwidth poor where dial-up or wireless access may be used along with more traditional LAN access. This is also where browser technology is employed.

The Element Management Aspect of the present invention works in conjunction with other components of the system, such as Fault Management, to provide communication between the various network elements of the system.

Figure 30:
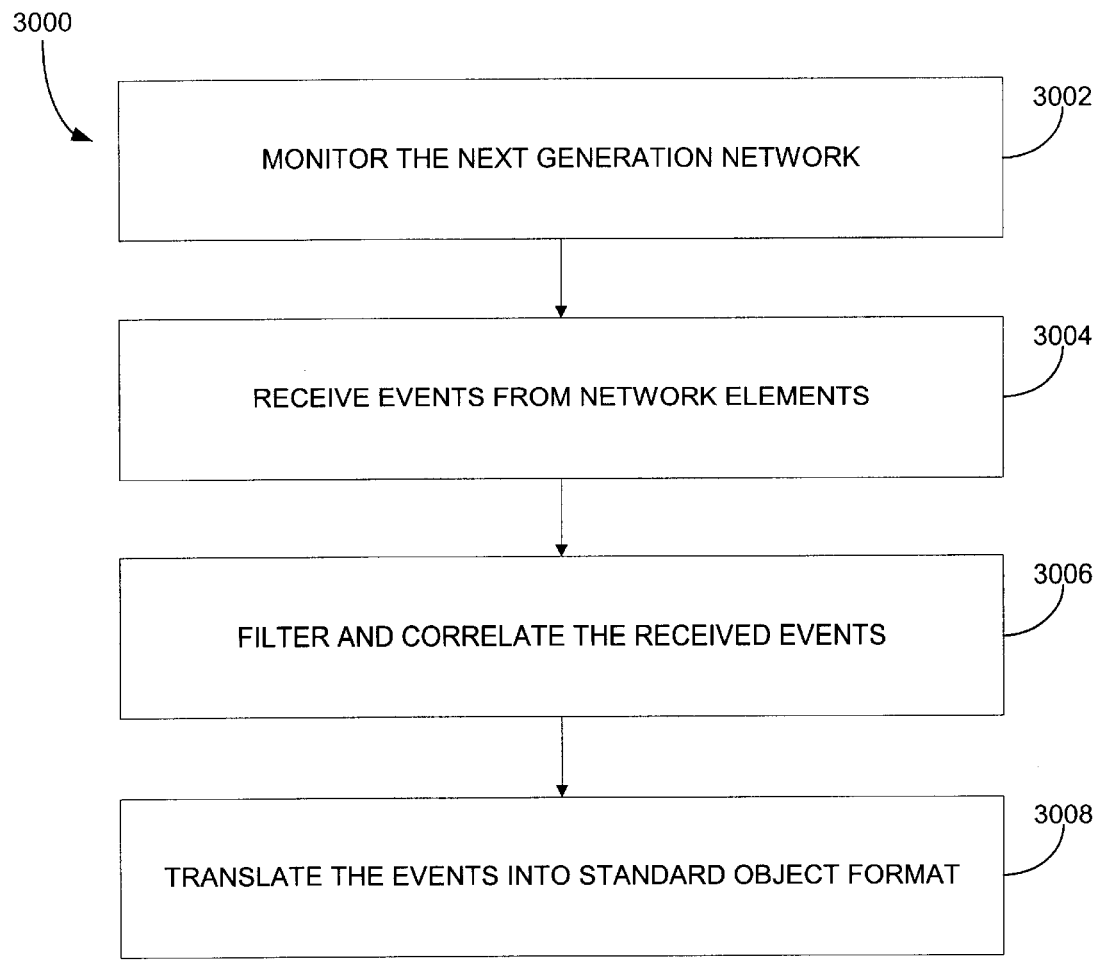
FIG. 30 is a flowchart showing an Element Management Process in accordance with a preferred embodiment of the present invention.

FIG. 30 is a flowchart showing an Element Management Process 3000 in accordance with a preferred embodiment of the present invention. The Element Management Process 3000 begins with a monitoring step 3002. In step 3002, the Element Manager monitors the system for events generated by network elements. Generally, the Element Manager continuously monitors the system to translate events for other system components, such as the Fault Management Component.

In an event receiving step 3004, the Element Manager receives events from various network elements. Preferably the events are provided by custom software interfaces which communicate directly with network elements. The software interfaces preferably process the raw network events and sort them by context prior to providing the events to the Element Manager.

In a filtering and correlating step 3006, the Element Manager filters and correlates the events received in step 3004. Preferably the correlation is provided by a rules based inference engine. After collecting and correlating the events, the Element Manager performs a translation step 3008. In step 3008, the events correlated in step 3006 are translated into standard object format. Generally a comprehensive library of all message types generated by the hybrid system is utilized to translate the correlated events into standard object format. Once the events are translated, they are ready for use by other system components, such as Fault Management or Billing.

Customer Support Structure

The organization model for customer service support in the NGN network provides a single point of contact that is customer focused. This single point of contact provides technical expertise in resolving customer incidents, troubles and requests. Generally a three tiered support structure is greatly increases customer satisfaction in service needs. Each tier, or level, possess an increased level of skill, with tasks and responsibilities distributed accordingly.

Figure 31:
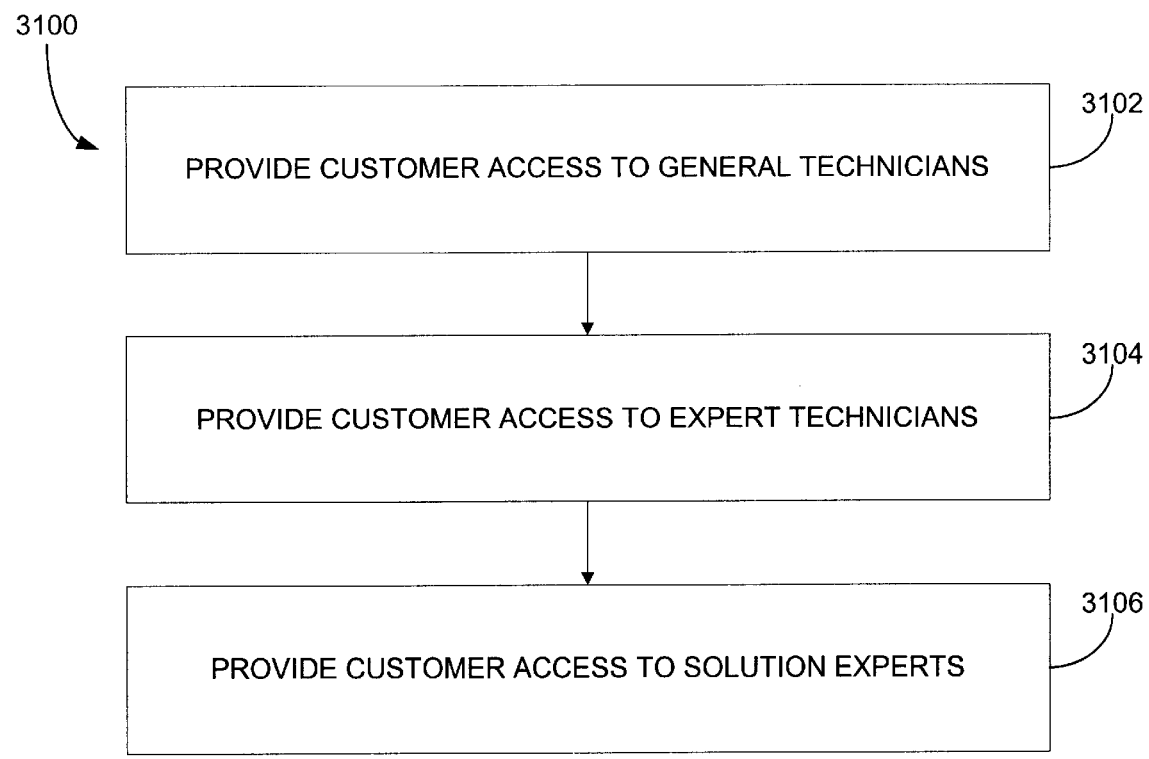
FIG. 31 is a flowchart showing a Three Tiered Customer Support Process in accordance with a preferred embodiment of the present invention.

FIG. 31 is a flowchart showing a Three Tiered Customer Support Process 3100 in accordance with a preferred embodiment of the present invention. The Three Tiered Customer Support Process 3100 begins with a First Tier step 3102. In step 3102, a customer with a hybrid network problem is provided access to customer support personnel having a broad set of technical skills. The broad set of technical skills allows this group to solve about 60–70% of all hybrid network problems. If the customers network problem is solved at this stage, the process ends. However, if the customers network problem is not solved at this stage, the process continues to a Second Tier step 3104.

In the Second Tier step 3104, the customer is provided access to technical experts and field support personnel who may specialize in specific areas. The greater specialized nature of this group allows it to solve many problems the group in step 3102 could not solve. This group is generally responsible for solving 30–40% of all hybrid network problems. If the customers network problem is solved at this stage, the process ends. However, if the customers network problem is not solved at this stage, the process continues to a Third Tier step 3106.

In the Third Tier step 3106, the customer is provided access to solution experts who are often hardware vendors, software vendors, or customer application development and maintenance teems. Customer network problems that get this far in the customer support process 3100 need individuals possessing in-depth skills to investigate and resolve the difficult problems with there area of expertise. Solution experts are the last resort for solving the most difficult problems. Typically this group solves about 5% of all hybrid network problems.

The above model is generally referred to as the Skilled Model because personnel at all three tiers are highly skilled. This model generally creates a high percentage of calls resolved on the first call. Other approaches include a Functional Model, and a Bypass Model. In the Functional Model users are requested to contact different areas depending on the nature of the incident. Calls are routed to the customer support representative best able to handle the call. This model can easily be coupled with the Skill Model above. In the Bypass Model First Tier only logs calls, they do not resolve calls. One advantage of this model is that skilled resources don't have to waste time logging calls.

In more detail, a customer calling a customer support center in accordance with one embodiment of the present invention is first asked a series of questions by an interactive voice response (IVR) system or an live operator. The customer uses Touch-Tone keys on the telephone to respond to these queries from the IVR, or responds normally to a live operator.

When a product support engineer becomes available, the previously gathered information (both from the IVR query responses and the diagnostic information solicited from the system problem handlers and element managers) is available to the product support engineer.

After reviewing the situation with the customer, the product support engineer can query the customer's computer via support agents for additional information, if necessary.

In systems according to the preferred embodiment, the customer spends less time interacting with a product support engineer, and is relieved of many of the responsibilities in diagnosing and resolving problems. Automated diagnoses and shorter customer interactions save the product support center time, resources, and money. At the same time, the customer receives a better diagnosis and resolution of the problem than could usually be achieved with prior art product support techniques.

In addition, one embodiment of the present invention makes the Internet a viable alternative to telephone calls as a tool for providing consumer product support. Many on-line computer services, such as Prodigy and America On-Line, provide, for a fee as a part of their on-line service, software for connecting to and accessing the Internet.

The Internet access software accesses and "handshakes" with an "Internet Entry Server", which verifies the PIN number, provides the access and times the user's access time. The Internet Entry Server is programmed to recognize the PIN number as entitling the user to a limited prepaid or "free" Internet access time for on-line help services. Such a time period could be for a total time period such as 1 hour or more, or access to on-line help services can be unlimited for 90 days, 6 months, etc., for example, with the access time paid for by the sponsor/vendor. The first time a customer uses the on-line help service, the Internet Entry Server performs a registration process which includes a number of personal questions and custom data gathering in the form of queries provided by the sponsor/vendor for response by the user.

The pertinent answers are then immediately provided to the sponsor/vendor. The Internet Entry Server then "hot-links" the customer to the sponsor/vendor's Internet domain or Home Page for a mandatory "guided tour" where the user is exposed to any current product promotion by the sponsor/vendor and can download promotional coupons, product information, etc. After this mandatory guided tour is completed, the customer is allowed to enter queries for help in installing or using the sponsor/vendor's product. As an optional promotional service, upon termination of the on-line help session, access to other information on the Internet can be provided. Once the "free" on-line help service time or time period is up, the Internet Entry Server prompts the user with one or more of a plurality of options for extending the availability of on-line help. For example, the user can be prompted to enter a credit card number to which on-line help charges can be charged; he or she can be given the opportunity to answer additional survey information in return for additional "free" on-line help; or a 900 subscriber paid telephone access number can be provided through which additional on-line help will be billed via the normal telephone company 900 billing cycles.

Data Mining

The present invention includes data mining capability that provides the capability to analyze network management data looking for patterns and correlations across multiple dimensions. The system also constructs models of the behavior of the data in order to predict future growth or problems and facilitate managing the network in a proactive, yet cost-effective manner.

A technique called data mining allows a user to search large databases and to discover hidden patterns in that data. Data mining is thus the efficient discovery of valuable, non-obvious information from a large collection of data and centers on the automated discovery of new facts and underlying relationships in the data. The term "data mining" comes from the idea that the raw material is the business data, and the data mining algorithm is the excavator, shifting through the vast quantities of raw data looking for the valuable nuggets of business information.

Because data can be stored in such a wide variety of formats and because the data values can have such a wide variety of meanings, data mining applications have in the past been written to perform specific data mining operations, and there has been little or no reuse of code between application programs. Thus, each data mining application is written from scratch, making the development process long and expensive. Although the nuggets of business information that a data mining application discovers can be quite valuable, they are of little use if they are expensive and untimely discovered. Returning to the mining analogy, even if gold is selling for $900 per ounce, nobody is interested in operating a gold mine if it takes two years and $901 per ounce to get it out of the ground.

Accurate forecasting relies heavily upon the ability to analyze large amounts of data. This task is extremely difficult because of the sheer quantity of data involved and the complexity of the analyses that must be performed. The problem is exacerbated by the fact that the data often resides in multiple databases, each database having different internal file structures.

Rarely is the relevant information explicitly stored in the databases. Rather, the important information exists only in the hidden relationships among items in the databases. Recently, artificial intelligence techniques have been employed to assist users in discovering these relationships and, in some cases, in automatically discovering the relationships.

Figure 32:
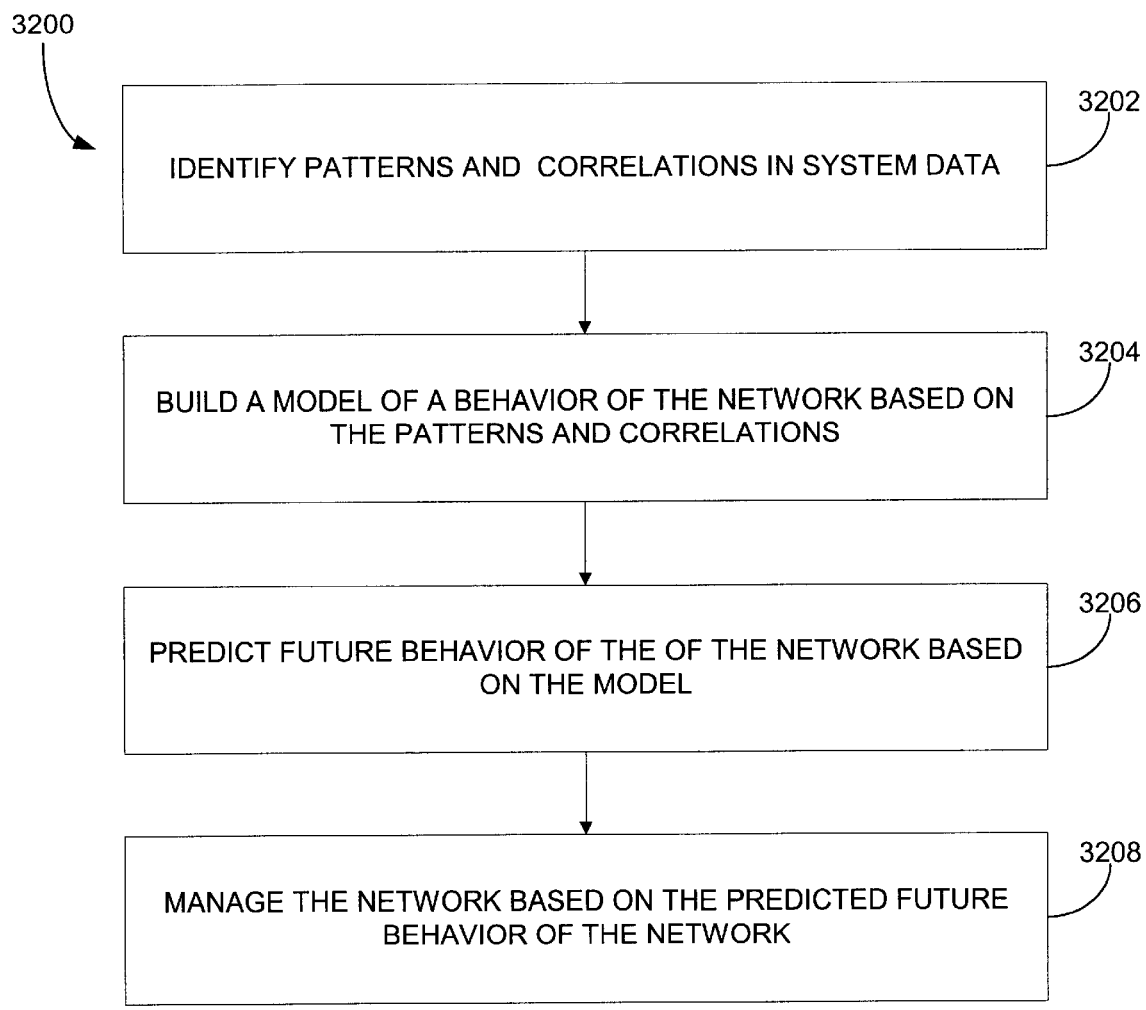
FIG. 32 is a flowchart showing a Data Mining Process in accordance with a preferred embodiment of the present invention.

FIG. 32 is a flowchart showing a Data Mining Process 3200 in accordance with a preferred embodiment of the present invention. The Data Mining Process 3200 begins with an identifying step 3202. In step 3202, the system identifies patterns and correlations in the system data over the hybrid communication system. Preferably the system data is analyzed across multiple dimensions to provide better future system behavior prediction.

In a model building step 3204, the system builds a model of the network behavior based on the patterns and correlations identified in step 3202. Data mining is a process that uses specific techniques to find patterns in data, allowing a user to conduct a relatively broad search of large databases for relevant information that may not be explicitly stored in the databases. Typically, a user initially specifies a search phrase or strategy and the system then extracts patterns and relations corresponding to that strategy from the stored data. Such a search system permits searching across multiple databases. The extracted patterns and relations can be: (1) used by the user, or data analyst, to form a prediction model; (2) used to refine an existing model; and/or (3) organized into a summary of the target database, as in predicting step 3206.

In a predicting step 3206, the system predicts future behavior of the network based on the model generated in step 3204. There are two existing forms of data mining: top-down; and bottom-up. Both forms are separately available on existing systems. Top-down systems are also referred to as "pattern validation," "verification-driven data mining" and "confirmatory analysis." This is a type of analysis that allows an analyst to express a piece of knowledge, validate or validate that knowledge, and obtain the reasons for the validation or invalidation. The validation step in a top-down analysis requires that data refuting the knowledge as well as data supporting the knowledge be considered. Bottom-up systems are also referred to as "data exploration." Bottom-up systems discover knowledge, generally in the form of patterns, in data.

Finally, in a managing step 3208, the network is managed based on the future behavior of the network. Data mining involves the development of tools that analyze large databases to extract useful information from them. As an application of data mining, customer purchasing patterns may be derived from a large customer transaction database by analyzing its transaction records. Such purchasing habits can provide invaluable marketing information. For example, retailers can create more effective store displays and more effective control inventory than otherwise would be possible if they know consumer purchase patterns. As a further example, catalog companies can conduct more effective mass mailings if they know that, given that a consumer has purchased a first item, the same consumer can be expected, with some degree of probability, to purchase a particular second item within a defined time period after the first purchase.

Classification of the data records to extract useful information is an essential part of data mining. Of importance to the present invention is the construction of a classifier, from records of known classes, for use in classifying other records whose classes are unknown. As generally known in the prior art, a classifier is generated from input data, also called a training set, which consist of multiple records. Each record is identified with a class label. The input data is analyzed to develop an accurate description, or model, for each class of the records. Based on the class descriptions, the classifier can then classify future records, referred to as test data, for which the class labels are unknown.

As an example, consider the case where a credit card company which has a large database on its card holders and wants to develop a profile for each customer class that will be used for accepting or rejecting future credit applicants. Assuming that the card holders have been divided into two classes, good and bad customers, based on their credit history. The problem can be solved using classification. First, a training set consisting of customer data with the assigned classes are provided to a classifier as input. The output from the classifier is a description of each class, i.e., good and bad, which then can be used to process future credit card applicants. Similar applications of classification are also found in other fields such as target marketing, medical diagnosis, treatment effectiveness, and store location search.

In data mining applications of classification, very large training sets such as those having several million examples are common. Thus, it is critical in these applications to have a classifier that scales well and can handle training data of this magnitude. As an additional advantage, being able to classify large training data also leads to an improvement in the classification accuracy.

Another desirable characteristic for a data mining classifier is its short training time, i.e., the ability to construct the class descriptions from the training set quickly. As a result, the methods of the invention are based on a decision-tree classifier. Decision trees are highly developed techniques for partitioning data samples into a set of covering decision rules. They are compact and have the additional advantage that they can be converted into simple classification rules. In addition, they can be easily converted into Structured Query language (SQL) statements used for accessing databases, and achieve comparable or better classification accuracy than other classification methods.

Another data mining classifier technique solves the memory constraint problem and simultaneously improve execution time by partitioning the data into subsets that fit in the memory and developing classifiers for the subsets in parallel. The output of the classifiers are then combined using various algorithms to obtain the final classification. This approach reduces running time significantly. Another method classifies data in batches.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed is:

1. A method for generating a chart, comprising the steps of allowing a user to select a category from at least five predefined categories of information;
    receiving an indication of the category selected by the user;
    receiving a request for information having stored associations with the selected category;
    performing a search for data relating to the request for information in at least two geographically separated information repositories of an enterprise, wherein data items in the repositories include information having stored associations to at least two categories selected from the group consisting of a person, a client a topic, a document, a project, and an industry;
    presenting results of the search to the user;
    allowing the user to select a search result from the results of the search;
    generating a chart illustrating information relating to the search result selected by the user; and
    displaying the chart on a screen, wherein the chart is a Gantt chart showing a timeline of postings of said information to the information repositories.

2. A method as recited in claim 1, wherein the chart illustrates a person's activity by at least one of topics and keywords associated with documents the person has posted to at least one of the information repositories of the enterprise.

3. A method as recited in claim 1, wherein the chart illustrates a timeline of postings about a client of the enterprise.

4. A method as recited in claim 1, further comprising the steps of generating and displaying a second chart different from the chart.

5. A method as recited in claim 1, further comprising the steps of generating and displaying a second chart having content different from the chart, wherein the second chart is a line chart that illustrates a number of documents submitted to the information repositories on a given topic or the second chart is a pie chart that categorizes postings on the given topic according to the information repository from which they came.

6. A computer program embodied on a computer readable medium for generating a chart, comprising:
    a code segment that allows a user to select a category from at least five predefined categories of information;
    a code segment that receives an indication of the category selected by the user;
    a code segment that receives a request for information having stored associations with the selected category;
    a code segment that performs a search for data relating to the request for information in at least two geographically separated information repositories of an enterprise, wherein data items in the repositories include information having stored associations to at least two categories selected from the group consisting of a person, a client, a topic, a document, a project, and an industry;
    a code segment that presents results of the search to the user;
    a code segment that allows the user to select a search from the results of the search;
    a code segment that recognizes a search result selected by the user;
    a code segment that generates a chart illustrating information related to the search result selected by the user; and
    a code segment that displays the chart on a screen, wherein the chart is a Gantt chart showing a timeline of postings of said information to the information repositories.

7. A computer program as recited in claim 6, wherein the chart illustrates a person's activity by at least one of topics and keywords associated with documents the person has posted to at least one of the information repositories of the enterprise.

8. A computer program as recited in claim 6, wherein the chart illustrates a timeline of postings about a client of the enterprise.

9. A computer program as recited in claim 6, further comprising a code segment that generates and displays a second chart different from the chart.

10. A computer program as recited in claim 6, further comprising a code segment that generates and displays a second chart having content different from the chart, wherein the second chart is a line chart that illustrates a number of documents submitted to the information repositories on a given topic or the second chart is a pie chart that categorizes postings on the given topic according to the information repository from which they came.

11. A system for generating a chart, comprising:
   logic that allows a user to select a category from at least five predefined categories of information;
   logic that receives an indication of the category selected by the user;
   logic that receives a request for information having stored associations with the selected category;
   logic that performs a search for data relating to the request for information in at least two geographically separated information repositories of an enterprise, wherein data items in the repositories include information having stored associations to at least two categories selected from the group consisting of a person, a client, a topic, a document, a project, and an industry;
   logic that presents results of the search to the user;
   logic that allows the user to select a search from the results of the search;
   logic that recognizes a search result selected by the user;
   logic that generates a chart illustrating information related to the search result selected by the user; and
   logic that displays the chart on a screen, wherein the chart is a Gantt chart showing a timeline of postings of said information to the information repositories.

12. A system as recited in claim 11, wherein the chart illustrates a person's activity by at least one of topics and keywords associated with documents the person has posted to at least one of the information repositories of the enterprise.

13. A system as recited in claim 11, wherein the chart illustrates a timeline of postings about a client of the enterprise.

14. A system as recited in claim 11, further comprising logic that generates and displays a second chart different from the chart.

15. A system as recited in claim 11, further comprising logic that generates a second chart having content different from the chart, wherein the second chart is a line chart that illustrates a number of documents submitted to the information repositories on a given topic or the second chart is a pie chart that categorizes postings on the given topic according to the information repository from which they came.

16. A method for generating a chart, comprising the steps of:
   allowing a user to select a category from at least five predefined categories of information;
   receiving an indication of the category selected by the user;
   receiving a request for information having stored associations with the selected category;
   performing a search for data relating to the request for information in at least two geographically separated information repositories of an enterprise, wherein data items in the repositories include information having stored associations to at least two categories selected from the group consisting of a person, a client a topic, a document, a project, and an industry;
   presenting results of the search to the user, wherein the results of the search are grouped in at least one category not selected by the user;
   allowing the user to select a search result from the results of the search;
   generating a chart illustrating information relating to the search result selected by the user; and
   displaying the chart on a screen, wherein the chart is of a type selected from the group consisting of: a Gantt chart showing a timeline for projects or documents of a person by topic, a Gantt chart showing a timeline for projects or documents of a client by topic, a time-based line chart that shows a number of documents on a particular topic posted to the information repositories during a preselected period of time, and a time-based pie chart that illustrates the volume of entries on a topic found in the information repositories.

17. A computer program embodied on a computer readable medium for generating a chart, comprising:
   a code segment that allows a user to select a category from at least five predefined categories of information;
   a code segment that receives an indication of the category selected by the user;
   a code segment that receives a request for information having stored associations with the selected category;
   a code segment that performs a search for data relating to the request for information in at least two geographically separated information repositories of an enterprise, wherein data items in the repositories include information having stored associations to at least two categories selected from the group consisting of a person, a client, a topic, a document, a project, and an industry;
   a code segment that presents results of the search to the user, wherein the results of the search are grouped in at least one category not selected by the user;
   a code segment that allows the user to select a search from the results of the search;
   a code segment that recognizes a search result selected by the user;
   a code segment that generates a chart illustrating information related to the search result selected by the user; and
   a code segment that displays the chart on a screen, wherein the chart is of the type selected from the group consisting of: a Gantt chart showing a timeline for projects or documents of a person by topic, a Gantt chart showing a timeline for projects or documents of a client by topic, a time-based line chart that shows a number of documents on a particular topic posted to the information repositories during a preselected period of time, and a time-based pie chart that illustrates the volume of entries on a topic found in the information repositories.

18. A system for generating a chart, comprising:
   logic that allows a user to select a category from at least five predefined categories of information;
   logic that receives an indication of the category selected by the user;
   logic that receives a request for information having stored associations with the selected category;
   logic that performs a search for data relating to the request for information in at least two geographically separated information repositories of an enterprise, wherein data items in the repositories include information having stored associations to at least two categories selected from the group consisting of a person, a client, a topic, a document, a project, and an industry;

logic that presents results of the search to the user, wherein the results of the search are grouped in at least one other category not selected by the user;

logic that allows the user to select a search from the results of the search;

logic that recognizes a search result selected by the user;

logic that generates a chart illustrating information related to the search result selected by the user; and logic that displays the chart on a screen, wherein the chart is of the type selected from the group consisting of: a Gantt chart showing a timeline for projects and documents of a person by topic, a Gantt chart showing a timeline for project or documents of a client by topic, a time-based line chart that shows a number of documents on a particular topic posted to the information repositories during a preselected period of time, and a time-based pie chart that illustrates the volume of entries on a topic found in the information repositories.

19. The method of claim 1, wherein the search results are documents and further comprising displaying an identification of the information repositories where the documents are stored.

20. The method of claim 16, further comprising the steps of generating and simultaneously displaying on the same screen a second chart having content different from the chart, wherein the second chart is a line chart that illustrates a number of documents submitted to the information repositories on a given topic or the second chart is a pie chart that categorizes postings on the given topic according to the information repository where the postings are stored.

* * * * *

UNITED STATES PATENT AND TRADEMARK OFFICE
CERTIFICATE OF CORRECTION

PATENT NO. : 6,900,807 B1 Page 1 of 1
APPLICATION NO. : 09/521471
DATED : May 31, 2005
INVENTOR(S) : Edy S. Liongosari et al.

It is certified that error appears in the above-identified patent and that said Letters Patent is hereby corrected as shown below:

<u>In the Claims</u>

Column 45, in claim 1, line 2, immediately after "of" insert --:-- (colon).

Column 45, in claim 1, line 2, start a new paragraph with the words "allowing a user to select".

Column 47, in claim 16, line 14, immediately after "a person, a client" insert --,-- (comma).

Signed and Sealed this

Fourteenth Day of November, 2006

JON W. DUDAS
*Director of the United States Patent and Trademark Office*